(12) United States Patent
Moon et al.

(10) Patent No.: US 11,425,705 B2
(45) Date of Patent: Aug. 23, 2022

(54) METHOD AND APPARATUS FOR TRANSMITTING AND RECEIVING CONTROL INFORMATION IN COMMUNICATION SYSTEM SUPPORTING UNLICENSED BAND

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 219 days.

(21) Appl. No.: 16/803,489

(22) Filed: Feb. 27, 2020

(65) Prior Publication Data

US 2020/0280971 A1    Sep. 3, 2020

(30) Foreign Application Priority Data

| Feb. 28, 2019 | (KR) | 10-2019-0023591 |
| Mar. 6, 2019 | (KR) | 10-2019-0025941 |
| Mar. 28, 2019 | (KR) | 10-2019-0036321 |
| May 17, 2019 | (KR) | 10-2019-0057907 |
| Jul. 23, 2019 | (KR) | 10-2019-0088937 |
| Sep. 10, 2019 | (KR) | 10-2019-0112412 |
| Oct. 7, 2019 | (KR) | 10-2019-0123880 |
| Oct. 18, 2019 | (KR) | 10-2019-0130068 |
| Nov. 8, 2019 | (KR) | 10-2019-0142866 |

(Continued)

(51) Int. Cl.
H04W 4/00    (2018.01)
H04W 72/04    (2009.01)
H04W 74/08    (2009.01)

(52) U.S. Cl.
CPC ..... *H04W 72/042* (2013.01); *H04W 74/0808* (2013.01)

(58) Field of Classification Search
CPC ................ H04W 72/042; H04W 74/0808
See application file for complete search history.

(56) References Cited

U.S. PATENT DOCUMENTS

2017/0332358 A1   11/2017  Park et al.
2017/0367046 A1*  12/2017  Papasakellariou .... H04L 5/0048
(Continued)

FOREIGN PATENT DOCUMENTS

WO    2017/047973 A1    3/2017

*Primary Examiner* — Siren Wei
(74) *Attorney, Agent, or Firm* — Rabin & Berdo, P.C.

(57) ABSTRACT

Disclosed are methods and apparatuses for transmitting and receiving control information in a communication system supporting unlicensed band communication. An operation method of a terminal may comprise receiving, from a base station, first configuration information of a CORESET and second configuration information of a search space associated with the CORESET; receiving, from the base station, third configuration information indicating one or more PDCCH monitoring resource sets associated with the CORESET and the search space; and performing a PDCCH monitoring operation on the one or more PDCCH monitoring resource sets. Therefore, the performance of the communication system can be improved.

15 Claims, 20 Drawing Sheets

(30) Foreign Application Priority Data

Nov. 20, 2019 (KR) .......................... 10-2019-0149873
Feb. 14, 2020 (KR) .......................... 10-2020-0018408

(56) References Cited

U.S. PATENT DOCUMENTS

| | | | |
|---|---|---|---|
| 2018/0132271 A1 | 5/2018 | Jung et al. | |
| 2018/0227777 A1* | 8/2018 | Sun | H04W 24/08 |
| 2018/0317256 A1 | 11/2018 | Um et al. | |
| 2019/0014595 A1 | 1/2019 | Yu et al. | |
| 2019/0059085 A1 | 2/2019 | Sun et al. | |
| 2019/0069285 A1* | 2/2019 | Chandrasekhar | H04B 7/088 |
| 2019/0075001 A1 | 3/2019 | Stern-Berkowitz et al. | |
| 2019/0104521 A1 | 4/2019 | Kim et al. | |
| 2019/0110318 A1 | 4/2019 | Zhang et al. | |
| 2020/0245332 A1* | 7/2020 | Ji | H04W 72/0493 |
| 2020/0351896 A1* | 11/2020 | Taherzadeh Boroujeni | H04L 1/0061 |
| 2020/0374967 A1* | 11/2020 | Nogami | H04L 1/0061 |
| 2021/0045121 A1* | 2/2021 | Kim | H04L 5/0048 |

\* cited by examiner

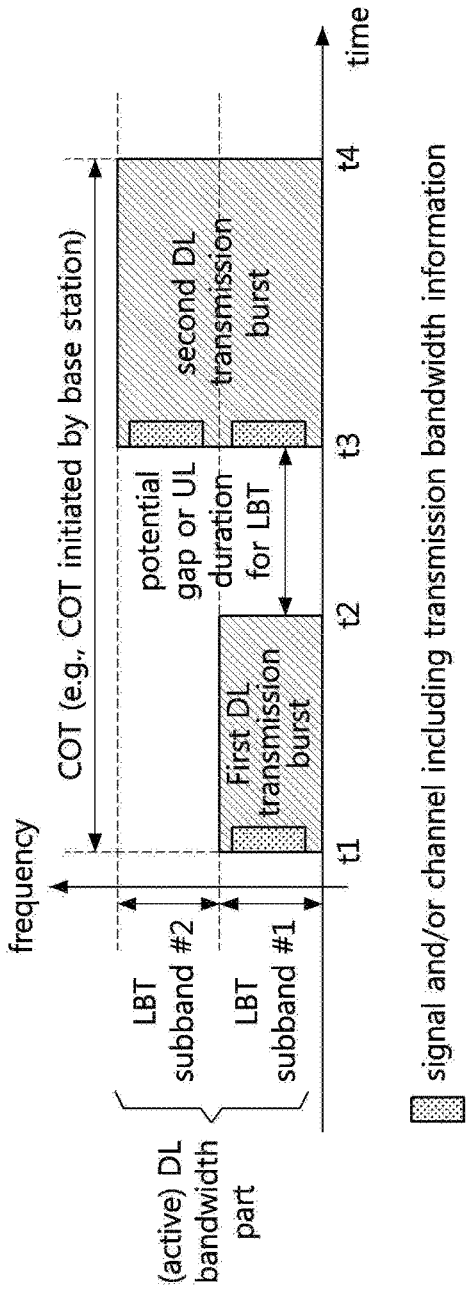
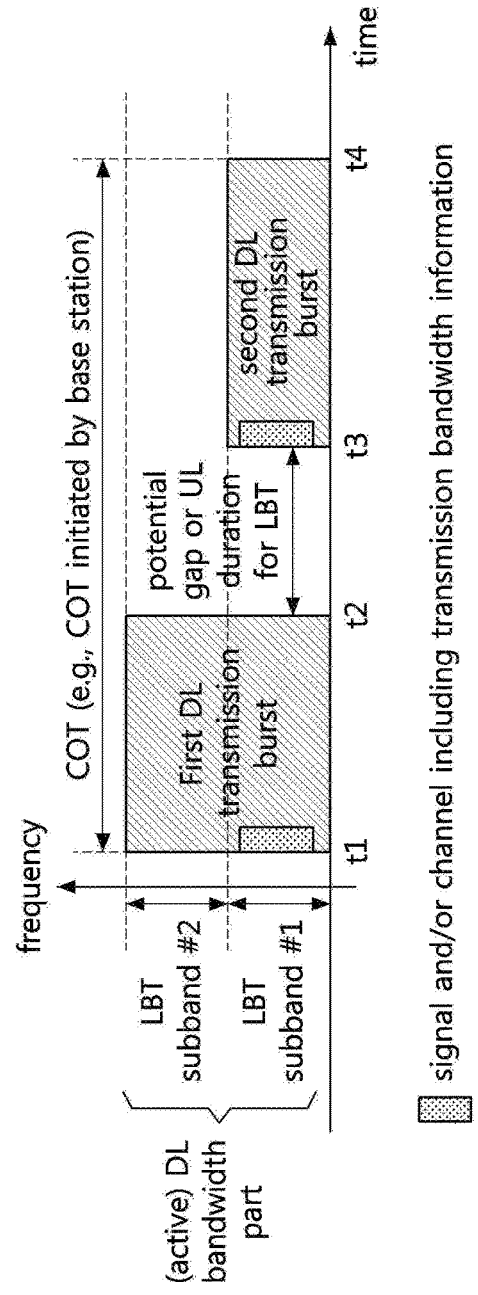

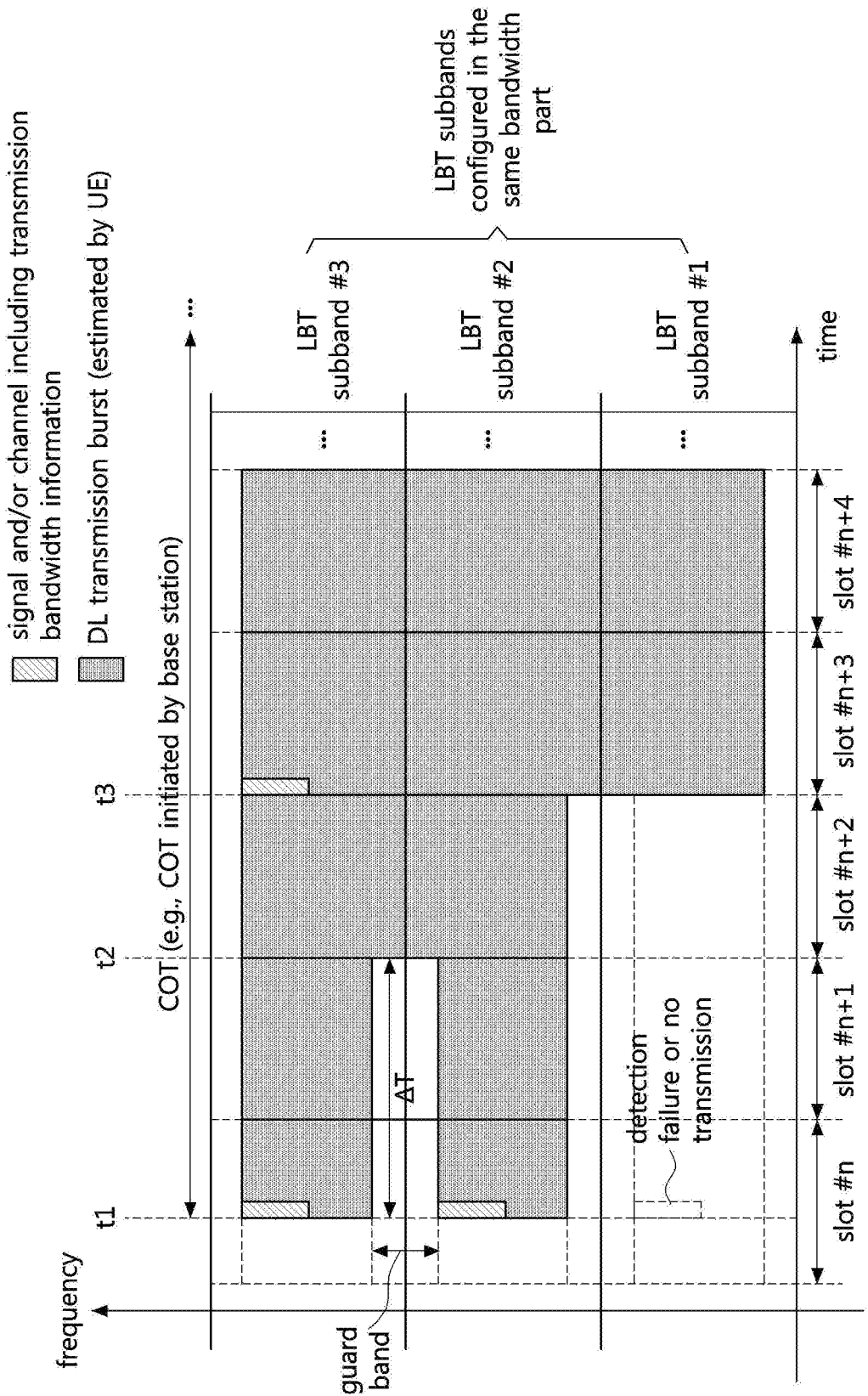

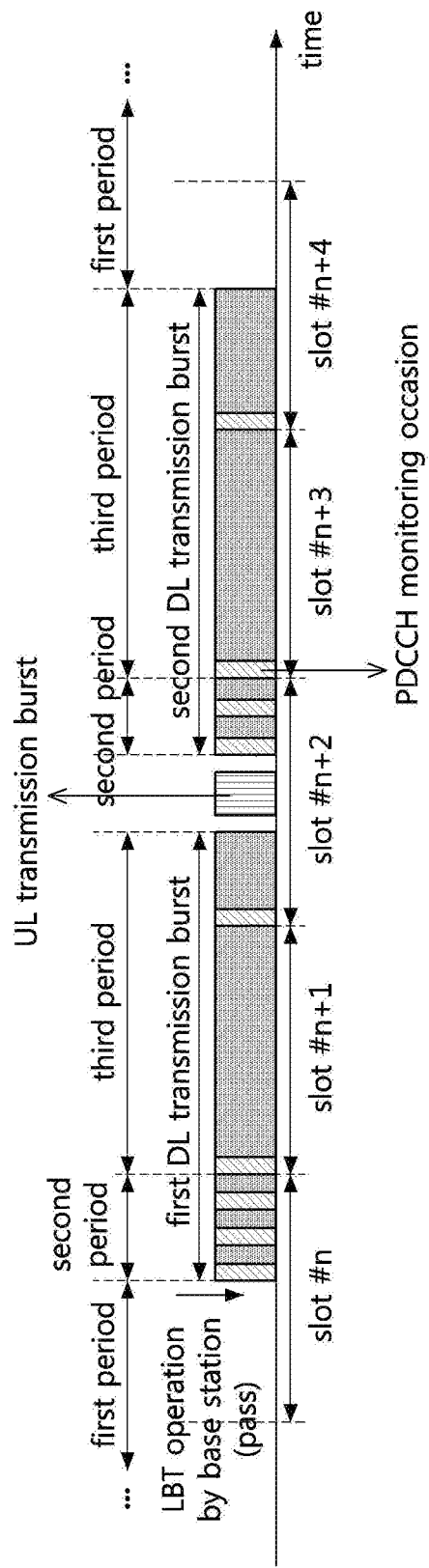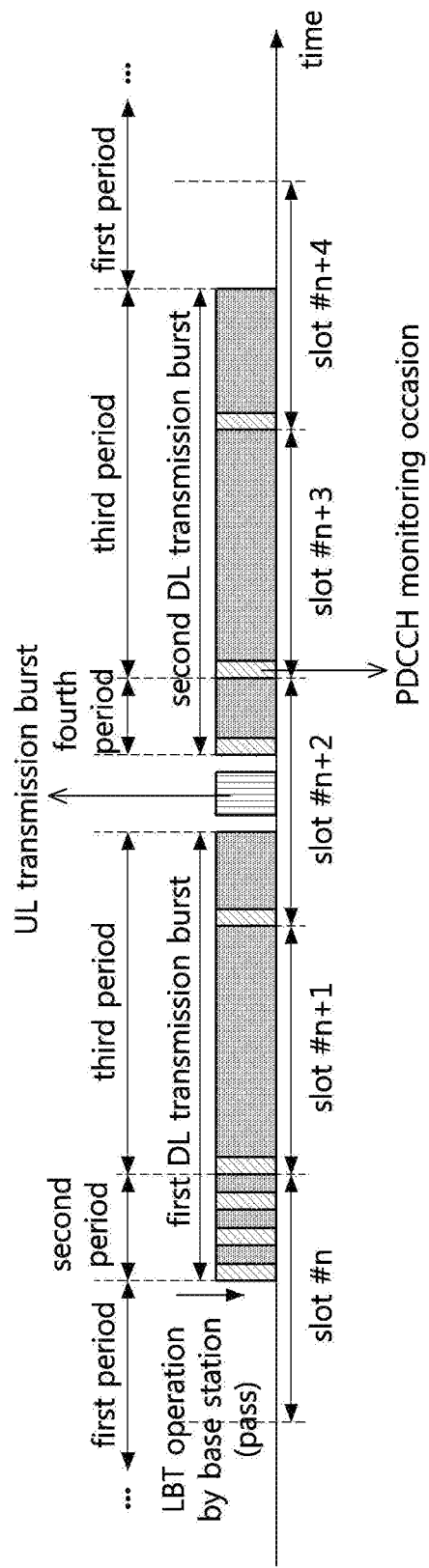

METHOD AND APPARATUS FOR TRANSMITTING AND RECEIVING CONTROL INFORMATION IN COMMUNICATION SYSTEM SUPPORTING UNLICENSED BAND

CROSS-REFERENCE TO RELATED APPLICATIONS

This application claims priority to Korean Patent Applications No. 10-2019-0023591 filed on Feb. 28, 2019, No. 10-2019-0025941 filed on Mar. 6, 2019, No. 10-2019-0036321 filed on Mar. 28, 2019, No. 10-2019-0057907 filed on May 17, 2019, No. 10-2019-0088937 filed on Jul. 23, 2019, No. 10-2019-0112412 filed on Sep. 10, 2019, No. 10-2019-0123880 filed on Oct. 7, 2019, No. 10-2019-0130068 filed on Oct. 18, 2019, No. 10-2019-0142866 filed on Nov. 8, 2019, No. 10-2019-0149873 filed on Nov. 20, 2019, and No. 10-2020-0018408 filed on Feb. 14, 2020 with the Korean Intellectual Property Office (KIPO), the entire contents of which are hereby incorporated by reference.

BACKGROUND

1. Technical Field

The present disclosure relates generally to techniques for transmitting and receiving control information in a communication system, and more specifically, to techniques of transmitting and receiving control information for channel access and occupation in a communication system supporting an unlicensed band.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

Meanwhile, communications through an unlicensed band may be used to process rapidly increasing wireless data. Currently, communication technologies that use unlicensed bands include LTE-Unlicensed (LTE-U), Licensed-Assisted-Access (LAA), MultiFire, and the like. In addition to the existing functions, the NR communication system can support a standalone mode that independently operates only in an unlicensed band. However, an initial access procedure, a signal transmission procedure, a channel access scheme suitable for a flexible frame structure, a wideband carrier operation, and the like in the unlicensed band are not yet clearly defined. In this reason, operations of a base station and terminals for the above-described technical elements need to be clearly defined.

SUMMARY

Accordingly, exemplary embodiments of the present disclosure provide methods and apparatuses for transmitting and receiving control information for channel access and occupation in a communication system supporting an unlicensed band.

An operation method of a terminal, according to a first exemplary embodiment of the present disclosure for achieving the above-described objective, may comprise receiving, from a base station, first configuration information of a control resource set (CORESET) and second configuration information of a search space associated with the CORESET; receiving, from the base station, third configuration information indicating one or more physical downlink control channel (PDCCH) monitoring resource sets associated with the CORESET and the search space; and performing a PDCCH monitoring operation on the one or more PDCCH monitoring resource sets, wherein each of the one or more PDCCH monitoring resource sets is located within each resource block (RB) set configured in an unlicensed band.

The remaining parameters excluding parameters indicating frequency domain resources among parameters included in the first configuration information and the second configuration information may be shared for the one or more PDSCCH monitoring resource sets.

The remaining parameters may include one or more among information indicating a duration of the CORESET, information indicating a control channel element (CCE)—resource element group (REG) mapping type, information indicating whether to apply interleaving in a CCE-REG mapping operation, information indicating a size of an REG bundle, interleaving rule information, a shift index, precoder granularity information, transmission configuration information (TCI) state information, information indicating whether a field indicating a TCI state is present in downlink control information (DCI), and a scrambling identifier of a PDCCH demodulation-reference signal (DM-RS).

The third configuration information may be a bitmap, and each bit included in the bitmap may indicate whether a PDCCH monitoring resource set is configured in an RB set.

The size of the bitmap may correspond to the number of RB sets configured within one bandwidth part.

Each of the one or more PDCCH monitoring resource sets may include one or more RBs, the one or more PDCCH monitoring resource sets may be located in frequency domain without overlapping, and one or more RB sets to which the one or more PDCCH monitoring resource sets belong may be located within one bandwidth part.

The CORESET may be a CORESET other than a CORESET configured through a physical broadcast channel (PBCH).

The operation method may further comprise receiving a PDCCH in at least one of the one or more PDCCH monitoring resource sets, wherein the at least one PDCCH monitoring resource set in which the PDCCH is received may be located within RB sets in which a listen before talk (LBT) operation performed by the base station is successful.

An operation method of a base station, according to a second exemplary embodiment of the present disclosure for achieving the above-described objective, may comprise transmitting, to a terminal, first configuration information of a control resource set (CORESET) and second configuration information of a search space associated with the CORESET; transmitting, to the terminal, third configuration information indicating one or more physical downlink control channel (PDCCH) monitoring resource sets associated with the CORESET and the search space; and transmitting a PDCCH through at least one of the one or more PDCCH monitoring resource sets, wherein each of the one or more PDCCH monitoring resource sets is located within each resource block (RB) set configured in an unlicensed band.

The remaining parameters excluding parameters indicating frequency domain resources among parameters included in the first configuration information and the second configuration information may be shared for the one or more PDSCCH monitoring resource sets.

The remaining parameters may include one or more among information indicating a duration of the CORESET, information indicating a control channel element (CCE)—resource element group (REG) mapping type, information indicating whether to apply interleaving in a CCE-REG mapping operation, information indicating a size of an REG bundle, interleaving rule information, a shift index, precoder granularity information, transmission configuration information (TCI) state information, information indicating whether a field indicating a TCI state is present in downlink control information (DCI), and a scrambling identifier of a PDCCH demodulation-reference signal (DM-RS).

The third configuration information may be a bitmap, and each bit included in the bitmap may indicate whether a PDCCH monitoring resource set is configured in an RB set.

Each of the one or more PDCCH monitoring resource sets may include one or more RBs, the one or more PDCCH monitoring resource sets may be located in frequency domain without overlapping, and one or more RB sets to which the one or more PDCCH monitoring resource sets belong may be located within one bandwidth part.

The CORESET may be a CORESET other than a CORESET configured through a physical broadcast channel (PBCH).

At least one PDCCH monitoring resource set in which the PDCCH is transmitted may be located within RB sets in which a listen before talk (LBT) operation performed by the base station is successful.

A terminal, according to a third exemplary embodiment of the present disclosure for achieving the above-described objective, may comprise a processor; a memory electronically communicating with the processor; and instructions stored in the memory, wherein when the instructions are executed by the processor, the instructions cause the terminal to: receive, from a base station, first configuration information of a control resource set (CORESET) and second configuration information of a search space associated with the CORESET; receive, from the base station, third configuration information indicating one or more physical downlink control channel (PDCCH) monitoring resource sets associated with the CORESET and the search space; and perform a PDCCH monitoring operation on the one or more PDCCH monitoring resource sets, wherein each of the one or more PDCCH monitoring resource sets is located within each resource block (RB) set configured in an unlicensed band.

The remaining parameters excluding parameters indicating frequency domain resources among parameters included in the first configuration information and the second configuration information may be shared for the one or more PDSCCH monitoring resource sets.

The third configuration information may be a bitmap, and each bit included in the bitmap may indicate whether a PDCCH monitoring resource set is configured in an RB set.

Each of the one or more PDCCH monitoring resource sets may include one or more RBs, the one or more PDCCH monitoring resource sets may be located in frequency domain without overlapping, and one or more RB sets to which the one or more PDCCH monitoring resource sets belong may be located within one bandwidth part.

The CORESET may be a CORESET other than a CORESET configured through a physical broadcast channel (PBCH).

According to the exemplary embodiments of the present disclosure, the base station may transmit to the terminal a bitmap indicating a listen before talk (LBT) subband(s) (e.g., resource block (RB) set (s)) in which at least one physical downlink control channel (PDCCH) monitoring occasion is configured. The terminal may receive the bitmap from the base station, and may identify the LBT subband(s) in which the PDCCH monitoring occasion is configured based on the bitmap. The signaling overhead can be reduced by using the bitmap in the signaling procedure between the base station and the terminal.

In addition, the PDCCH monitoring operation can be dynamically switched within the channel occupancy time (COT) initiated by the base station. Accordingly, the degree of freedom of arrangement of the uplink (UL) transmission burst period can increase. In addition, the base station can change (e.g., expand or reduce) the transmission bandwidth by performing the LBT operation within the COT. Thus, the efficiency of the spectrum usage can be improved, and the transmission performance can also be improved. That is, the performance of the communication system can be improved.

BRIEF DESCRIPTION OF DRAWINGS

FIG. 12B is a conceptual diagram illustrating a second exemplary embodiment of a method of changing a downlink transmission bandwidth and a method of indicating a transmission bandwidth within a COT initiated by a base station.

FIG. 13A is a conceptual diagram illustrating a third exemplary embodiment of a method of changing a downlink transmission bandwidth and a method of indicating a transmission bandwidth within a COT initiated by a base station.

FIG. 14 is a conceptual diagram illustrating a fifth exemplary embodiment of a method of changing a downlink transmission bandwidth and a method of indicating a transmission bandwidth within a COT initiated by a base station.

FIG. 17A is a conceptual diagram illustrating a third exemplary embodiment of a dynamic change method of a PDCCH monitoring operation.

FIG. 17B is a conceptual diagram illustrating a fourth exemplary embodiment of a dynamic change method of a PDCCH monitoring operation.

DETAILED DESCRIPTION OF THE EMBODIMENTS

Figure 1:
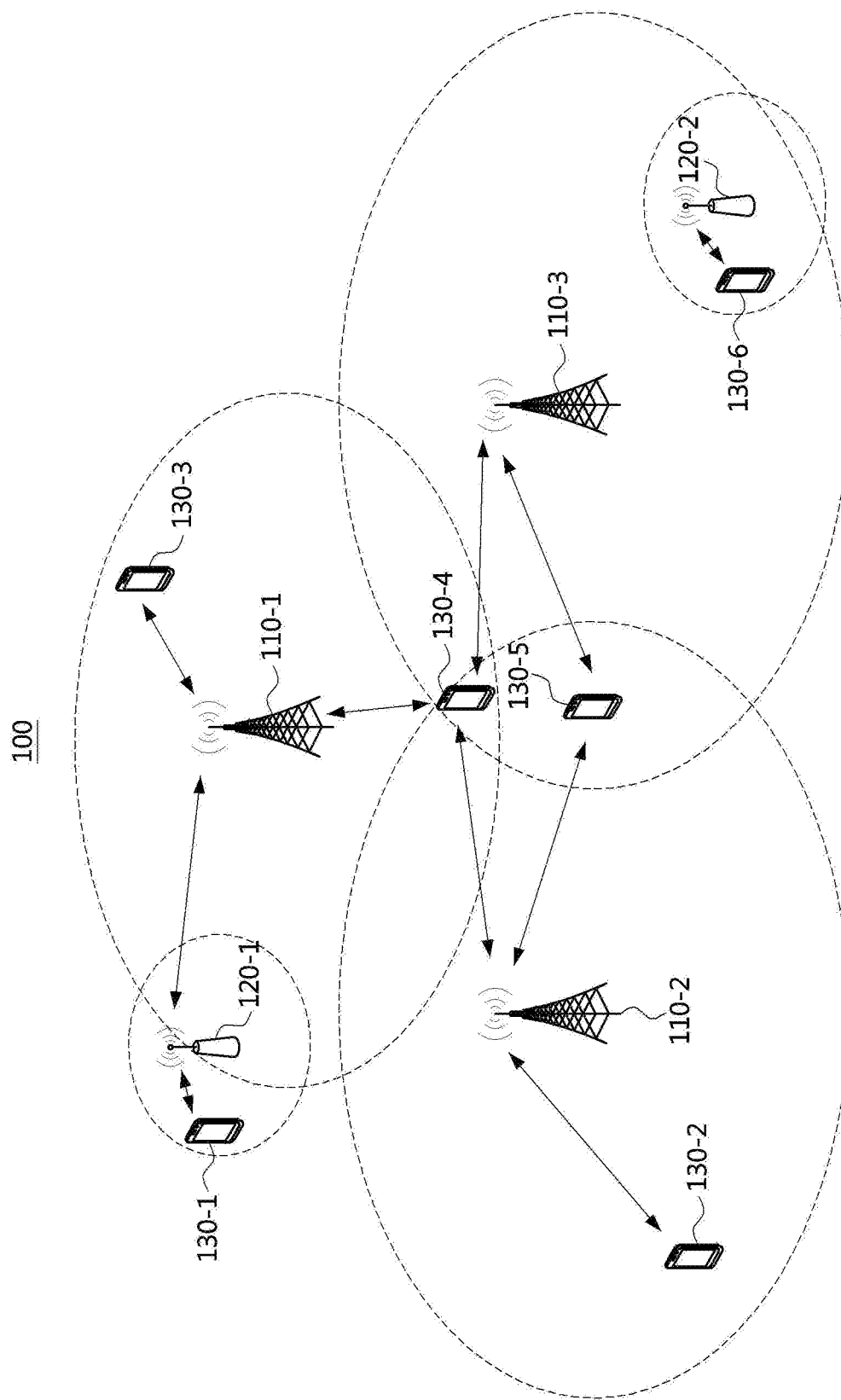
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3$^{rd}$ generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
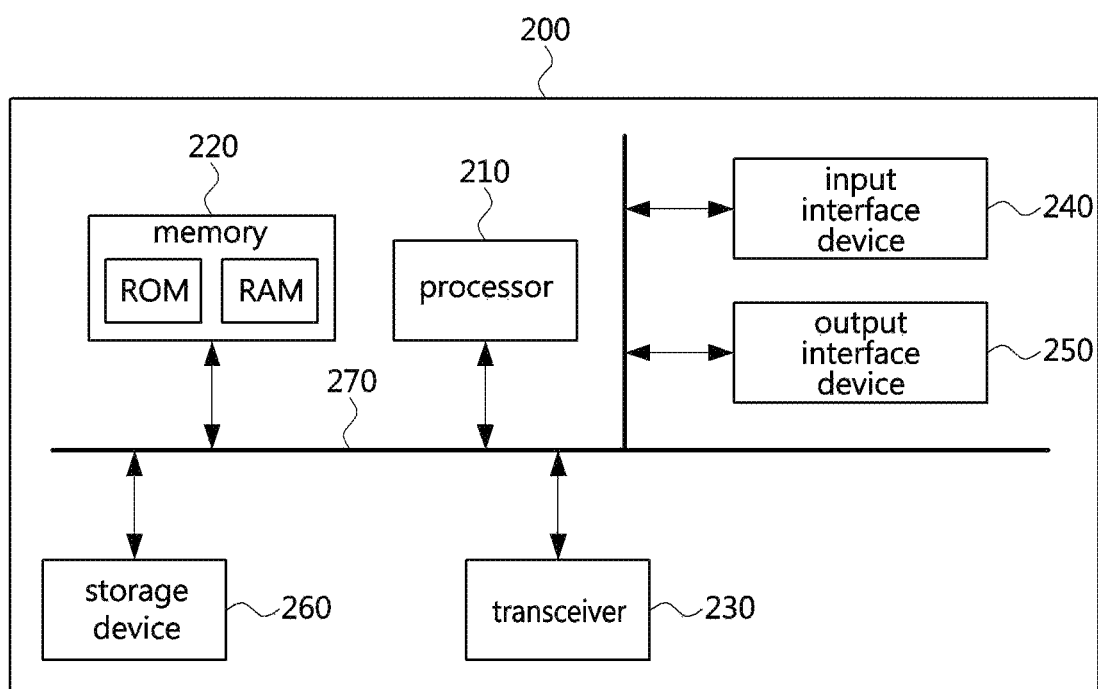
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system (e.g., NR communication system) may support one or more services among an enhanced mobile broadband (eMBB) service, an ultra-reliable and low-latency communication (URLLC) service, and a massive machine type communication (mMTC) service. The communications may be performed to satisfy technical requirements of the services in the communication system. In the URLLC service, the requirement of the transmission reliability may be $1\text{-}10^5$, and the requirement of the uplink and downlink user plane latency may be 0.5 ms.

In the following exemplary embodiments, a channel occupancy method, a method of transmitting and receiving control information related to a channel occupancy time, etc. in a communication system supporting an unlicensed band will be described. The exemplary embodiments below may also be applied to other communication systems (e.g., LTE communication system) as well as the NR communication system.

The NR communication system may support a wider system bandwidth (e.g., carrier bandwidth) than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in the frequency band of 6 GHz or below, and support a carrier bandwidth of up to 400 MHz in the frequency band of 6 GHz or above.

A numerology applied to physical signals and channels in the communication system (e.g., NR communication system) may be scalable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have a power of two multiplication relationship, and the CP length may be scaled at the same ratio as the OFDM symbol length. Depending on a frequency band in which the communication system operates, some of the numerologies of Table 1 may be supported. When the subcarrier spacing is 60 kHz, an extended CP may be additionally supported.

TABLE 1

| Subcarrier spacing | 15 kHz | 30 kHz | 60 kHz | 120 kHz | 240 kHz |
|---|---|---|---|---|---|
| OFDM symbol length [µs] | 66.7 | 33.3 | 16.7 | 8.3 | 4.2 |
| CP length [µs] | 4.76 | 2.38 | 1.19 | 0.60 | 0.30 |
| Number of OFDM symbols within 1 ms | 14 | 28 | 56 | 112 | 224 |

In the following description, a frame structure in the communication system will be described. In the time domain, a building block may be a subframe, a slot, and/or a minislot. The subframe may be used as a transmission unit, and the length of the subframe may have a fixed value (e.g., 1 ms) regardless of the subcarrier spacing. When a normal CP is used, the slot may comprise consecutive symbols (e.g., 14 OFDM symbols). The length of the slot may be variable differently from the length of the subframe, and may be inversely proportional to the subcarrier spacing. The slot may be used as a scheduling unit and may be used as a configuration unit of scheduling and hybrid automatic repeat request (HARQ) timing. The length of the actual time resource used for each scheduling may not match the length of the slot.

The base station may schedule a data channel (e.g., physical downlink shared channel (PDSCH), physical uplink shared channel (PUSCH), or physical sidelink shared channel (PSSCH)) using a part or all of symbols constituting a slot. Alternatively, the base station may schedule a data channel using a plurality of slots. A minislot may be used as a transmission unit, and the length of the minislot may be set shorter than the length of a slot. For example, the minislot may be a scheduling or transmission unit having a length shorter than that of a slot. A slot having a length shorter than the length of the conventional slot may be referred to as a 'minislot' in the communication system. The minislot-based scheduling operation may be used for transmission of a partial slot, URLLC data transmission, analog beamforming-based multi-user scheduling, etc. in an unlicensed band or a coexistence band of the NR communication system and the LTE communication system. In the NR communication system, a physical downlink control channel (PDCCH) monitoring periodicity and/or a duration of a data channel may be configured to be shorter than the existing slot, so that the minislot-based transmission can be supported.

In the frequency domain of the NR communication system, a building block may be a physical resource block (PRB). One PRB may comprise consecutive subcarriers (e.g., 12 subcarriers) regardless of the numerology. Thus, a bandwidth occupied by one PRB may be proportional to the subcarrier spacing of the numerology. The frequency length of the PRB may be reduced. In this case, the PRB may be used as a resource allocation unit of a control channel and/or a data channel in a data channel domain. The minimum resource allocation unit of the downlink control channel may be a control channel element (CCE). One CCE may include one or more PRBs. Resource allocation for a data channel may be performed in unit of a PRB or a resource block group (RBG). One RBG may include one or more consecutive PRBs.

A slot (e.g., slot format) may be composed of a combination of one or more of downlink period, flexible period (or unknown period), and an uplink period. Each of the downlink period, the flexible period, and the uplink period may be comprised of one or more consecutive symbols. The flexible period may be located between a downlink period and an uplink period, between a first downlink period and a second downlink period, or between a first uplink period and a second uplink period. When the flexible period is inserted between the downlink period and the uplink period, the flexible period may be used as a guard period.

One slot may include a plurality of flexible periods. Alternatively, one slot may not include a flexible period. The terminal may perform a predefined operation or an operation configured by the base station semi-statically or periodically (e.g., PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, or the like) in a flexible period until the corresponding flexible period is overridden to be a downlink period or an uplink period. Alternatively, the terminal may not perform any operation in the corresponding flexible period until the corresponding flexible period is overridden to be a downlink period or an uplink period.

The slot format may be configured semi-statically by higher layer signaling (e.g. radio resource control (RRC) signaling). Information indicating a semi-static slot format may be included in system information, and the semi-static slot format may be configured in a cell-specific manner. For example, a cell-specific slot format may be configured through an RRC parameter 'TDD-UL-DL-ConfigCommon'. In addition, the slot format may be additionally configured for each terminal through terminal-specific (i.e., UE-specific) higher layer signaling (e.g., RRC signaling). For example, a UE-specific slot format may be configured through an RRC parameter 'TDD-UL-DL-ConfigDedicated'. The flexible period of the slot format configured in the cell-specific manner may be overridden by the terminal-specific higher layer signaling to a downlink period or an uplink period. Also, the slot format may be dynamically indicated by a slot format indicator (SFI) included in downlink control information (DCI).

The terminal may perform downlink operations, uplink operations, and sidelink operations in a bandwidth part. The bandwidth part may be defined as a set of consecutive PRBs having a specific numerology in the frequency domain. Only one numerology may be used for transmission of a control channel or a data channel in one bandwidth part. The terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a starting PRB of the bandwidth part and information indicating the number of PRBs constituting the bandwidth part. At least one bandwidth part among the bandwidth part(s) configured to the terminal may be activated. For example, within one carrier, one uplink bandwidth part and one downlink bandwidth part may be activated respectively. In a time division duplex (TDD) based communication system, a pair of one uplink bandwidth part and one downlink bandwidth part may be activated. The base station may configure a plurality of bandwidth parts to the terminal within one carrier, and may switch the active bandwidth part of the terminal.

In the exemplary embodiments, the expression that a certain frequency band (e.g., carrier, bandwidth part, listen before talk (LBT) subband, guard band, etc.) is activated may mean that the certain frequency band is in a state in which a base station or a terminal can transmit or receive a signal by using the corresponding frequency band. In addition, an expression that a certain frequency band is activated may mean that the certain frequency band is in a state in which a radio frequency (RF) filter (e.g., band pass filter) of a transceiver is operating including the frequency band.

The minimum resource unit constituting a PDCCH may be a resource element group (REG). The REG may be composed of one PRB (e.g., 12 subcarriers) in the frequency domain and one OFDM symbol in the time domain. Thus, one REG may include 12 resource elements (REs). A demodulation reference signal (DMRS) for demodulating the PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be continuous or discontinuous in the frequency domain. One DCI (e.g., one PDCCH) may be transmitted within one CORESET. A plurality of CORESETs may be configured with respect to a cell and a terminal, and the plurality of CORESETs may overlap in time-frequency resources.

The CORESET may be configured to the terminal by a PBCH (e.g., system information transmitted through the PBCH). The identifier (ID) of the CORESET configured by the PBCH may be 0. That is, the CORESET configured by the PBCH may be referred to as a CORESET #0. The terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured to the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured to the terminal by terminal-specific higher layer signaling (e.g., RRC signaling).

In each downlink bandwidth part, one or more CORESETs may be configured for the terminal. Here, the expression that the CORESET is configured in the bandwidth part may mean that the CORESET is logically associated with the bandwidth part and the terminal monitors the corresponding CORESET in the bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH.

A PDCCH candidate constituting the search space may consist of CCEs selected by a predefined hash function within an occasion of the CORESET or the search space. The search space may be defined and configured for each CCE aggregation level. In this case, a set of search spaces for all CCE aggregation levels may be referred to as a 'search space set'. In the exemplary embodiments, 'search space' may mean 'search space set', and 'search space set' may mean 'search space'.

A search space set may be logically associated with one CORESET. One CORESET may be logically associated with one or more search space sets. A common search space set configured through the PBCH may be used to monitor a DCI scheduling a PDSCH for transmission of the SIB1. The ID of the common search space set configured through the PBCH may be set to 0. That is, the common search space set configured through the PBCH may be defined as a type 0 PDCCH common search space set or a search space set #0. The search space set #0 may be logically associated with the CORESET #0.

The search space set may be classified into a common search space set and a terminal-specific (i.e., UE-specific) search space set. A common DCI may be transmitted in the common search space set, and a terminal-specific DCI may be transmitted in the terminal-specific search space set. Considering degree of freedom in scheduling and/or fallback transmission, a terminal-specific DCI may also be transmitted in the common search space set. For example, the common DCI may include resource allocation information of a PDSCH for transmission of system information, paging, power control commands, slot format indicator (SFI), pre-emption indicator, and the like. The terminal-specific DCI may include PDSCH resource allocation information, PUSCH resource allocation information, and the like. A plurality of DCI formats may be defined according to the payload and the size of the DCI, the type of radio network temporary identifier (RNTI), or the like.

In the exemplary embodiments below, the common search space may be referred to as 'CSS', and the common search space set may be referred to as 'CSS set'. Also, in the exemplary embodiments below, the terminal-specific search space may be referred to as 'USS', and the terminal-specific search space set may be referred to as 'USS set'.

Exemplary embodiments of the present disclosure may be applied to various communication scenarios using an unlicensed band. For example, with assistance of a primary cell in a licensed band, a cell in the unlicensed band may be configured as a secondary cell, and a carrier in the secondary cell may be aggregated with another carrier. Alternatively, a cell in the unlicensed cell (e.g., secondary cell) and a cell in the licensed band (e.g., primary cell) may support dual connectivity operations. Accordingly, the transmission capacity can be increased. Alternatively, a cell in the unlicensed band may independently perform functions of a primary cell. Alternatively, a downlink carrier of the licensed band may be combined with an uplink carrier of the unlicensed band, and the combined carriers may perform functions as one cell. On the other hand, an uplink carrier of the licensed band may be combined with a downlink carrier of the unlicensed band, and the combined carriers may perform functions as one cell. In addition, exemplary embodiments of the present disclosure may be applied to other communication system (e.g., communication systems supporting the licensed band) as well as communication systems supporting unlicensed bands.

In the communications in unlicensed bands, a contention-based channel access scheme may be used to satisfy spectrum regulation conditions and coexist with existing communication nodes (e.g., Wi-Fi stations). For example, a communication node desiring to access a channel in an unlicensed band may identify a channel occupancy state by performing a clear channel assessment (CCA) operation. A transmitting node (e.g., communication node performing a transmitting operation) may determine whether a channel is in a busy or idle state based on a predefined (or preconfigured) CCA threshold. When the state of the channel is the idle state, the transmitting node may transmit a signal and/or a channel in the corresponding channel. The above-described operation may be referred to as 'listen before talk (LBT) operation'.

The LBT operation may be classified into four categories according to whether the LBT operation is performed and how it is applied. The first category (e.g., LBT category 1) may be a scheme in which the transmitting node does not perform the LBT operation. That is, when the category 1 is used, the transmitting node may transmit a signal and/or a channel without performing the channel sensing operation (e.g., CCA operation). The second category (e.g., LBT category 2) may be a scheme in which the transmitting node performs the LBT operation without a random back-off operation. The LBT category 2 may be referred to as 'one-shot LBT operation'. The third category (e.g., LBT category 3) may be a scheme in which the transmitting node performs the LBT operation based on a random backoff value (e.g., random backoff counter) according to a contention window (CW) of a fixed size. The fourth category (e.g., LBT category 4) may be a scheme in which the transmitting node performs the LBT operation based on a random backoff value according to a contention window of a variable size.

The LBT operation may be performed in unit of a specific frequency bundle. The frequency bundle may be referred to as 'LBT subband', 'subband', or 'resource block (RB) set'. In the following exemplary embodiments, an LBT subband or subband may mean an RB set. Here, the LBT operation may include the above-described CCA operation. Alternatively, the LBT operation may include 'CCA operation+ transmission operation of a signal and/or a channel according to the CCA operation'. The bandwidth of the LBT subband may vary depending on a spectrum regulation, a frequency band, a communication system, an operator, a manufacturer, etc. For example, in a band where Wi-Fi stations and 3GPP terminals coexist, the bandwidth of the LBT subband may be 20 MHz (or about 20 MHz). The communication node may perform the channel sensing operation and/or the data transmission operation according to the channel sensing operation in unit of 20 MHz (or about 20 MHz).

For example, the LBT subband may be a set of contiguous RBs corresponding to about 20 MHz. In this case, the bandwidth of the set of contiguous RBs may not exceed 20 MHz. In the following exemplary embodiments, an expression that the LBT subband is $X_L$ MHz may mean that the bandwidth of the LBT subband is $X_L$ MHz or about $X_L$ MHz. Unless stated otherwise, $X_L$ may be assumed to be 20. In the following exemplary embodiments, an RB may mean a PRB constituting a bandwidth part in some cases. Alternatively, an RB may mean a common RB (CRB) or a virtual RB (VRB). In particular, when the RB is used in the sense of an RB constituting a carrier, the RB may mean a CRB constituting the carrier. In the NR communication system, the CRB may refer to an RB on a common RB grid configured to the terminal based on a 'Point A'.

In consideration of the LBT operation described above, the bandwidth of the carrier and/or bandwidth part configured to the terminal may be configured in multiples of $X_L$. For example, the carrier and/or bandwidth part may be configured as 20, 40, 60, 80 MHz, or the like. In the following exemplary embodiments, an expression that the carrier and/or bandwidth part is X MHz may mean that the bandwidth of the carrier and/or bandwidth part is either X MHz or about X MHz. For example, the carrier and/or bandwidth part may comprise a set of contiguous RBs corresponding to about X MHz. The carrier and/or bandwidth part in the NR communication system may be defined as a set of CRBs in the common RB grid. The bandwidth part may be configured within one carrier. Alternatively, the bandwidth part may be configured to include a plurality of carriers. When the bandwidth part includes a plurality of carriers, the bandwidth part may be logically associated with the plurality of carriers.

Figure 3A:
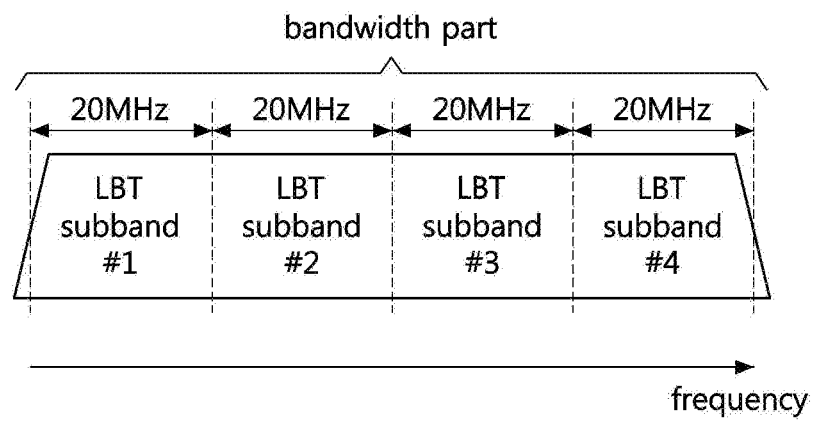
FIG. 3A is a conceptual diagram illustrating a first exemplary embodiment of a bandwidth part in a communication system.
Figure 3B:
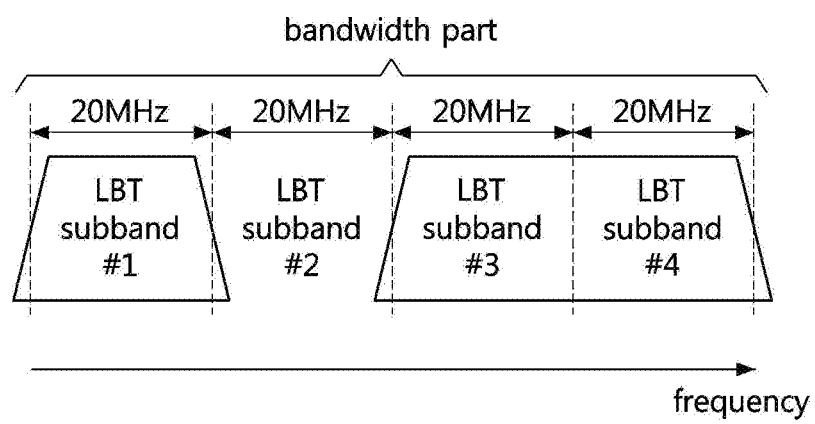
FIG. 3B is a conceptual diagram illustrating a second exemplary embodiment of a bandwidth part in a communication system.
Figure 3C:
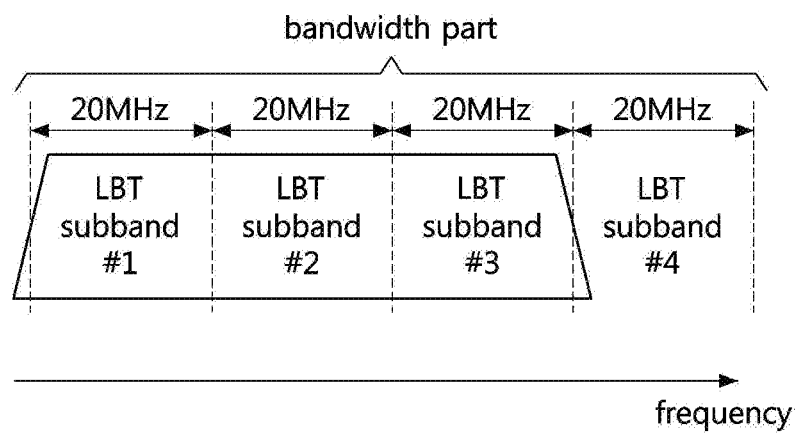
FIG. 3C is a conceptual diagram illustrating a third exemplary embodiment of a bandwidth part in a communication system.

FIG. 3A is a conceptual diagram illustrating a first exemplary embodiment of a bandwidth part in a communication system, FIG. 3B is a conceptual diagram illustrating a second exemplary embodiment of a bandwidth part in a communication system, and FIG. 3C is a conceptual diagram illustrating a third exemplary embodiment of a bandwidth part in a communication system.

Referring to FIGS. 3A to 3C, one bandwidth part may include a plurality of LBT subbands. For example, one bandwidth part may include four LBT subbands, and each LBT subband may have a bandwidth of 20 MHz. That is, $X_L$=20. A transmitting node (e.g., base station or terminal) may perform a CCA operation on an LBT subband basis before transmitting a signal and/or a channel Depending on a result of the CCA operation, a channel(s) corresponding to a part of the bandwidth part or the entire bandwidth part may be occupied by the transmitting node, and the occupied channel(s) may be used for transmission of a signal and/or a channel.

In the exemplary embodiment shown in FIG. 3A, the LBT operation performed by the transmitting node may succeed in all the LBT subbands with the bandwidth part. In this case, the transmitting node may transmit a signal and/or a channel using the entire band of the bandwidth part. In the exemplary embodiment shown in FIG. 3B, the LBT operation performed by the transmitting node may succeed in the LBT subbands #1, #3, and #4 belonging to the bandwidth part. In this case, the transmitting node may transmit a signal and/or a channel using the LBT subbands #1, #3, and #4.

In the exemplary embodiment shown in FIG. 3C, the LBT operation performed by the transmitting node may succeed in the LBT subbands #1, #2, and #3 belonging to the bandwidth part. In this case, the transmitting node may transmit a signal and/or a channel using the LBT subbands #1, #2, and #3. In the exemplary embodiments, the success of the LBT operation may mean that the channel is determined to be in idle state as a result of the LBT operation (e.g., CCA operation) performed by the communication node (e.g., transmitting node). On the other hand, the failure of the LBT operation may mean that the channel is determined to be in occupied state as a result of the LBT operation (e.g., CCA operation) performed by the communication node (e.g., transmitting node).

Meanwhile, a guard band may be inserted between LBT subbands included in a carrier and/or a bandwidth part. The transmitting node may transmit a signal in a frequency region excluding the guard band in an occupied LBT subband. Thus, a normal channel sensing operation in an unoccupied LBT subband may be guaranteed. For example, in the exemplary embodiment shown in FIG. 3B, to ensure a normal channel sensing operation in the LBT subband #2, guard bands may be inserted in the LBT subbands #1 and #3, and the transmitting node may not transmit a signal and/or a channel in the corresponding guard bands in the LBT subbands #1 and #3. Therefore, interferences caused to the LBT subband #2 by the communication using the LBT subband #1 and/or the LBT subband #3 can be minimized.

In the exemplary embodiment shown in FIG. 3C, to ensure a normal channel sensing operation in the LBT subband #4, a guard band may be inserted in the LBT subband #3, and the transmitting node may not transmit a signal and/or a channel in the corresponding guard band in the LBT subband #3. Therefore, interferences caused to the LBT subband #4 by the communication using the LBT subband #3 can be minimized. The guard band described above may be referred to as 'in-carrier guard band' to distinguish it from guard bands that are typically located outside a carrier bandwidth.

Information on composition of LBT subbands belonging to a carrier and bandwidth part may be predefined for each 'channel' to which the carrier and bandwidth part are allocated. In addition, configuration information of guard bands belonging to a carrier and bandwidth part may be predefined for each 'channel' to which the carrier and bandwidth part are allocated. The configuration information of LBT subbands and the configuration information of guard bands may include information indicating the number of LBT subbands constituting the carrier and/or bandwidth part, information related to a set of RB(s) constituting each LBT subband, information indicating the number of guard bands constituting the carrier and/or bandwidth part, information related to a set of RB(s) constituting each guard band, and the like. For example, in case of the subcarrier spacing of 30 kHz, a bandwidth of one 20 MHz LBT subband may be defined to correspond to 51 consecutive RBs. In case of the subcarrier spacing of 15 kHz, a bandwidth of one 20 MHz LBT subband may be defined to correspond to 106 consecutive RBs. The configuration information of LBT subbands and/or the configuration information of guard bands may be shared in advance between the base station and the terminal.

Alternatively, the base station may transmit one or more information elements (e.g., one or more parameters) among the configuration information of LBT subbands and the configuration information of guard bands to the terminal through signaling. For example, the information related to a set of RB(s) constituting each LBT subband in the carrier and/or the information indicating the number of LBT subbands in the carrier may be signaled to the terminal. For another example, the information related to a set of RB(s) constituting each guard band in the carrier and/or the information indicating the number of guard bands may be signaled to the terminal. Alternatively, all of the information on LBT subbands and the information on guard bands may be signaled to the terminal. In this case, the minimum number of RBs that the guard band can have may be zero. For example, a starting RB index of a certain guard band may be set to be the same as an ending RB index thereof, and the terminal may receive configuration information of the corresponding guard band from the base station. In this case, the terminal may regard the size of the guard band as zero. That is, LBT subbands logically adjacent to the guard band may be physically adjacent to each other without the guard band. The configuration information (e.g., composition information) of guard bands may be signaled to the terminal together with the configuration information of the carrier and/or bandwidth part.

A union of RBs constituting the LBT subband(s) and guard band(s) may be the same as the set of RBs constituting the carrier or bandwidth part (hereinafter, collectively referred to as 'carrier'). That is, each RB constituting the carrier may belong to at least one LBT subband or guard band. At the same time or separately, the sets of the RBs constituting the respective LBT subbands and guard bands may be disjoint sets (i.e., the intersection thereof may be a null set). That is, each RB constituting the carrier may belong to only one LBT subband or only one guard band. Alternatively, the LBT subbands and guard bands may have an intersection with each other. That is, a certain RB may belong to a plurality of LBT subbands. Alternatively, a certain RB may belong to both LBT subband(s) and guard band(s).

In the exemplary embodiments, 'signaling' may refer to a combination of one or more among physical layer (PHY) signaling (e.g., DCI), medium access control (MAC) signaling (e.g., MAC control element (CE)), RRC signaling (e.g., a master information block (MIB), a system information block (SIB), cell-specific RRC signaling, terminal-specific RRC signaling, etc.), and the like. In addition, in the following description, unless otherwise indicated, 'signaling (or configuration)' may mean both signaling (or configuration) by an explicit scheme and signaling (or configuration) by an implicit scheme.

In unlicensed band communication, the transmitting node may occupy a channel for a time, when the LBT operation is successful. In this case, a channel occupancy time or a channel occupancy period may be referred to as 'channel occupancy time (COT)'. The expression that the transmitting node succeeds in the LBT operation may mean that the transmitting node acquires a COT. The transmitting node may transmit a signal and/or a channel using a part of the COT or the entire COT initiated by the transmitting node. In addition, the COT initiated by the transmitting node may be shared with a receiving node (e.g., a communication node performing a reception operation). Within the COT shared between the transmitting node and the receiving node, the receiving node may not only perform a reception operation but also perform a transmission operation. Accordingly, the transmitting node may not only perform a transmission operation but also perform a reception operation within the shared COT. In the exemplary embodiments, the 'transmitting node' may refer to a node that started or initiated a COT (e.g., initiating node), and the 'receiving node' may refer to a node that transmits and receives a signal within the corresponding COT without starting or initiating the corresponding COT.

The terminal may transmit a data channel in the guard band within the carrier or bandwidth part. Alternatively, the terminal may not transmit a data channel in the guard band within the carrier or bandwidth part. The terminal may determine whether to transmit a data channel in the guard band within the carrier or bandwidth part according to a time period within the COT or a transmission burst period. The guard bands (e.g., guard RB(s)) may be regarded as a reserved resource. The guard RB(s) may be configured as a reserved resource, and the terminal may transmit or receive a data channel (e.g., PUSCH, PDSCH, PSSCH) by performing a rate matching operation in the reserved resource. The terminal may map the data channel to a resource region excluding the reserved resource, and transmit the mapped data channel The above-described operation of the terminal may be performed when a part of the reserved resource or the entire reserved resource is included in a resource region of the data channel.

Figure 4A:
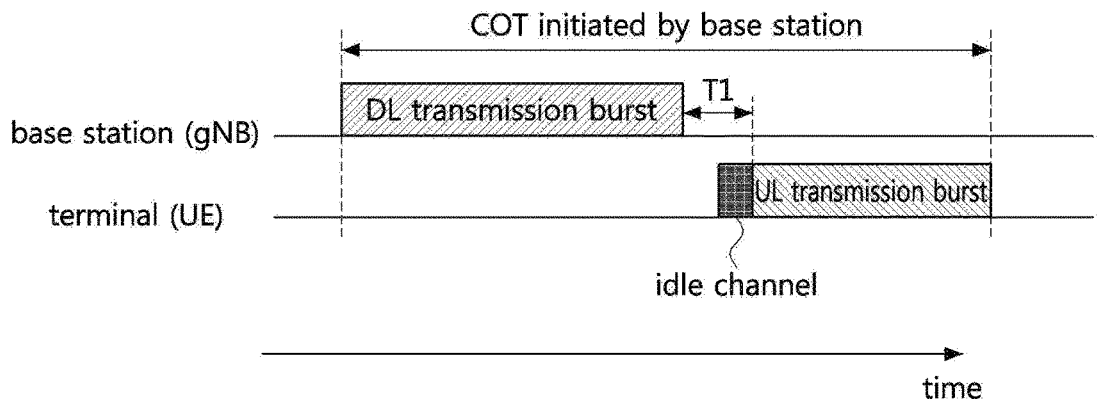
FIG. 4A is a conceptual diagram illustrating a first exemplary embodiment of a method for communications within a COT.

FIG. 4A is a conceptual diagram illustrating a first exemplary embodiment of a method for communications within a COT.

Referring to FIG. 4A, a base station (e.g., gNB) may acquire a COT by performing a CCA operation. The base station may transmit a downlink transmission burst at the beginning part of the COT. The downlink transmission burst may be a set of consecutive downlink signals and/or channels in the time domain. An uplink transmission burst may be a set of consecutive uplink signals and/or channels in the time domain. The expression that the signals and/or channels constituting the downlink transmission burst and the uplink transmission burst are consecutive in the time domain may mean that a gap between transmissions of the signals and/or channels is less than or equal to a reference value. For example, the reference value may be 0 or 16 µs. The COT initiated by the base station may be shared with a terminal. The terminal may transmit an uplink transmission burst within the shared COT.

In this case, the terminal may perform an LBT operation for transmission of the uplink transmission burst. For example, the terminal may perform a CCA operation after the transmission of the downlink transmission burst is completed. When it is determined that a channel state is idle as a result of the CCA operation, the terminal may transmit the uplink transmission burst. Alternatively, the terminal may transmit the uplink transmission burst without performing a CCA operation. For example, when a time interval (e.g., T1) between the downlink transmission burst and the uplink transmission burst is equal to or less than a preconfigured value (e.g., 16 µs), the terminal may transmit the uplink transmission burst without performing a CCA operation. T1 may be a time interval between an ending time point of the downlink transmission burst and a starting time point of the uplink transmission burst.

Figure 4B:
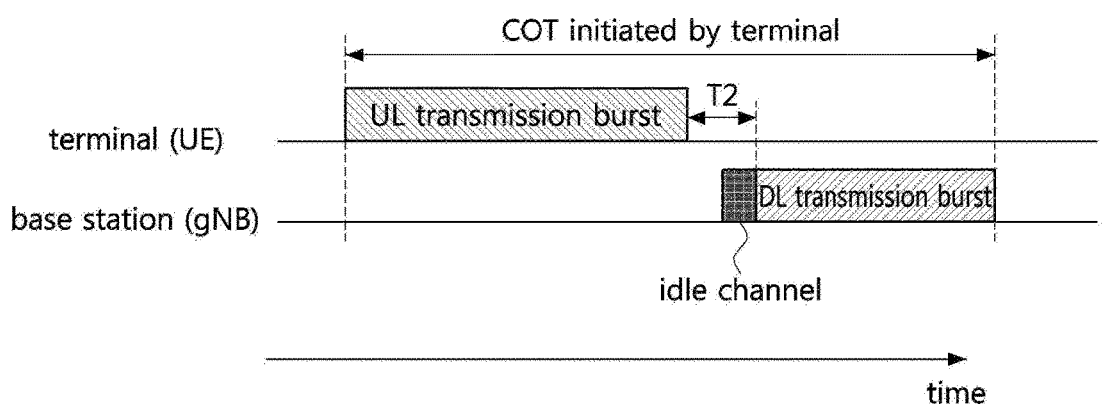
FIG. 4B is a conceptual diagram illustrating a second exemplary embodiment of a method for communications within a COT.

FIG. 4B is a conceptual diagram illustrating a second exemplary embodiment of a method for communications within a COT.

Referring to FIG. 4B, the terminal may acquire a COT by performing a CCA operation. The terminal may transmit an uplink transmission burst at the beginning part of the COT. The COT initiated by the terminal may be shared with the base station. The base station may transmit a downlink transmission burst within the shared COT. In this case, the base station may perform an LBT operation for transmission of the downlink transmission burst. For example, the base station may perform the CCA operation after the transmission of the uplink transmission burst is completed. When it is determined that a channel state is idle as a result of the CCA operation, the base station may transmit the downlink transmission burst. Alternatively, the base station may transmit the uplink transmission burst without performing a CCA operation. For example, when a time interval (e.g., T2) between the uplink transmission burst and the downlink transmission burst is equal to or less than a preconfigured value (e.g., 16 µs), the base station may transmit the downlink transmission burst without performing a CCA operation. T2 may be a time interval between an ending time point of the uplink transmission burst and a starting time point of the downlink transmission burst.

The maximum occupancy time (or maximum signal-transmittable time) of the channel according to the CCA operation may be defined as a maximum COT (MCOT). In exemplary embodiments, the MCOT of the channel according to the CCA operation performed by the base station may be referred to as 'downlink MCOT', and the MCOT of the channel according to the CCA operation performed by the terminal may be referred to as 'uplink MCOT'. Therefore, the COT initiated by the base station may not exceed the downlink MCOT, and the COT initiated by the terminal may not exceed the uplink MCOT. The downlink MCOT may be predefined in the technical specification depending on a spectrum regulation, a channel access priority class, and the like. The uplink MCOT may be predefined in the technical specification depending on a spectrum regulation, a channel access priority class, and the like. Alternatively, the base station may inform the terminal of the uplink MCOT.

The transmitting node (or receiving node) may inform the receiving node (or transmitting node) of information (e.g., configuration information of COT)) on the COT acquired by itself through a signaling procedure (e.g., DCI signaling, uplink control information (UCI) signaling, RRC signaling, etc.). The configuration information of the COT may include a starting time point of the COT, an ending time point of the COT, a duration of the COT (e.g., a length of the COT), and the like. The configuration information of the COT that the transmitting node (or receiving node) informs the receiving node (or transmitting node) may be different from information on the COT actually acquired by the transmitting node. The configuration information of the COT may be dynamically indicated, semi-statically configured, or predefined and shared between the nodes in advance.

For example, the base station may inform the terminal of the configuration information of the COT initiated by the base station. In this case, a specific operation of the terminal may depend on the configuration information of the COT received from the base station. For example, a PDCCH monitoring operation within the COT configured by the base station may be different from a PDCCH monitoring operation outside the COT configured by the base station. Specifically, outside the COT, the terminal may perform a blind decoding operation on DM-RS(s) of PDCCH candidate(s) and may not perform a blind decoding operation on data of the PDCCH candidate(s). In addition, the terminal may perform a PDCCH monitoring operation for a relatively large number of PDCCH candidates in a period (e.g., the first slot of the downlink transmission burst) within the COT, and may perform a PDCCH monitoring operation for a relatively small number of PDCCH candidates in another period (e.g., the remaining slot(s) except the first slot of the downlink transmission burst) within the COT. Accordingly, the terminal may reduce power consumption due to the PDCCH monitoring operation by obtaining the configuration information of the COT from the base station.

The terminal may inform the base station of configuration information of the COT initiated by the terminal. In this case, a specific operation of the base station may depend on the configuration information of the COT received from the terminal. For example, the transmission operation of the base station within the COT shared between the base station and the terminal may be determined based on the configuration information of the shared COT.

Meanwhile, communication nodes (e.g., base station and terminal) performing the LBT operation in an unlicensed band may be classified into a load-based equipment (LBE) and a frame-based equipment (FBE). In addition, a scheme of the LBT operation may be classified into an LBE operation scheme and an FBE operation scheme. When the LBE operation scheme is used, the communication node may attempt channel occupation by performing an additional CCA operation after failing a CCA operation. For example, the LBE may perform an LBT operation based on a random backoff value according to a contention window. The LBT operation scheme according to the categories 3 and 4 may be included in the LBE operation scheme. The expression that the CCA operation fails may mean that a channel is not occupied by the CCA operation.

When the FBE operation scheme is used, the communication node may perform a CCA operation at a starting time point or just before the starting time point of each fixed frame or each fixed frame period (FFP), and when the CCA operation fails, the communication node may not perform a CCA operation again until an execution time point of a CCA operation in a next fixed frame or next FFP. On the other hand, the FBE may continuously perform a transmission/reception operation during a FFP when a CCA operation is successful at or just before a starting time point of the corresponding FFP. The FFP may be composed of a COT (or MCOT) and an idle period. The idle period may be 5% of the total length of the FFP or COT.

For example, when the FFP is 10 ms, the COT (or MCOT) and the idle period constituting the FFP may be 9.5 ms and 0.5 ms, respectively. The idle period may be placed just before the COT. The communication node may perform an LBT operation in the idle period, and when a channel is determined to be in idle state as a result of the LBT operation, the communication node may occupy the channel for the maximum COT (or MCOT). The LBT operation performed by the FBE in the idle period or a gap period (e.g., gap period within the COT) may be an LBT operation according to the category 2. Alternatively, the LBT operation performed by the FBE in the idle period or the gap period (e.g., gap period within the COT) may be different from the LBT operations according to the categories 1 to 4. For example, the FBE may perform an energy detection operation for a slot duration of at least T μs length within the idle period or gap period, and may determine a channel state based on a result of comparison between a result of the energy detection operation and an energy detection threshold. T may be predefined in the technical specification. For example, T=9. The above-described LBT operation may be referred to as 'LBT operation according to a category 2-1'. The FBE operation scheme may be used when an environment where other communication systems do not coexist is ensured in terms of the spectrum regulation. For example, the FBE operation scheme in the NR or LTE system may be used in an environment in which a WiFi system and a WiFi device do not coexist.

In the FBE operation scheme, the COT may be initiated by the base station. The base station may transmit a downlink transmission burst to the terminal from the starting time point of the COT when the LBT operation is successful in the idle period. The COT initiated by the base station may be shared with the terminal. In this case, the terminal may transmit an uplink transmission burst to the base station within the shared COT. In addition, in the FBE operation scheme, the COT may be initiated by the terminal. The terminal may transmit an uplink transmission burst to the base station from the starting time point of the COT when the LBT operation is successful in the idle period. The COT initiated by the terminal may be shared with the base station. In this case, the base station may transmit a downlink transmission burst to the terminal within the shared COT.

The base station may transmit configuration information for the LBT operation to the terminal. The configuration information for the LBT operation may be transmitted through higher layer signaling (e.g., RRC signaling, SIB, SIB1). The configuration information for the LBT operation may include information indicating an LBT operation scheme (e.g., LBE operation scheme or FBE operation scheme) performed by the terminal. The terminal may receive the configuration information for the LBT operation from the base station. When the FBE operation scheme is used, the configuration information for the LBT operation may further include information on the FFP (e.g., the FPP or the length of FFP). The terminal may determine a position of each FFP, a position of a COT constituting each FFP, and/or a position of an idle period constituting each FFP based on the configuration information for the LBT operation (e.g., information on the FFP) and a predefined rule. The FFP performed (or initiated) by the base station may be distinguished from the FFP performed (or initiated) by the terminal. The terminal may receive information on the FFP performed by the base station from the base station. At the same time or separately, the terminal may receive the information on the FFP performed by the terminal from the base station.

The following exemplary embodiments may be applied to both the LBE operation scheme and the FBE operation scheme. In the following exemplary embodiments, a COT may refer to a COT based on the LBE operation. In addition, in the following exemplary embodiments, a COT may mean a COT based on the FBE operation.

The exemplary embodiments may be applied for the COT initiated by the terminal as well as the COT initiated by the base station.

Figure 5:
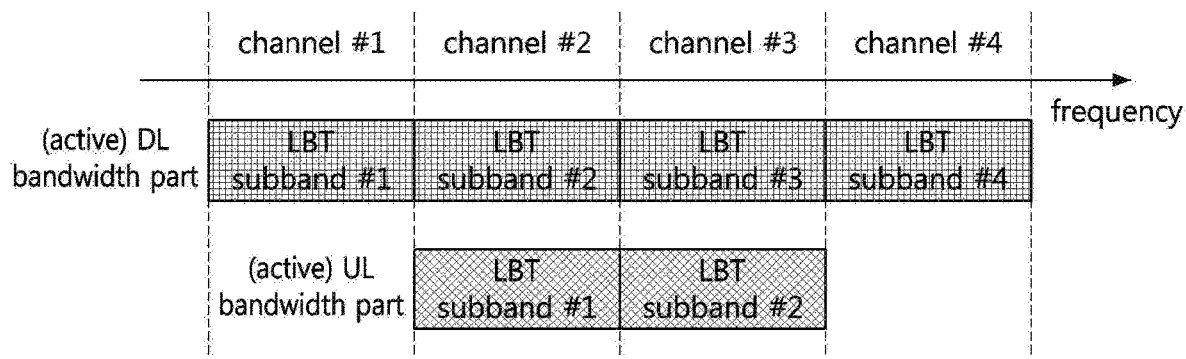
FIG. 5 is a conceptual diagram illustrating a first exemplary embodiment of asymmetrically-configured bandwidth parts in a time division duplex (TDD) based communication system.

FIG. 5 is a conceptual diagram illustrating a first exemplary embodiment of asymmetrically-configured bandwidth parts in a time division duplex (TDD) based communication system.

Referring to FIG. 5, a downlink bandwidth part (e.g., active (or activated) downlink bandwidth part) and an uplink bandwidth part (e.g., active (or activated) uplink bandwidth part) may be configured to the terminal. A frequency region of the downlink bandwidth part may be different from a frequency region of the uplink bandwidth part. The downlink bandwidth part may include LBT subbands #1 to #4, and the LBT subbands #1 to #4 may correspond to channels #1 to #4, respectively. The uplink bandwidth part may include LBT subbands #1 and #2, and the LBT subbands #1 and #2 may correspond to channels #2 and #3, respectively.

The downlink bandwidth part and the uplink bandwidth part may share the channels #2 and #3. In this case, the channel #2 may correspond to the LBT subband #2 of the downlink bandwidth part and the LBT subband #1 of the uplink bandwidth part. The channel #3 may correspond to the LBT subband #3 of the downlink bandwidth part and the LBT subband #2 of the uplink bandwidth part. In the following exemplary embodiments, when an operation of channel access, transmission, measurement, etc. in a certain bandwidth part is described, the corresponding bandwidth part may mean an active (or activated) bandwidth part.

When the LBT subbands are components of the bandwidth part, an LBT subband of the downlink bandwidth part corresponding to a specific channel may be different from an LBT subband of the uplink bandwidth part corresponding to the specific channel That is, an LBT subband A of the downlink bandwidth part may correspond to an LBT subband B of the uplink bandwidth part. Considering the above-described definition, a CCA operation (e.g., LBT operation), a COT acquisition operation, and a signal transmission operation in a bandwidth part may mean a CCA operation (e.g., LBT operation), a COT acquisition operation, and a signal transmission operation in one or more LBT subbands belonging to the corresponding bandwidth part. A CCA operation (e.g., LBT operation), a COT acquisition operation, and a signal transmission operation in LBT subband(s) belonging to a bandwidth part may mean a CCA operation (e.g., LBT operation), a COT acquisition operation, and a signal transmission operation in channel(s) corresponding to the LBT subband(s).

The downlink bandwidth part (or the LBT subband belonging to the downlink bandwidth part) and the uplink bandwidth part (or the LBT subband belonging to the uplink bandwidth part) corresponding to the specific channel may be used without discrimination between them. In the exemplary embodiments, the LBT subband included in the downlink bandwidth part may be referred to as 'downlink LBT subband', and the LBT subband included in the uplink bandwidth part may be referred to as 'uplink LBT subband'.

[COT Acquisition Method and Signal Transmission Method]

When a plurality of downlink transmission bursts are transmitted within one COT, transmission bandwidths of the plurality of downlink transmission bursts may be different from each other. In addition, when a plurality of uplink transmission bursts are transmitted within one COT, transmission bandwidths of the plurality of uplink transmission bursts may be different from each other. That is, the base station may change a transmission bandwidth of a downlink transmission burst within one COT, and the terminal may change a transmission bandwidth of an uplink transmission burst within one COT. This operation may be referred to as 'Method 100'. The change of the transmission bandwidth may mean a combination of one or more of a reduction, expansion, and movement of the transmission bandwidth. Method 100 may be applied when the downlink bandwidth part or the uplink bandwidth part includes a plurality of LBT subbands.

Figure 6:
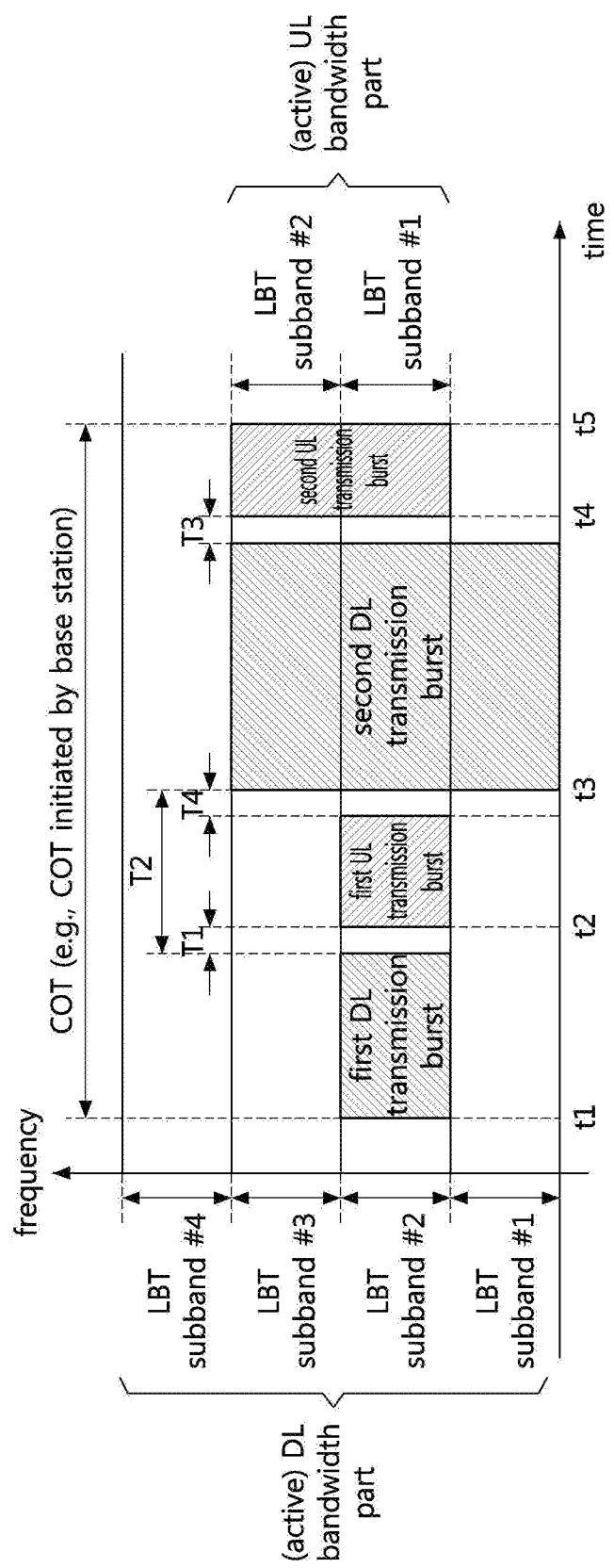
FIG. 6 is a conceptual diagram illustrating a first exemplary embodiment of a COT acquisition method and a signal transmission method in a bandwidth part including a plurality of LBT subbands.

FIG. 6 is a conceptual diagram illustrating a first exemplary embodiment of a COT acquisition method and a signal transmission method in a bandwidth part including a plurality of LBT subbands.

Referring to FIG. 6, a downlink bandwidth part may include four LBT subbands, and an uplink bandwidth part may include two LBT subbands. The LBT subbands #2 and #3 (e.g., downlink LBT subbands #2 and #3) of the downlink bandwidth part may correspond to the LBT subbands #1 and #2 (e.g., uplink LBT subbands #1 and #2) of the uplink bandwidth part, respectively. The base station may perform a CCA operation in the bandwidth part (e.g., LBT subband(s) or channel(s) corresponding to the bandwidth part activated in the terminal), and may occupy channel(s) in one or more LBT subbands belonging to the corresponding bandwidth part. The CCA operation may mean an LBT operation.

That is, the base station may acquire a COT in one or more LBT subbands. The base station may acquire a COT in the downlink LBT subband #2 and transmit a downlink transmission burst (hereinafter, referred to as 'first downlink transmission burst') within the acquired COT. In an exemplary embodiment, the COT (e.g., one COT within the bandwidth part) may mean a COT acquired by the base station at a time point t1 of the downlink LBT subband #2.

After the transmission of the first downlink transmission burst, the terminal may transmit an uplink transmission burst (hereinafter referred to as 'first uplink transmission burst') within the COT initiated by the base station. The terminal may perform an LBT operation before transmitting the first uplink transmission burst. The LBT operation may be performed in a T1 period. In this case, the terminal may perform the LBT operation in the LBT subband(s) (or channel(s)) to which the COT acquired by the base station belongs, and may transmit a signal and/or a channel according to a result of the LBT operation. This operation may be referred to as 'Method 110'.

In the exemplary embodiments, the LBT subband(s) to which the COT acquired by the base station belongs may mean the LBT subband(s) that the terminal considers to belong to the COT acquired by the base station. Whether a COT is acquired or not will be described from the viewpoint of the base station, but may also be interpreted from the viewpoint of the terminal. The terminal may identify the LBT subband(s) to which the COT acquired by the base station belongs by performing a signal detection operation or receiving control information. The terminal may assume specific LBT subband(s) as the LBT subband(s) to which the COT acquired by the base station belongs, and the LBT subband(s) assumed by the terminal may be different from actual LBT subband(s) to which the COT acquired by the base station belongs. When the base station informs the terminal of some LBT subband(s) among all the LBT subbands to which the COT belongs or when the terminal does not acquire information on some LBT subband(s) among all the LBT subbands to which the COT belongs, the LBT subband(s) assumed by the terminal may be different from the actual LBT subband(s) to which the COT acquired by the base station belongs.

In an exemplary embodiment, the terminal may perform an LBT operation in the uplink LBT subband #1 corresponding to the downlink LBT subband #2 to which the COT acquired by the base station belongs, and may transmit the first uplink transmission burst in the uplink LBT subband #1. Even when the uplink LBT subband #2 is included in the uplink bandwidth part, the terminal may not perform LBT operation and signal transmission in the uplink LBT subband #2. Even when information instructing to transmit a signal and/or a channel (e.g., PUSCH) in the LBT subband #2 is received from the base station, the terminal may not perform the LBT operation and signal transmission within a T2 period. For example, when a PUSCH is scheduled by a dynamic grant in the uplink LBT subband #2 within the T2 period, the terminal may not transmit the PUSCH in the uplink LBT subband #2 within the T2 period.

Alternatively, even when a PUSCH is scheduled by a configured grant in the uplink LBT subband #2 within the T2 period and uplink data (e.g., uplink shared channel (UL-SCH)) to be transmitted through the scheduled PUSCH is present, the terminal may not transmit the PUSCH in the uplink LBT subband #2 within the T2 period. The above-described LBT operation may be an LBT operation according to the category 1. The terminal may transmit a signal and/or a channel in the LBT subband without performing a CCA operation when a specific condition is satisfied. For example, when the T1 period is equal to or shorter than a preconfigured value (e.g., 16 μs) and/or when the terminal is instructed to perform an LBT operation according to the category 1, the terminal may transmit the first uplink transmission burst without performing the CCA operation.

Meanwhile, the base station may schedule an uplink data channel for the terminal in uplink LBT subband(s) corresponding to the downlink LBT subband(s) to which the COT acquired by the base station belongs and/or the downlink LBT subband(s) that the base station informs to the terminal (e.g., some or all of the downlink LBT subband(s) to which the COT acquired by the base station belongs). In this case, a reference time point for determining whether the COT is acquired or not may be a transmission time point of an uplink grant (e.g., all symbol(s) of a PDCCH, a first symbol of a PDCCH, a specific or arbitrary time point within a downlink transmission burst period including a PDCCH) including scheduling information of an uplink data channel, a transmission point of an uplink data channel (e.g., all symbol(s) of a PUSCH, a first symbol of a PUSCH, a specific or arbitrary time point within a downlink transmission burst period just before an uplink transmission burst including a PUSCH), etc. The method described above may be applied to a scheduling operation by a dynamic grant (e.g., DCI).

For example, the base station may schedule a PUSCH in the first uplink transmission burst period of the terminal in the uplink LBT subband #1 corresponding to the downlink LBT subband #2 to which the COT belongs in the first downlink transmission burst period. That is, the base station may not be allowed to schedule a PUSCH in the uplink LBT subband #2 within the first uplink transmission burst period. The terminal may not expect a PUSCH to be scheduled in the uplink LBT subband #2 within the first uplink transmission burst period. When a resource region of a PUSCH scheduled in the first uplink transmission burst period includes the uplink LBT subband #2, the terminal may consider that a PUSCH scheduling error has occurred. The above-described operation of the terminal may be based on the assumption that the terminal knows the LBT subband(s) to which the COT acquired by the base station belongs in the first downlink transmission burst period. The above-described operation of the terminal may be implemented by detecting a downlink initial signal, acquiring COT indication information, and the like.

Alternatively, the base station may schedule an uplink data channel in all uplink LBT subband(s) of the terminal regardless of whether the COT is acquired in the LBT subband(s) or whether configuration information of the acquired COT is transmitted or not. The reference time point for determining whether the COT is acquired or not may be one of the above-described time points. For example, the base station may schedule one PUSCH or schedule a plurality of PUSCHs by using one DCI in the uplink LBT subbands #1 and #2 within the first uplink transmission burst period of the terminal. In this case, the terminal may transmit the PUSCH(s) in all scheduled frequency resources (e.g., uplink LBT subbands #1 and #2). To this end, the terminal may perform the LBT operation in the uplink LBT subband #2 as well as the uplink LBT subband #1. The LBT operation may be performed within the T1 period.

Alternatively, according to Method 110, the terminal may perform the LBT operation in the LBT subband (e.g., uplink LBT subband #1) to which the COT acquired by the base station belongs, and transmit the PUSCH according to a result of performing the LBT operation. Even when a PUSCH is scheduled in the uplink LBT subband #2, the terminal may not transmit the PUSCH in the uplink LBT subband #2. In this case, the base station may assume that the PUSCH is punctured in a PUSCH resource region of the uplink LBT subband #2, and may not receive the PUSCH in the PUSCH resource region of the uplink LBT subband #2.

The above-described method may be applied when a scheduling operation by a dynamic grant (e.g., DCI) is performed. In addition, the above-described method may be applied when a scheduling operation by a configured grant, a grant-free scheduling operation, or a semi-persistent scheduling operation is performed. For example, the scheduling operation by a dynamic grant (e.g., DCI) may correspond to a scheduling operation based on a cell-radio network temporary identifier (C-RNTI) or a modulation and coding scheme-C-RNTI (MCS-C-RNTI). Each of the scheduling operation by a configured grant, the grant-free scheduling operation, and the semi-persistent scheduling operation may correspond to a scheduling operation based on a configured scheduling RNTI (CS-RNTI).

For example, the terminal may receive resource allocation information for the PUSCH of the uplink LBT subbands #1 and #2 through RRC signaling and/or DCI from the base station. Here, the PUSCH may be scheduled by a configured grant. In this case, the terminal may transmit the PUSCH in the uplink LBT subband #1 to which the COT acquired by the base station belongs (e.g., the LBT subband to which the COT shared between the base station and the terminal belongs) among the uplink LBT subbands #1 and #2, and may not transmit the PUSCH in the uplink LBT subband(s) other than the uplink LBT subband #1.

Meanwhile, when a type 2 configured grant scheme is used, the terminal may receive DCI including information indicating activation or reconfiguration of a configured grant resource. In this case, the terminal may transmit a PUSCH in a configured grant resource (e.g., a first period of the configured grant resource) that is dynamically activated or reconfigured by the DCI. Since the configured grant resource is dynamically indicated by the base station, when uplink data (e.g., UL-SCH) is present, the terminal may exceptionally transmit the PUSCH by using the configured grant resource in the uplink LBT subband #2 within the T2 period. According to the above method, the terminal may transmit an uplink signal and/or a channel in the LBT subband to which the COT shared with the base station belongs or in the LBT subband dynamically indicated by the base station. Therefore, the operation of the terminal may not violate the frequency regulation condition.

The above-described method may be applied to not only communications using the configured grant resource (e.g., PUSCH resource) but also communications using other uplink transmission resources configured semi-statically (e.g., physical uplink control channel (PUCCH) resource, sounding reference signal (SRS) resource, physical random access channel (PRACH) resource, etc.).

The method described above may be applied to other uplink signals and/or channels in the same or similar manner. For example, the method described above may be equally or similarly applied to communications using a PUCCH resource, an SRS resource, a PRACH resource, or the like semi-statically configured within an uplink bandwidth part including one or more LBT subbands in an unlicensed band. For example, when a PUCCH resource, an SRS resource, a PRACH resource, etc. are configured in the uplink LBT subband #2 within the T2 period, the terminal may transmit a signal and/or a channel in the corresponding resource according to the above-described method. Alternatively, the terminal may not transmit the corresponding signal and/or a channel in the corresponding resource according to the above-described method.

In the exemplary embodiment shown in FIG. 6, after the transmission of the first uplink transmission burst, the base station may transmit a downlink transmission burst (hereinafter referred to as 'second downlink transmission burst') within the COT. That is, the base station may transmit a plurality of downlink transmission bursts within one COT. The base station may perform an LBT operation before transmitting the second downlink transmission burst. The LBT operation for the transmission of the second downlink transmission burst may be performed within the T2 period. That is, the base station may perform an additional LBT operation within the COT initiated by itself.

The additional LBT operation may be the same as or similar to the LBT operation performed by the base station just before the COT starts. For example, when the LBT operation based on the FBE operation scheme is applied, the base station may perform the LBT operation according to the category 2 or the category 2-1 in each LBT subband just before the COT starts (e.g., in the idle period). In addition, the base station may additionally perform an LBT operation according to the category 2 or the category 2-1 in each LBT subband to transmit an additional downlink transmission burst within the COT.

The additional LBT operation may be a separate operation from the LBT operation performed by the base station just before the COT starts. For example, when the LBT operation based on the FBE operation scheme is applied, the base station may perform the LBT according to the category 2 or the category 2-1 in each LBT subband just before the COT starts (e.g., in the idle period). In addition, the base station may additionally perform an LBT operation according to the category 1 in each LBT subband to transmit an additional downlink transmission burst within the COT. That is, when a specific condition is satisfied, the base station may transmit an additional downlink transmission burst in each LBT subband within the COT without a sensing operation. That is, the sensing operation (e.g., LBT operation) may be omitted. The specific condition may be a condition in which a gap with a previous downlink or uplink transmission burst is equal to or less than a reference value.

Alternatively, the LBT operation applied to each LBT subband may be different. In a proposed method, the base station may perform an LBT operation (e.g., LBT operation according to the category 1 or 2) without a random backoff operation in some LBT subband(s) of the downlink bandwidth part, and may perform an LBT operation based on a random backoff (e.g., LBT operation according to the category 3 or 4) in the remaining LBT subband(s) of the same downlink bandwidth part. This operation may be referred to as 'Method 111'.

Some of the LBT subband(s) to which the LBT operation according to the category 1 or 2 is applied are the LBT subband(s) to which the COT acquired by the base station belongs at the time point of performing the LBT operation or before the time point of performing the LBT operation. In the some LBT subband(s), a time interval between the downlink transmission burst period and an uplink transmission burst period before the corresponding downlink transmission burst period may be equal to or less than a preconfigured value. For example, in the some LBT subband(s), when the time interval between the downlink transmission burst period and the uplink transmission burst period before the downlink transmission burst period is equal to or less than 16 μs or 25 μs, the base station may perform an LBT operation according to the category 1 or 2 in the some LBT subband(s).

In the exemplary embodiment shown in FIG. 6, the base station may receive the uplink transmission burst (e.g., first uplink transmission burst) in at least one LBT subband (e.g., downlink LBT subband #2) among the LBT subband(s) to which the COT acquired by the base station belongs. According to Method 111, the base station may perform an LBT operation according the category 2 in the downlink LBT subband #2 to transmit a downlink transmission burst (e.g., second downlink transmission burst) after receiving the first uplink transmission burst. Alternatively, the base station may transmit the second downlink transmission burst by performing an LBT operation according to the category 1 in the downlink LBT subband #2. That is, the LBT operation may be omitted in the downlink LBT subband #2. The LBT operation according to the category 1 or 2 may be performed within a T4 period.

The exemplary embodiment shown in FIG. 6 may be implemented also by other methods. The base station may transmit a downlink transmission burst (e.g., second downlink transmission burst) after the uplink transmission or the uplink transmission burst period (e.g., T2 period) only in LBT subband(s) (e.g., downlink LBT subband #2) in which the uplink transmission or the uplink transmission burst (e.g., PUSCH) is dynamically allocated to terminal(s), among the LBT subband(s) to which the COT acquired by the base station belongs. In this case, the base station may transmit the downlink transmission burst when the LBT operation is successful in the LBT subband(s) regardless of whether the uplink transmission is detected or received.

Further, according to Method 111, the base station may perform an LBT operation according to the category 3 or 4 in the LBT subband(s) (e.g., downlink LBT subbands #1, #3, and #4) in which the first uplink transmission burst is not received, and transmit the second downlink transmission burst in the LBT subband(s) (e.g., downlink LBT subbands #1 and #3) in which the LBT operation is successful. In this case, random backoff values for the LBT operation in the corresponding LBT subband(s) may be independently managed. In the corresponding LBT subband(s), the LBT operation may be paused while the first downlink transmission burst is transmitted, and may be resumed after the transmission of the first downlink transmission burst ends.

For example, the random backoff value for the LBT operation in the corresponding LBT subband(s) may be maintained while the first downlink transmission burst is transmitted. Alternatively, the random backoff value for the LBT operation in the corresponding LBT subband(s) may be initialized at the end of the first downlink transmission burst. That is, the base station may reselect a random backoff value within a contention window. In this case, a contention window updated by the transmission of the first downlink transmission burst may be used. On the other hand, a common contention window and/or a common random backoff value may be used for the LBT subband(s). That is, the LBT operation in the LBT subband(s) constituting one bandwidth part may be performed using a common contention window and/or random backoff value. The method described above may be applied even when a common random backoff value is used.

In order to align transmission starting time points (e.g., t3) of signals in the downlink LBT subbands #1 to #4, the base station may apply a self-deferral scheme for the LBT operation in the remaining LBT subband(s). For example, after a certain time from the success time point of the LBT operation, the base station may perform an LBT operation (e.g., LBT operation according to the category 2) again without a random backoff operation, and may transmit a signal and/or a channel in the corresponding LBT subband(s) when the LBT operation is successful. The LBT operation according to the category 3 or 4 may be performed within the T2 period.

Alternatively, the base station may perform an LBT operation according to the category 2 in the downlink LBT subbands #1, #3, and #4, and may transmit the second downlink transmission burst in downlink LBT subband(s) in which the LBT operation is successful. In this case, the base station may regard the downlink LBT subband #2 as a primary LBT subband, and may determine an execution time point of the LBT operation in the remaining LBT subband(s) according to a signal transmission time point or a signal transmission expected time point (e.g., t3) in the primary LBT subband. For example, the base station may perform an LBT operation according to the category 2 in the remaining LBT subband(s) during a preconfigured time period (e.g., 25 μs) before the time point t3. In addition, the terminal may perform an LBT operation according to the category 2 or 1 in the primary LBT subband.

Meanwhile, the base station may expect to receive an uplink transmission burst in the LBT subband(s) to which the acquired COT belongs. However, the base station may not receive an uplink transmission burst in the corresponding LBT subband(s). For example, in the exemplary embodiment shown in FIG. 6, the base station may not receive the first uplink transmission burst within the T2 period. In this case, the base station may perform an LBT according to the category 1 or 2 to transmit the second downlink transmission burst in the downlink LBT subband #2. In this case, an LBT operation according to the category 2 may be performed by the above-described method in the remaining LBT subbands (e.g., downlink LBT subbands #1, #3, and #4).

Alternatively, the base station may perform a random backoff based LBT operation (e.g., LBT operation according to the category 3 or 4) in the remaining LBT subbands. In this case, the base station may perform a random backoff based LBT operation (e.g., LBT operation according to the category 3 or 4) or an LBT operation according to the category 2 in the remaining LBT subbands, and transmit the second downlink transmission burst in LBT subband(s) in which the LBT operation is successful. The LBT operations in the corresponding LBT subbands may be performed specifically according to the above-described method.

When the additional LBT operation succeeds in one or more of the downlink LBT subbands #1, #3, and #4 within the T2 period, the base station may use the one or more LBT subbands in which the additional LBT operation is successful to transmit the second downlink transmission burst. In the exemplary embodiment shown in FIG. 6, the base station may succeed in the LBT operation in the downlink LBT subbands #1 to #3 within the T2 period, and transmit the second downlink transmission burst in the downlink LBT subbands #1 to #3 in which the LBT operation is successful. That is, the base station may expand the downlink transmission bandwidth within the COT by additionally performing the LBT operation in the uplink period within the COT. This operation may be an exemplary embodiment of Method 100. The second downlink transmission burst may be transmitted at the same time point (e.g., t3) in the downlink LBT subbands #1 to #3.

In the exemplary embodiment shown in FIG. 6, the transmission bandwidth of the second downlink transmission burst may basically include the downlink LBT subband #2, and further include the downlink LBT subband(s) in which the LBT operation is successful. The transmission bandwidth of the second downlink transmission burst may be composed of consecutive downlink LBT subband(s) in the frequency domain. The method described above may be used in combination with Method 111. Therefore, when the LBT operation (e.g., LBT operation according to the category 1 or 2) fails in the T2 period or the T4 period within the downlink LBT subband #2, the base station may consider that the LBT operation fails also in the remaining downlink LBT subband(s). Therefore, the base station may not transmit the downlink transmission burst at the time point t3. In this case, the base station may release the COT acquired at the time point t1, and perform a new LBT operation in the corresponding bandwidth part. To this end, the base station may initialize the random backoff value for the corresponding LBT subband(s).

In the exemplary embodiment shown in FIG. 6, the terminal may transmit an uplink transmission burst (hereinafter referred to as 'second uplink transmission burst') after the transmission of the second downlink transmission burst within the COT. That is, the terminal may transmit a plurality of uplink transmission bursts within one COT. The terminal may perform an LBT operation before transmitting the second uplink transmission burst. The LBT operation may be performed within the T3 period. According to Method 110, the terminal may perform the LBT operation in the LBT subband(s) or channel(s) to which the COT acquired by the base station belongs, and may transmit a signal and/or a channel according to a result of performing the LBT operation.

Alternatively, the terminal may perform an LBT operation in the LBT subband(s) included in the uplink bandwidth part. In the exemplary embodiment shown in FIG. 6, the terminal may perform the LBT operation in the LBT subband(s) (e.g., uplink LBT subbands #1 and #2) included in the uplink bandwidth part among the LBT subband(s) to which the COT acquired by the base station belongs, and transmit the second uplink transmission burst in the uplink LBT subbands #1 and #2 in which the LBT operation is successful.

In addition, in case of uplink data channel (e.g., PUSCH) transmission, the terminal may perform an LBT operation in LBT subband(s) to which an uplink data channel (e.g., PUSCH) scheduled by the base station belongs. In the exemplary embodiment shown in FIG. 6, a PUSCH of the uplink LBT subbands #1 and #2 may be scheduled at a time point t4. The second uplink transmission burst may be transmitted through the uplink LBT subbands #1 and #2 at the same time point (e.g., t4). The terminal may expand the uplink transmission bandwidth within one COT. This operation may be another exemplary embodiment of Method 100. Other exemplary embodiments of Method 100 will be described below.

Figure 7A:
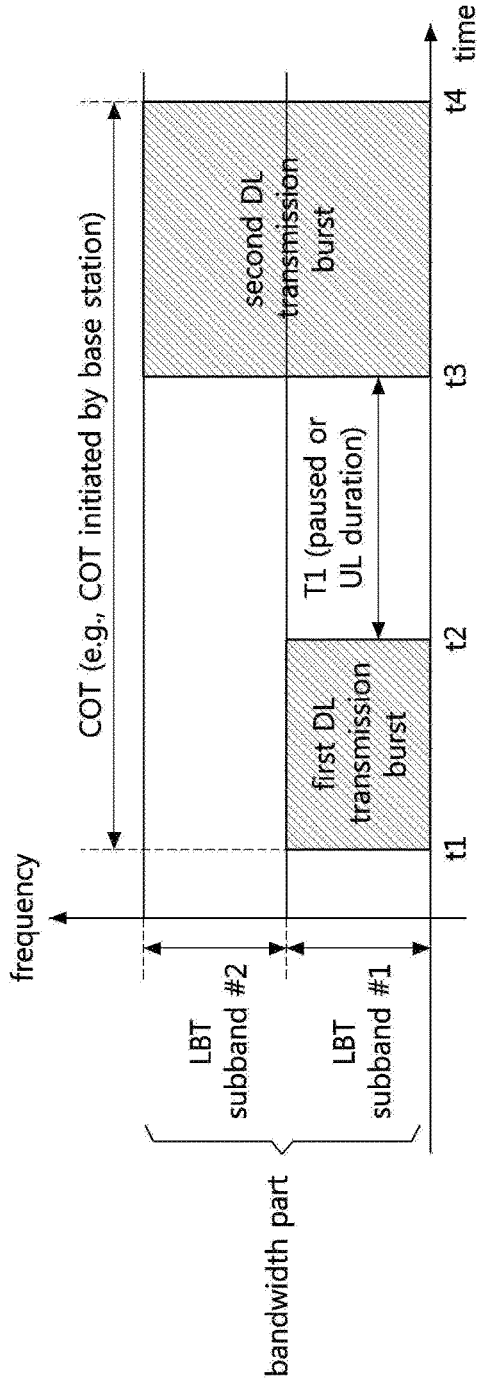
FIG. 7A is a conceptual diagram illustrating a second exemplary embodiment of a COT acquisition method and a signal transmission method in a bandwidth part including a plurality of LBT subbands.
Figure 7B:
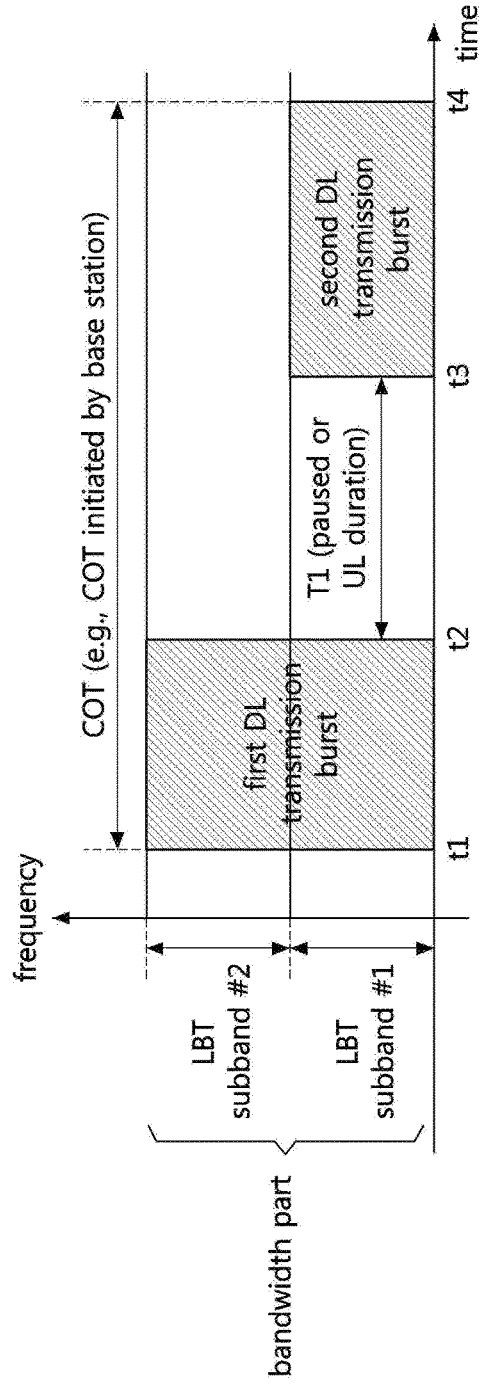
FIG. 7B is a conceptual diagram illustrating a third exemplary embodiment of a COT acquisition method and a signal transmission method in a bandwidth part including a plurality of LBT subbands.

FIG. 7A is a conceptual diagram illustrating a second exemplary embodiment of a COT acquisition method and a signal transmission method in a bandwidth part including a plurality of LBT subbands, and FIG. 7B is a conceptual diagram illustrating a third exemplary embodiment of a COT acquisition method and a signal transmission method in a bandwidth part including a plurality of LBT subbands.

Referring to FIGS. 7A and 7B, one bandwidth part configured to the terminal may include two LBT subbands. The bandwidth part may be an active bandwidth part. The bandwidth part may refer to a downlink bandwidth part or an uplink bandwidth part. The base station may acquire a COT by performing an LBT operation in the bandwidth part. A starting time point of the COT may be t1 and an ending time point of the COT may be t4.

In the exemplary embodiment shown in FIG. 7A, the base station may expand the downlink transmission bandwidth within one COT. That is, the base station may transmit a first downlink transmission burst through the LBT subband #1 in a period from the starting time point (e.g., t1) to a time point t2 of the COT, and may transmit a second downlink transmission burst through the LBT subbands #1 and #2 in a period from a time point t3 to the time point t4. In addition, the terminal may receive the first downlink transmission burst through the LBT subband #1 in the period from t1 to t2, and the second downlink through the LBT subbands #1 and #2 in the period from t3 to t4.

For this operation, the base station may perform an LBT operation in the LBT subbands #1 and #2 in the period between t2 and t3 (e.g., T1 period). When the LBT operation is successful in the LBT subbands #1 and #2, the base station may transmit the second downlink transmission burst in the LBT subbands #1 and #2. The T1 period may be used as a paused duration or an uplink (UL) duration. The base station may not perform a transmission/reception operation of other signals and/or channels other than a reception operation of a signal and/or a channel according to the LBT operation during the paused duration. Alternatively, the T1 period may include both a paused duration and an uplink duration. The LBT operation may be an LBT operation according to the category 1 or 2. In the present exemplary embodiment, the 'uplink duration' may mean a period during which the base station performs a reception operation, and the period in which the base station performs a reception operation may be distinguished from an 'uplink period' composed of uplink symbol(s) by slot format configuration.

In the exemplary embodiment shown in FIG. 7B, the base station may reduce the downlink transmission bandwidth within one COT. That is, the base station may transmit the first downlink transmission burst through the LBT subbands #1 and #2 in the period from the starting time point (e.g., t1) to the time point t2 of the COT, and may transmit the second downlink transmission burst through the LBT subband #1 in the period from t3 to t4. In addition, the terminal may receive the first downlink transmission burst through the LBT subbands #1 and #2 in the period from t1 to t2, and the second downlink transmission burst through the LBT subband #1 in the period from t3 to t4.

For this operation, the base station may perform an LBT operation in the LBT subbands #1 and #2 in the period between t2 and t3 (e.g., T1 period). When the LBT operation is successful in the LBT subband #1, the base station may transmit the downlink transmission burst in the LBT subband #1. Here, the LBT operation in the LBT subband #2 may fail.

Alternatively, the base station may not perform the LBT operation in the LBT subband #2 within the T1 period. That is, the base station may perform the LBT operation only in the LBT subband #1 within the T1 period. The base station may perform an additional LBT operation in some LBT subband(s) of all the LBT subbands belonging to the bandwidth part within the COT, and transmit a downlink signal and/or a channel in one or more LBT subbands in which the LBT operation is successful among the some LBT subband(s). The T1 period may be used as a paused duration and/or an uplink duration. The LBT operation may be an LBT operation according to the category 1 or 2.

According to the exemplary embodiments described above, the base station and/or the terminal may occupy a channel at a different time point for each LBT subband or channel within one carrier and one bandwidth part. For example, in the exemplary embodiment shown in FIG. 6, the base station may occupy the LBT subband #2 of the downlink bandwidth part at the time point t1 and occupy the LBT subbands #1 and #3 of the downlink bandwidth part at the time point t3. In this case, the COT may be defined by the following two methods.

In the first COT definition method, the base station and the terminal may assume one COT (e.g., common COT) within one carrier regardless of the number of LBT subbands constituting the downlink and uplink bandwidth parts. In this case, the one COT may be configured based on a channel occupancy time point by the first LBT operation performed by the base station or the terminal. This operation may be referred to as 'Method 120'. Specifically, the one COT may be configured based on a channel occupancy time point by the first LBT operation performed after the base station or the terminal releases the previous COT or after the base station or the terminal resets the previous LBT operation. In the exemplary embodiment shown in FIG. 6, according to Method 120, a starting time point of the COT may be t1 and an ending time point of the COT may be t5.

In the second COT definition method, the base station and the terminal may assume a plurality of COTs within one carrier. For example, when the downlink and/or uplink bandwidth parts includes a plurality of LBT subbands or a plurality of channels, the base station and the terminal may assume a COT for each LBT subband or for each channel. For example, a starting time point, ending time point, and/or duration of the COT may be different for each LBT subband or for each channel. This operation may be referred to as 'Method 121'.

In the exemplary embodiment shown in FIG. 6, according to Method 121, a starting time point of the COT in the downlink LBT subband #2 may be t1, and a starting time point of the COT in the downlink LBT subbands #1 and #3 may be t3. In the downlink LBT subbands #1 to #3, the ending time points of the COTs may be the same as t5. When Method 121 is used, the ending time points of one or more COTs within one carrier may be the same. That is, even when channels are occupied at different time points in a plurality of LBT subbands within one carrier, the base station or the terminal may release the channels at the same time. This operation may be referred to as 'Method 122'.

Meanwhile, the number of switching operations between downlink communication and uplink communication within one COT may be limited. For example, when a specific condition is satisfied, transmission of only one downlink transmission burst may be allowed within one COT initiated by the base station. In addition, transmission of at most one uplink transmission burst within one COT initiated by the base station may be allowed. In this case, an uplink duration within the COT initiated by the base station may be disposed in the ending part of the COT. In another example, when a specific condition is satisfied, transmission of only one uplink transmission burst may be allowed within one COT initiated by the terminal. In addition, transmission of at most one downlink transmission burst within one COT initiated by the terminal may be allowed.

A maximum of one downlink duration may be indicated or configured within a COT (e.g., COT initiated by the terminal). In this case, one downlink duration may be disposed in an ending part of the COT. For example, the operation of limiting the number of switching operations between downlink communication and uplink communication may be applied when the bandwidth of the carrier or the bandwidth part exceeds a preconfigured value. For example, the preconfigured value may be a bandwidth (e.g., 20 MHz) occupied by one LBT subband.

Alternatively, the operation of limiting the number of switching operations between downlink communication and uplink communication may be applied when the carrier or bandwidth part includes two or more LBT subbands. The base station may transmit to the terminal configuration information indicating the number (e.g., maximum number) of uplink transmission bursts and/or the number (e.g., maximum number) of downlink transmission bursts within the COT initiated by the terminal. Here, the configuration information may be transmitted from the base station to the terminal through RRC signaling. In addition, the configuration information may be transmitted to the terminal together with the configuration information of the bandwidth part.

[COT Indication Method]

In a proposed method, the operation of the terminal may be performed based on the configuration information of the COT received from the base station. The configuration information of the COT may include information related to the COT acquired by the base station and/or information related to the LBT subband(s) to which the COT acquired by the base station belongs. Therefore, for a wideband operation in an unlicensed band, the base station may inform the terminal of the information of the COT initiated by the base station and/or the information of the LBT subband(s) to which the corresponding COT belongs.

The base station may inform the terminal of the configuration information of the COT initiated by the base station through signaling. The signaling may be physical layer signaling. For example, a group common DCI transmitted to one or more terminal groups may include the configuration information of the COT. In the NR communication system, a DCI format 2_0 may be used as the group common DCI. The terminal may obtain a DCI format 2_0 by receiving a group common PDCCH in a PDCCH CSS set, and may obtain the configuration information of the COT from the DCI format 2_0. The DCI format 2_0 may include information (e.g., information related to a slot format (e.g., SFI)) in addition to the configuration information of the COT. Alternatively, a new DCI format extended based on the DCI format 2_0 may be used for the group common DCI.

The base station may transmit information on a slot format of one or more consecutive slots and each slot (hereinafter, referred to as 'slot format configuration information') to the terminal through an SFI. When one or more slot format configuration information is configured by higher layer signaling (e.g., RRC signaling), one slot format configuration information among the one or more slot format configuration information may be indicated by DCI (e.g., group common DCI, DCI format 2_0). The SFI may include slot format configuration information for one or more carriers. The method of indicating slot format configuration information by the SFI may be used in both the licensed band communication and the unlicensed band communication.

For another example, the configuration information of the COT may be signaled to the terminal through a plurality of sequences forming a physical layer signal. Each of the plurality of sequences may be a sequence of a reference signal or a synchronization signal. The reference signal may be a DM-RS for demodulating a broadcast channel (e.g., physical broadcast channel (PBCH)), a control channel (e.g., PDCCH), and a data channel (e.g., PDSCH), channel state information-reference signal (CSI-RS), or the like. The synchronization signal may be a primary synchronization signal (PSS), a secondary synchronization signal (SSS), or the like. The base station may transmit to the terminal one sequence among a plurality of sequences predefined between the base station and the terminal. The terminal may obtain the configuration information of the COT by receiving the sequence from the base station.

The configuration information of the COT may be signaled to the terminal in a starting region of the COT. For example, the group common DCI including the configuration information of the COT may be transmitted to the terminal through a PDCCH in one or more symbols among K symbols within the COT. Alternatively, a sequence of the downlink initial signal may be transmitted to the terminal in one or more symbols among the K symbols within the COT, and the sequence of the downlink initial signal may indicate the configuration information of the COT. Here, the K symbols may be symbols from the first symbol to the K-th symbol within the COT. K may be a natural number. For another example, the configuration information of the COT may be signaled to the terminal in the first slot within the COT. The terminal may regard the slot in which the signal and/or the channel (e.g., PDCCH) including the configuration information of the COT is received as the first slot within the COT.

In the exemplary embodiment shown in FIG. 6, the starting time point of the COT may be different for each LBT subband or for each channel. In this case, information on the starting time point of the COT may be indicated for each LBT subband or for each channel. The information on the starting time point of the COT may be transmitted in a starting region of the COT in each LBT subband or each channel. In addition, the starting time points of the COT in a plurality of LBT subbands or channels may be the same. For example, in the exemplary embodiment shown in FIG. 6, the starting time points of the COT in the downlink LBT subbands #1 and #3 may be the same as t3. In this case, the starting time points of the COT for the plurality of LBT subbands or channels may be represented by one or common control information. The one or common control information may be signaled to the terminal by the above-described method.

For another example, the ending time points of the COT for one or more LBT subbands or channels, the length of the COT (e.g., the total length of the COT, the remaining duration of the COT), etc. may be represented by one or common control information. The one or common control information may be signaled to the terminal by the above-described method. When information indicating the remaining duration of the COT is received, the terminal may derive the ending time point of the COT based on a reception time point (e.g., one symbol among symbol(s) in which the DCI is received, a slot in which the DCI is received, the first symbol of the slot in which the DCI is received, etc.) of the configuration information of the COT.

In addition, when the information indicating the remaining duration of the COT is received, the terminal may identify the slot in which the COT is received among one or more slots indicated by the SFI based on the remaining duration of the COT. When carrier aggregation is used, configuration information of a COT for a plurality of carriers (e.g., the starting time point of the COT, the ending time point of the COT, the length (or duration) of the COT, etc.) may be expressed by common control information. The common control information may be transmitted to the terminal through the above-described method, and the terminal may interpret the common control information according to the above-described method.

On the other hand, the configuration information of the COT may not include the SFI. For example, the group common DCI (e.g., DCI format 2_0) may be configured not to include the SFI. Alternatively, a search space set for receiving the group common DCI (e.g., DCI format 2_0) may not be configured to the terminal. In this case, the terminal may determine transmission directions in the symbols constituting the COT or transmission burst based on semi-static slot format configuration information received from the base station. When the semi-static slot format configuration information is not received from the base station, the terminal may consider that all symbols constituting the COT or transmission burst are flexible symbols (e.g., semi-static flexible symbols). Accordingly, the terminal may perform a transmission operation of a signal and/or a channel (e.g., CSI-RS, SRS, PRACH, PUCCH, SS/PBCH block) based on information obtained through RRC signaling, and perform a PDCCH monitoring operation within the COT. Even in this case, other configuration information of the COT (e.g., the length (or duration) of the COT, the ending time point of the COT, the starting time point of the COT, etc.) may be transmitted to the terminal by the above-described method.

The configuration information of the COT may further include a channel access priority class of the base station. The COT initiated by the base station may be shared with the terminal, and the terminal may perform uplink communication within the shared COT. In this case, the terminal may transmit a PUSCH or a PUCCH having the same or lower priority as the channel access priority class of the base station. Information indicating whether the above-described configuration information of each COT is included in the DCI, the size of the configuration information of each COT (e.g., the number of bits), etc. may be configured to the terminal through higher layer signaling (e.g., RRC signaling).

The base station may occupy one or more LBT subbands by performing an LBT operation, and inform the terminal of configuration information of one or more occupied LBT subbands. The configuration information of the one or more occupied LBT subbands may be included in the configuration information of the COT. Alternatively, the configuration information of the one or more occupied LBT subbands may be transmitted to the terminal together with configuration information of the COT. A set of the LBT subband(s) actually occupied by the base station may be different from a set of the LBT subband(s) that the base station informs the terminal. That is, the base station may inform the terminal that some or all of the LBT subband(s) occupied by the base station are available LBT subband(s). The terminal may assume that the COT is configured in the LBT subband(s) indicated by the base station, and may perform communication within the COT.

According to Method 122, one or more COTs may have the same ending time point within one carrier or bandwidth part. On the other hand, the ending time point of the COT may be different for each LBT subband or for each channel. In this case, information on the ending time point of the COT may be indicated for each LBT subband or for each channel. The information on the ending time point of the COT may be transmitted in a starting region of the COT of each LBT subband or each channel. In addition, when the ending time points of the COT are the same in a plurality of LBT subbands or channels, the ending time points of the COT may be represented by one control information. The one control information may be signaled to the terminal by the above-described method.

The configuration information of the COT may be repeatedly transmitted within one COT. For example, the base station may repeatedly transmit the configuration information of the COT initiated by the base station to the terminal. According to this operation, even when the configuration information of the COT (e.g., signal indicating the configuration information of the COT) is not received in the starting region of the COT, the terminal may obtain the configuration information of the COT by receiving another signal repeatedly transmitted from the base station.

Figure 8:
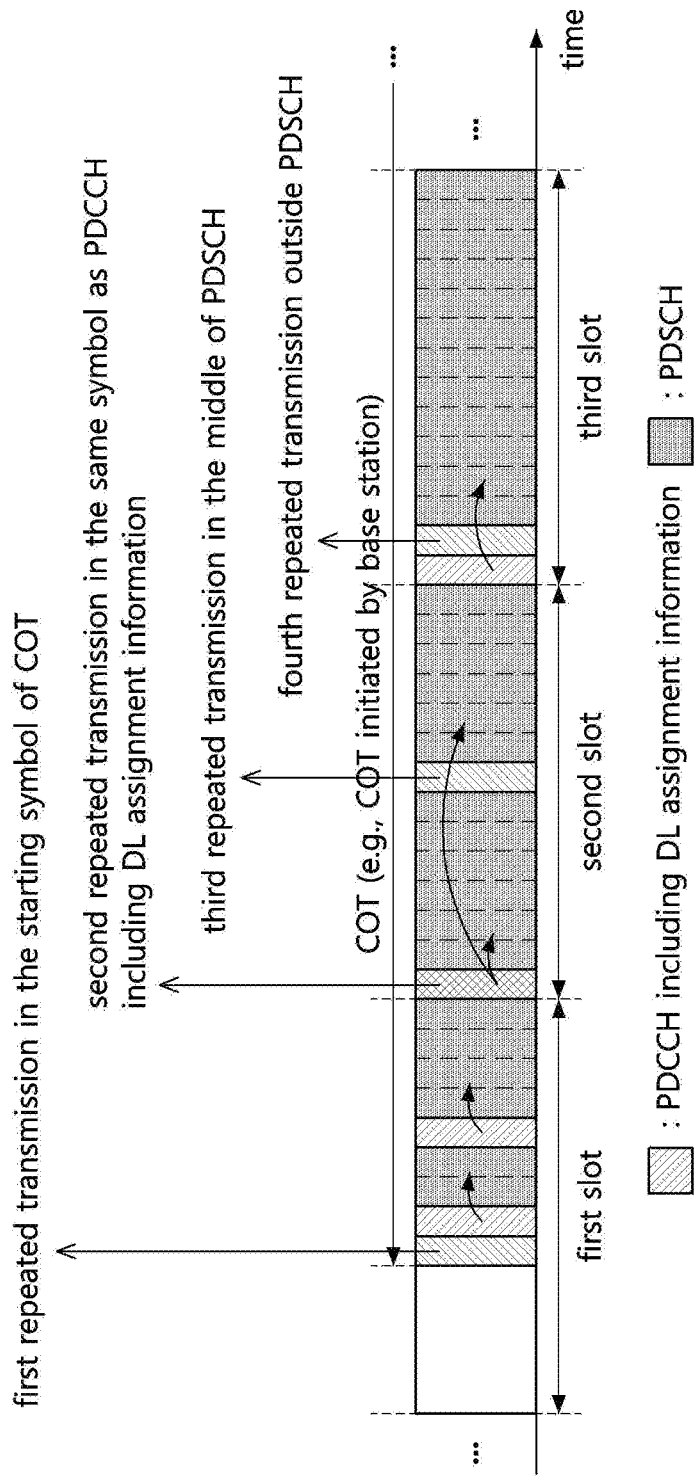
FIG. 8 is a conceptual diagram illustrating a first exemplary embodiment of a method for repetitive transmission of configuration information of a COT.

FIG. 8 is a conceptual diagram illustrating a first exemplary embodiment of a method for repetitive transmission of configuration information of a COT.

Referring to FIG. 8, the base station may repeatedly transmit the configuration information of the COT four times within the COT initiated by the base station. For example, the base station may transmit the configuration information of the COT the first time in the starting symbol constituting the COT or downlink transmission burst, may transmit the configuration information of the COT the second time in the first symbol of the second slot of the COT, may transmit the configuration information of the COT the third time in the eighth symbol (e.g., in the middle of the PDSCH) of the second slot of the COT, and transmit the configuration information of the COT the fourth time in the second symbol of the third slot of the COT. In the first symbol of the second slot of the COT, the configuration information of the COT may be transmitted together with downlink scheduling DCI.

For example, the repeatedly-transmitted configuration information of the COT may be included in a group common DCI, and the group common DCI may be transmitted on a PDCCH. In the NR communication system, a DM-RS of the PDCCH may be configured as a pseudo-noise (PN) sequence, and the PN sequence may be initialized based on Equation 1 below. The DM-RS of the PDCCH (i.e., PDCCH DM-RS) may be a DM-RS used for demodulation of the PDCCH. In Equation 1, $N_{symb}^{slot}$ may denote the number of symbols included in one slot, $n_{s,f}^{\mu}$ may denote a slot number (e.g., slot index) within a radio frame, 1 may denote a symbol number (e.g., symbol index) within a slot, and $N_{ID}$ may denote a scrambling ID or a physical layer cell ID of the DM-RS.

$$c_{init} = (2^{17}(N_{symb}^{slot} n_{s,f}^{\mu} + l + 1)(2N_{ID} + 1) + 2N_{ID}) \bmod 2^{31} \quad \text{[Equation 1]}$$

The base station may transmit the PDCCH in a starting region of the COT, and the COT may start at any symbol of the slot. Therefore, in order to reduce a PDCCH pre-processing complexity of the base station, the sequence of the PDCCH DM-RS and/or the scrambling sequence of the PDCCH may be determined independently of a transmission time point thereof (e.g., the slot and symbol in which the PDCCH DM-RS is transmitted). For example, for the DM-RS of the group common PDCCH including the configuration information of the COT, 1 may have a preconfigured value (e.g., 1=0). 1 may be a fixed value.

For example, for the DM-RS of the group common PDCCH including the configuration information of the COT, $n_{s,f}^{\mu}$ may be a slot index (e.g., an index determined based on the starting time point of the COT) within the COT. For example, an index of the k-th slot of the COT may be (k−1). On the other hand, a DM-RS sequence of a PDCCH for another DCI (e.g., PDCCH for downlink or uplink scheduling DCI) other than the PDCCH for the DCI including the configuration information of the COT may be changed in time. In the NR communication system, the DM-RS sequence of the PDCCH including the configuration information of the COT may be generated based on Equation 1. In this case, inter-cell interferences caused by the signal transmission may be randomized.

In the exemplary embodiment shown in FIG. 8, a CORESET (e.g., PDCCH monitoring occasion) in which the PDCCH including the configuration information of the COT (hereinafter, referred to as 'first PDCCH') is transmitted and a CORESET (e.g., PDCCH monitoring occasion) in which another PDCCH (hereinafter, referred to as 'second PDCCH') is transmitted may share time and frequency resources. The above operation will be described with reference to FIG. 9 below.

Figure 9A:
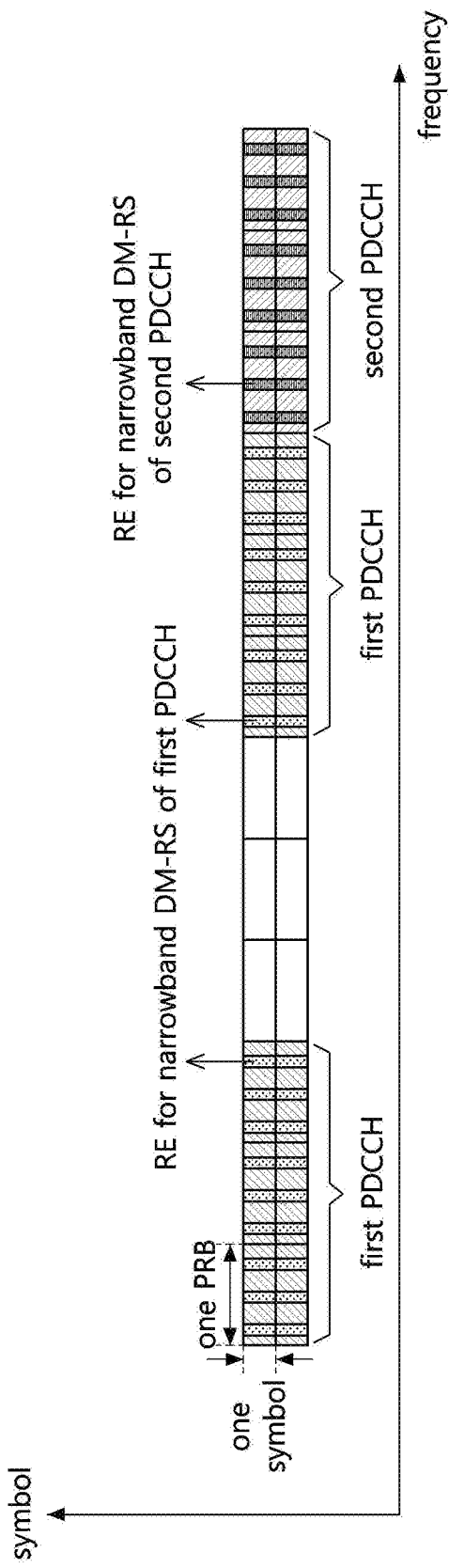
FIG. 9A is a conceptual diagram illustrating a first exemplary embodiment of a PDCCH and PDCCH DM-RS resource mapping method.
Figure 9B:
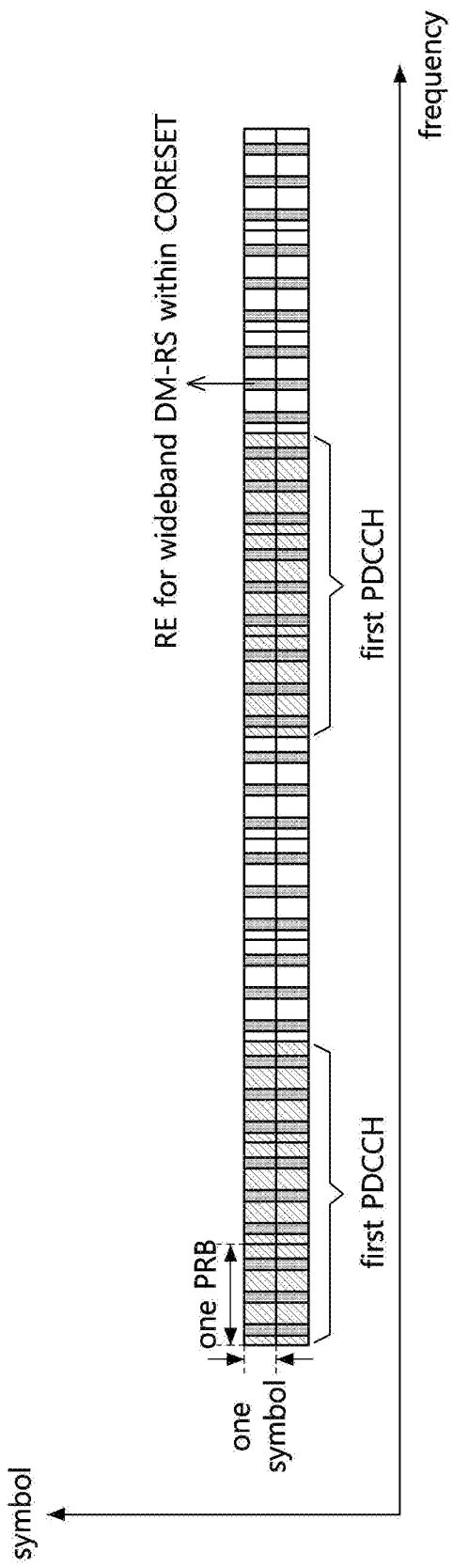
FIG. 9B is a conceptual diagram illustrating a second exemplary embodiment of a PDCCH and PDCCH DM-RS resource mapping method.

FIG. 9A is a conceptual diagram illustrating a first exemplary embodiment of a PDCCH and PDCCH DM-RS resource mapping method, and FIG. 9B is a conceptual diagram illustrating a second exemplary embodiment of a PDCCH and PDCCH DM-RS resource mapping method.

Referring to FIGS. 9A and 9B, one CORESET may include 12 consecutive PRBs in the frequency domain, and may include two consecutive symbols in the time domain. One CORESET may include 24 REGs. In the exemplary embodiment shown in FIG. 9A, the CORESET of the first PDCCH (e.g., the CORESET that is coupled to (e.g., associated with) a search space set in which the first PDCCH is transmitted or the PDCCH monitoring occasion for the first PDCCH) and the CORESET of the second PDCCH may be allocated in the same time and frequency resources. Alternatively, the CORESET of the first PDCCH may be the same as the CORESET of the second PDCCH. In this case, the first PDCCH may be mapped to PRBs composed of the first PRB to the third PRB within the CORESET and PRBs composed of the seventh to ninth PRBs within the CORESET. The second PDCCH may be mapped to PRBs composed of the tenth PRB to the twelfth PRB within CORESET. The first PDCCH may be the PDCCH including the configuration information of the COT, and the second PDCCH may be a PDCCH not including the configuration information of the COT.

In the exemplary embodiments shown in FIGS. 9A and 9B, a DM-RS sequence of the first PDCCH may be time-invariant, and a DM-RS sequence of the second PDCCH may be time-variant. In this case, in the exemplary embodiment shown in FIG. 9A, when the CORESET of the first PDCCH and the CORESET of the second PDCCH share resources, the base station may transmit narrowband DM-RSs for demodulation of the first PDCCH and the second PDCCH. Collision between the DM-RS of the first PDCCH and the DM-RS of the second PDCCH may be avoided. When a wideband DM-RS is transmitted for demodulation of at least one of the first PDCCH and the second PDCCH, a mapping position of the DM-RS of the first PDCCH may collide with a mapping position of the DM-RS of the second PDCCH. According to the above-described assumption, since the DM-RS sequence of the first PDCCH may be different from the DM-RS sequence of the second PDCCH, it may be preferable that the narrowband DM-RS is used to transmit both the first PDCCH and the second PDCCH without the collision between the DM-RS of the first PDCCH and the DM-RS of the second PDCCH.

The narrowband DM-RS may refer to a DM-RS mapped only to REGs to which the PDCCH is mapped among REGs constituting the CORESET. The wideband DM-RS may refer to a DM-RS mapped to all REGs of cluster(s) to which the PDCCH is mapped among cluster(s) constituting the CORESET. The cluster may mean a set of consecutive PRB(s) in the frequency domain among the PRB(s) constituting the CORESET. In the exemplary embodiments shown in FIGS. 9A and 9B, the CORESET may consist of one cluster, and one cluster may include 12 consecutive PRBs in the frequency domain.

On the other hand, in the exemplary embodiment shown in FIG. 9B, only the first PDCCH may be transmitted in a specific CORESET or a specific PDCCH monitoring occasion. In this case, since there is no collision problem between the PDCCH DM-RSs, the base station may transmit a wideband DM-RS for demodulation of the first PDCCH. When the wideband DM-RS is used, the PDCCH demodulation performance and the downlink transmission burst detection capability of the terminal may be improved.

The base station may transmit a specific PDCCH (e.g., PDCCH including the configuration information of the COT) together with a narrowband DM-RS or a wideband DM-RS according to a time point of the PDCCH monitoring occasion (or CORESET) of the terminal. To support both the narrowband DM-RS transmission and the wideband DM-RS transmission, the base station may dynamically change the type of PDCCH DM-RS (e.g., wideband DM-RS or narrowband DM-RS). The base station may transmit the narrowband DM-RS together with the PDCCH for demodulation of the PDCCH in a specific PDCCH monitoring occasion of the CORESET and/or search space set according to a situation. Alternatively, the base station may transmit the wideband DM-RS together with the PDCCH for demodulation of the PDCCH in another specific PDCCH monitoring occasion. This operation may be referred to as 'Method 130'. For example, in the exemplary embodiments shown in FIGS. 9A and 9B, the base station may dynamically select the type of PDCCH DM-RS for transmission of the first PDCCH.

In Method 130, the base station may transmit one DM-RS among the wideband DM-RS and the narrowband DM-RS in one PDCCH monitoring occasion within the CORESET and/or search space set. The terminal may not know the type of DM-RS transmitted by the base station in each PDCCH monitoring occasion. Accordingly, the terminal may monitor both the wideband DM-RS and the narrowband DM-RS in each PDCCH monitoring occasion. In this case, the terminal may attempt to detect the wideband DM-RS and the narrowband DM-RS in a predetermined order.

On the other hand, the wideband DM-RS and the narrowband DM-RS may be simultaneously transmitted in one PDCCH monitoring occasion (or CORESET). For the simultaneous transmission of the wideband DM-RS and the narrowband DM-RS, a subcarrier offset may be applied in an RE mapping procedure of the PDCCH DM-RS. When the PDCCH DM-RS (or a specific antenna port of the PDCCH DM-RS) is mapped in the frequency domain with an equal subcarrier spacing, the subcarrier offset may be set to one of values of 0 to (D−1). D may mean an interval between adjacent subcarriers to which the PDCCH DM-RS is mapped. When the PDCCH DM-RS is multiplexed in a plurality of different PDCCHs, the subcarrier offset may be configured for each of the wideband DM-RS and the narrowband DM-RS. Information indicating whether the narrowband DM-RS and/or the wideband DM-RS is transmitted or monitored, the subcarrier offset for the corresponding DM-RS, etc. may be included in configuration information of the CORESET, and the configuration information of the CORESET may be signaled from the base station to the terminal.

The base station or the terminal may change the downlink and/or uplink transmission bandwidth within one COT. In particular, according to the method proposed by the present disclosure, the base station or the terminal may expand the downlink and/or uplink transmission bandwidth by additionally performing an LBT operation within the COT. When the transmission bandwidth is dynamically changed within one COT, the ending time point of the COT may be changed. For example, when the downlink transmission bandwidth is expanded in the middle of the COT, the base station may terminate downlink communication earlier than an ending time point of the downlink communication expected at the time of occupying the channel (e.g., the starting time of the COT). In this case, the base station may advance the ending time point of the COT initiated by the base station. On the other hand, when the downlink transmission bandwidth is reduced in the middle of the COT, the base station may delay the ending time point of the COT initiated by the base station.

In this case, the base station may reconfigure the COT. The base station may transmit to the terminal reconfiguration information of the changed COT (e.g., reconfigured COT) (e.g., the ending time point of the (changed) COT, the length (or duration) of the (changed) COT, the starting time point of the (changed) COT, etc.). This operation may be referred to as 'Method 140'. The reconfiguration information of the COT may be signaled from the base station to the terminal within the COT. According to Method 140, when the (re)configuration information of the COT is transmitted several times within one COT, different (re)configuration information of the COT may be transmitted at each transmission time point. In order to interpret the k-th (re)configuration information of the COT received from the base station within one COT, it may be unnecessary for the terminal to know the (re)configuration information of the COT received previously from the base station (e.g., the (k−1)-th (re)configuration information of the COT).

The terminal may receive the different configuration information of the COT (e.g., the ending time point of the COT, the length (or duration) of the COT, the starting time point of the COT, etc.) within one COT. In this case, the terminal may consider that the last received configuration information of the COT is valid. For example, the terminal may receive a plurality of configuration information of the COT (e.g., a plurality of group common DCIs, a plurality of DCIs having the format 2_0) within one COT, and identify different ending time points of the COT based on the plurality of configuration information of the COT. In this case, the terminal may regard the ending time point of the COT derived through the last received configuration information of the COT as valid. The terminal may perform operations related to the COT based on the last received configuration information of the COT.

The operations related to the COT may include a PDCCH monitoring operation, a discovery reference signal (DRS) reception operation, an HARQ-ACK reporting operation, an LBT operation, and the like. The DRS reception operation may include an operation for the terminal to receive or detect at least one of PSS, SSS, PBCH, and PBCH DM-RS. In addition, the DRS reception operation may include a reception operation of a signal and/or a channel (e.g., PDCCH, PDSCH, CSI-RS) additionally included in or associated with the DRS. Details of the PDCCH monitoring operation will be described below.

The LBT operation may include an operation of determining whether to transmit a configured grant PUSCH, an LBT operation for transmission of a configured grant PUSCH, and the like. The terminal may perform an LBT operation according to the category 4 (or category 3) within the COT initiated by the terminal, and may transmit a configured grant PUSCH using configured grant resources. The configured grant PUSCH may be a PUSCH scheduled by a configured grant. On the other hand, when the configuration information of the COT is received, the terminal may identify configured grant resources belonging to the COT initiated by the base station based on the configuration information of the COT. The terminal may not transmit a configured grant PUSCH using the configured grant resources belonging to the COT initiated by the base station.

Alternatively, the terminal may transmit a configured grant PUSCH in the configured grant resource (e.g., the configured grant resources belonging to the COT initiated by the base station) by performing an LBT operation according to a changed category (e.g., category 1 or 2). The above-described operation may be a predefined operation. Alternatively, the base station may instruct the terminal to perform the above-described operation.

The base station may inform the terminal of information indicating whether a configured grant PUSCH can be transmitted within the COT initiated by the base station, an LBT category, and/or an LBT gap. For example, the base station may instruct the terminal to perform an LBT operation according to the category 2 for uplink transmission. In this case, the LBT gap configured to the terminal may be 16 µs or 25 µs. The information indicating whether a configured grant PUSCH can be transmitted within the COT initiated by the base station, an LBT category, and/or an LBT gap may be semi-statically configured through RRC signaling. Alternatively, the information indicating whether a configured grant PUSCH can be transmitted within the COT initiated by the base station, the LBT category, and/or the LBT gap may be dynamically indicated through DCI. Here, the DCI may be DCI (e.g., group common DCI, DCI format 2_0) including the above-described configuration information of the COT.

Meanwhile, a time point at which the terminal finally receives the configuration information of the COT may be different for each LBT subband. For example, the configuration information of the COT that the terminal receives last may include only configuration information of the COT for some LBT subband(s). In this case, the above-described method may be applied to each LBT subband constituting the COT.

Figure 10:
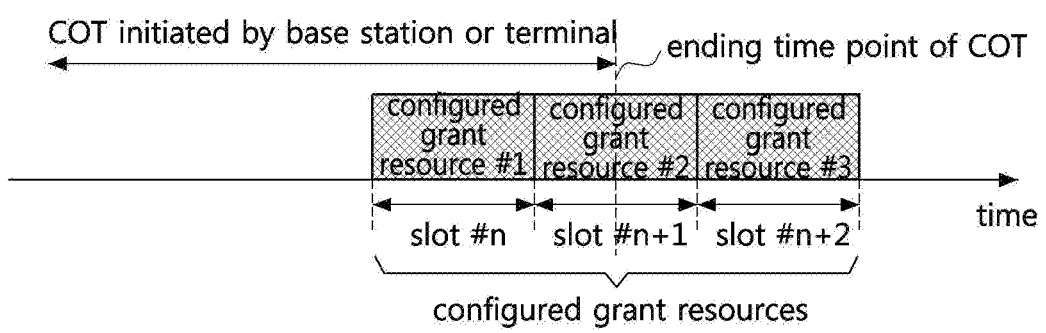
FIG. 10 is a conceptual diagram illustrating a first exemplary embodiment of a method of transmitting a PUSCH in a configured grant resource overlapping with a COT.

FIG. 10 is a conceptual diagram illustrating a first exemplary embodiment of a method of transmitting a PUSCH in a configured grant resource overlapping with a COT.

Referring to FIG. 10, a part of the configured grant resource (e.g., configured grant PUSCH resource) configured to the terminal may be included in the COT. The COT may be a COT initiated by the base station or a COT initiated by the terminal. The ending time point of the COT may be located in the middle of the duration of the configured grant resource configured to the terminal. The configured grant resources configured to the terminal may include configured grant resources #1 to #3. The configured grant resource #1 may belong completely to the COT, a part of the configured grant resource #2 may belong to the COT, and the configured grant resource #3 may not belong to the COT. When the COT is a COT initiated by the base station, the terminal may obtain the ending time point of the COT based on the above-described method.

In this case, the terminal may transmit a configured grant PUSCH in the configured grant resource #2. The terminal may transmit a configured grant PUSCH in a period (e.g., symbol(s), uplink symbol(s), flexible symbol(s)) of the configured grant resource #2, which belongs to the COT. That is, the terminal may transmit the PUSCH using only a part of the configured grant resource #2. In this case, resource mapping of the PUSCH may not be changed. In addition, when L or more symbols of the configured grant resource belongs to the COT, the terminal may transmit a configured grant PUSCH in the corresponding configured grant resource. L may be an integer equal to or greater than 1. For example, L may be 2. Alternatively, when REs (e.g., metric corresponding to the REs) of the configured grant resource, which are more than a predetermined number, belong to the COT, the terminal may transmit a configured grant PUSCH in the corresponding configured grant resource. Alternatively, the terminal may not transmit a configured grant PUSCH in the configured grant resource #2. Alternatively, the terminal may transmit a configured grant PUSCH using the entire configured grant resource #2.

The above-described method may be applied to a transmission operation of a dynamic grant PUSCH (e.g., a PUSCH dynamically scheduled by DCI). When a part of a resource region of the dynamically scheduled PUSCH belongs to the COT, the terminal may or may not transmit the PUSCH based on the above-described method.

In the above-described exemplary embodiment, the terminal may receive the information indicating whether a configured grant PUSCH can be transmitted within the COT, the LBT category, the LBT gap, etc. from the base station. In this case, the terminal may transmit a PUSCH using a configured grant resource (e.g., configured grant resource #2) partially overlapping with the COT based on the information received from the base station. This operation may be referred to as 'Method 150'. For example, the terminal may receive information instructing not to transmit a configured grant PUSCH within the COT from the base station. In this case, the terminal may not transmit a configured grant PUSCH not only in the configured grant resource #1 but also in the configured grant resource #2. When uplink burst transmission (e.g., PUSCH transmission) is started in the configured grant resource #2, the terminal may perform an LBT operation just before or in a starting region of the configured grant resource #2. In this case, the terminal may perform an LBT operation using the LBT category (e.g., category 1 or 2), the LBT gap (e.g., 16 μs or 25 μs), etc. indicated by the base station.

Alternatively, the terminal may transmit a configured grant PUSCH according to a predefined rule in the configured grant resource partially overlapping with the COT regardless of the indication of the base station. For example, the terminal may determine whether to transmit a PUSCH in the configured grant resource partially overlapping with the COT regardless of the indication of the base station. When uplink burst transmission is started in the configured grant resource partially overlapping with the COT, the terminal may perform an LBT operation according to the category 4 (or category 3) just before or in a starting region of the corresponding configured grant resource regardless of the indication of the base station.

Figure 11:
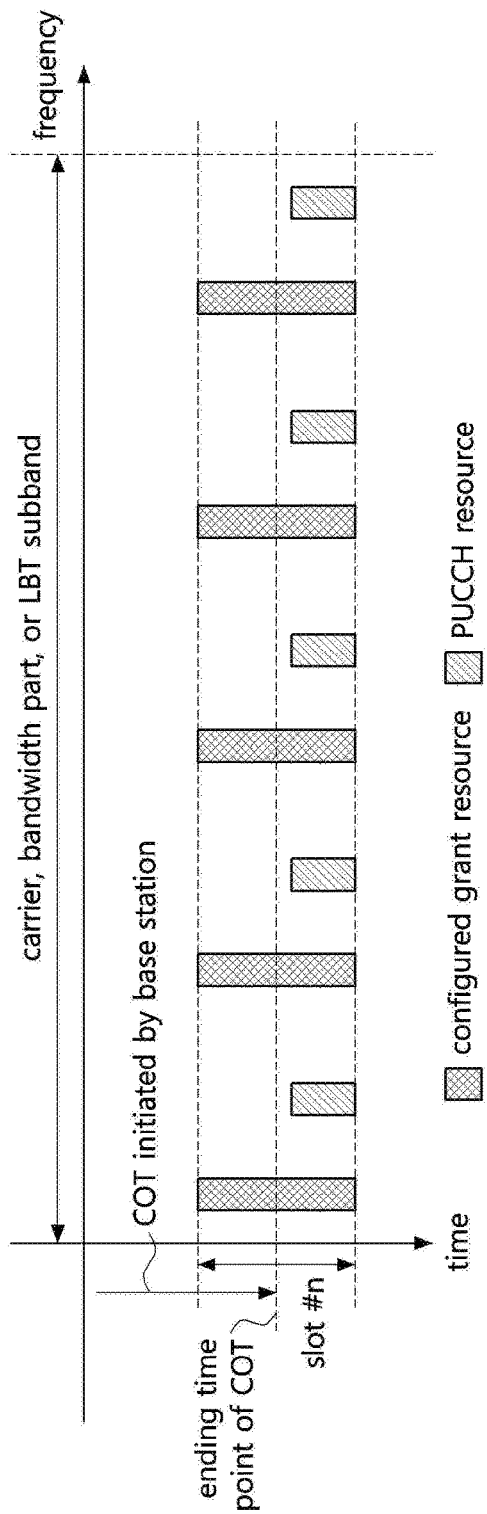
FIG. 11 is a conceptual diagram illustrating a second exemplary embodiment of a method of transmitting a PUSCH in a configured grant resource overlapping with a COT.

FIG. 11 is a conceptual diagram illustrating a second exemplary embodiment of a method of transmitting a PUSCH in a configured grant resource overlapping with a COT.

Referring to FIG. 11, the base station may configure configured grant resources and PUCCH resources within the slot #n to the terminal. Each of the configured grant resources and the PUCCH resources may be mapped to one or more interlaces. In this case, the ending time point of the COT may be in the middle of the slot #n. When the COT is a COT initiated by the base station, the terminal may obtain the ending time point of the COT through signaling from the base station. A part of the configured grant resources may belong to the COT and the PUCCH resources may not belong to the COT.

In this case, the terminal may transmit a PUSCH in the configured grant resource according to the above-described method. For example, the terminal may transmit a PUSCH only in a period of the configured grant resource, which belongs to the COT. In this case, the terminal may determine whether to piggy back UCI configured to be transmitted through a PUCCH (e.g., HARQ-ACK, CSI, scheduling request (SR), etc.) on the PUSCH based on a temporal overlap between a PUCCH resource and the period in which the PUSCH is actually transmitted. This operation may be referred to as 'Method 160'. In the exemplary embodiment shown in FIG. 11, the PUCCH resource may not overlap in the time domain with the period (e.g., a period up to the ending time point of the COT) in which the PUSCH is actually transmitted. In this case, the terminal may not piggyback the UCI on the PUSCH. For another example, the terminal may transmit the PUSCH in the entire configured grant resource. In this case, since the PUCCH resource overlaps in the time domain with the period in which the PUSCH is actually transmitted, the terminal may piggyback the UCI on the PUSCH.

Method 160 may be applied to the licensed band communication as well as the unlicensed band communication. The terminal may determine whether to multiplex the PUSCH and the PUCCH based on whether the resource region actually transmitted by the terminal and the resource region of the PUCCH overlap, rather than a nominal resource region allocated by the base station for the PUSCH transmission.

[Transmission Bandwidth Acquisition Method]

One bandwidth part may include a plurality of LBT subbands. In this case, the terminal may need to acquire transmission bandwidth information of a downlink transmission burst transmitted by the base station as well as a starting time point of the downlink transmission burst. The transmission bandwidth information may include information on LBT subband(s) (e.g., consecutive LBT subband(s) in the frequency domain) to which the downlink transmission burst (e.g., downlink transmission burst transmitted according to a success of an LBT operation) transmitted by the base station belongs. The base station may transmit the transmission bandwidth information to the terminal explicitly or implicitly through a physical layer signal and/or a physical layer channel. For example, the terminal may acquire the transmission bandwidth information by performing a downlink initial signal detection operation, a COT indication information acquisition operation, or the like.

The transmission bandwidth information may be transmitted through one or more LBT subbands among the LBT subband(s) in which the downlink transmission burst is transmitted. This operation may be referred to as 'Method 200'. Alternatively, the transmission bandwidth information may be transmitted in all the LBT subbands in which the downlink transmission burst is transmitted. This operation may be referred to as 'Method 210'. Method 200 and Method 210 may be performed as follows.

Figure 12A:
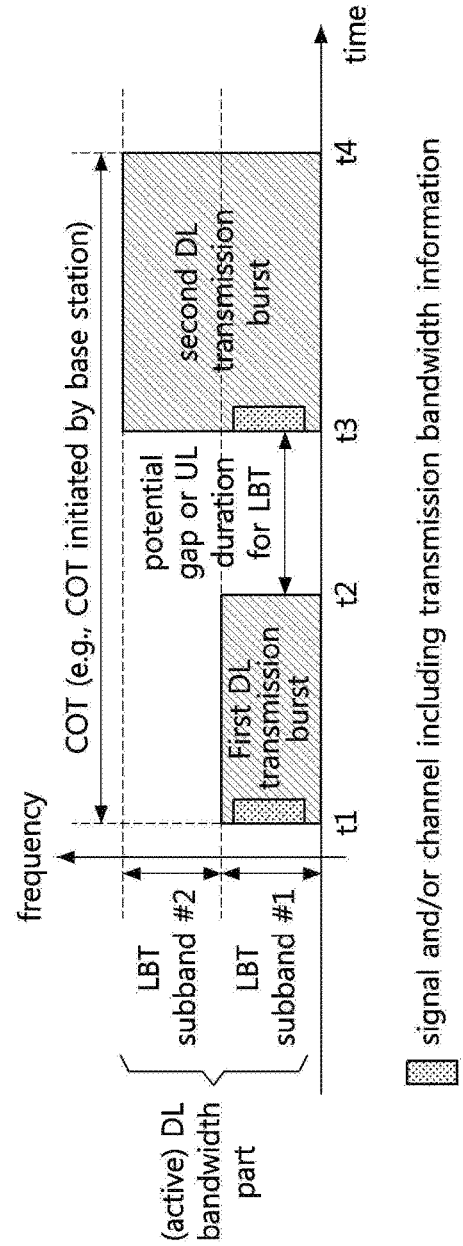
FIG. 12A is a conceptual diagram illustrating a first exemplary embodiment of a method of changing a downlink transmission bandwidth and a method of indicating a transmission bandwidth within a COT initiated by a base station.

FIG. 12A is a conceptual diagram illustrating a first exemplary embodiment of a method of changing a downlink transmission bandwidth and a method of indicating a transmission bandwidth within a COT initiated by a base station, and FIG. 12B is a conceptual diagram illustrating a second exemplary embodiment of a method of changing a downlink transmission bandwidth and a method of indicating a transmission bandwidth within a COT initiated by a base station.

Referring to FIGS. 12A and 12B, two downlink transmission bursts (e.g., first and second downlink transmission bursts) may be transmitted within a COT initiated by the base station. The transmission bandwidth of the first downlink transmission burst may be different from the transmission bandwidth of the second downlink transmission burst. The base station may expand the downlink transmission bandwidth by additionally performing an LBT operation in an uplink duration and/or a gap period within the COT initiated by the base station.

In the exemplary embodiment shown in FIG. 12A, according to Method 200, transmission bandwidth information may be transmitted in some LBT subbands (e.g., LBT subband #1). For example, the transmission bandwidth information may be transmitted through a group common PDCCH (e.g., DCI format 2_0 or a new DCI format extended based on the DCI format 2_0) in a CORESET and/or search space set configured in the LBT subband #1. Here, the search space set may mean a PDCCH search space set. In this case, when a plurality of downlink transmission bursts are transmitted within one COT, the LBT subband(s) through which the transmission bandwidth information is transmitted in the plurality of downlink transmission bursts may be the same.

For example, when the transmission bandwidth information is obtained through the LBT subband #1 in the first downlink transmission burst, the terminal may expect to obtain the transmission bandwidth information through the LBT subband #1 in the second downlink transmission burst. On the other hand, the transmission bandwidth information may be different in the plurality of downlink transmission bursts. This definition may be applied to other exemplary embodiments. In Method 200, when the transmission bandwidth information is transmitted in some LBT subband(s) of the bandwidth part, the some LBT subband(s) may include the primary LBT subband described above.

In the exemplary embodiment shown in FIG. 12B, according to Method 210, the transmission bandwidth information may be transmitted in all LBT subbands. In the first downlink transmission burst period, the transmission bandwidth information may be transmitted through the LBT subband #1. In the second downlink transmission burst period, the transmission bandwidth information may be transmitted through the LBT subbands #1 and #2. For example, the transmission bandwidth information may be implicitly transmitted through a physical layer signal and/or a physical layer channel, and the physical layer signal and/or the physical layer channel may be transmitted in all the LBT subbands constituting the downlink transmission burst.

For example, a plurality of sequences (e.g., DM-RS sequences) may be defined, and the base station may transmit to the terminal one sequence (e.g., a sequence indicating the transmission bandwidth) among the plurality of sequences. For another example, the transmission bandwidth information may be transmitted on a group common PDCCH (e.g., DCI format 2_0, or a new DCI format extended based on the DCI format 2_0) of each LBT subband. The terminal may not know the LBT subband(s) through which the downlink transmission burst is transmitted. Accordingly, the terminal may perform a detection/reception operation of the signal and/or the channel including the transmission bandwidth information in all the LBT subband(s) constituting the bandwidth part. The terminal may assume that a downlink transmission burst is received in the LBT subband(s) (e.g., consecutive LBT subband(s) in the frequency domain) in which the signal and/or the channel including the transmission bandwidth information is detected or received.

When the number of sets of the LBT subband(s) (e.g., sets of consecutive LBT subband(s) in the frequency domain) in which the signal and/or the channel including the transmission bandwidth information is detected and received is equal to or greater than 2, the terminal may assume that a downlink transmission burst is received in all the sets of the LBT subband(s). Alternatively, the terminal may assume that a downlink transmission burst is received in one set among the sets of the LBT subband(s). The terminal may determine one of the sets of the LBT subband(s) based on priorities between the LBT subband(s), representative LBT subband(s), or the like. The base station may inform the terminal in advance of the priorities between the LBT subband(s), the representative LBT subband(s), or the like.

Figure 13B:
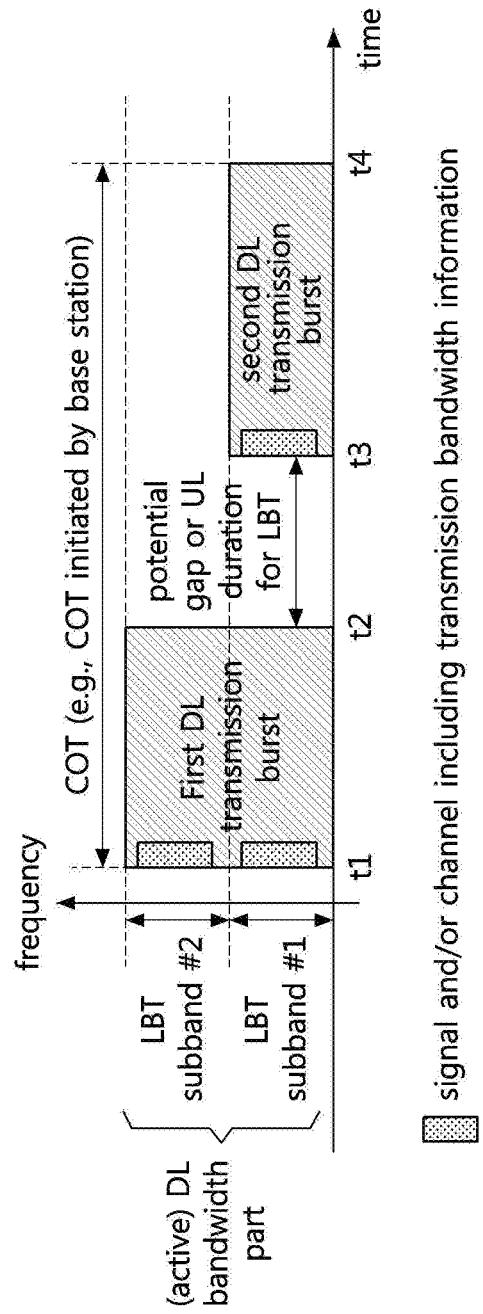
FIG. 13B is a conceptual diagram illustrating a fourth exemplary embodiment of a method of changing a downlink transmission bandwidth and a method of indicating a transmission bandwidth within a COT initiated by a base station.

FIG. 13A is a conceptual diagram illustrating a third exemplary embodiment of a method of changing a downlink transmission bandwidth and a method of indicating a transmission bandwidth within a COT initiated by a base station, and FIG. 13B is a conceptual diagram illustrating a fourth exemplary embodiment of a method of changing a downlink transmission bandwidth and a method of indicating a transmission bandwidth within a COT initiated by a base station.

Referring to FIGS. 13A and 13B, two downlink transmission bursts (e.g., first and second downlink transmission bursts) may be transmitted within a COT initiated by the base station. The transmission bandwidth of the first downlink transmission burst may be different from the transmission bandwidth of the second downlink transmission burst. The base station may reduce the downlink transmission bandwidth by additionally performing an LBT operation in an uplink duration and/or a gap period within the COT initiated by the base station. Alternatively, the base station may reduce the downlink transmission bandwidth regardless of a result of the LBT operation.

In the exemplary embodiment shown in FIG. 13A, according to Method 200, the transmission bandwidth information may be transmitted in some LBT subbands (e.g., LBT subband #1). In the exemplary embodiment shown in FIG. 13B, according to Method 210, the transmission bandwidth information may be transmitted in all LBT subbands. In the first downlink transmission burst period, the transmission bandwidth information may be transmitted through the LBT subbands #1 and #2. In the second downlink transmission burst period, the transmission bandwidth information may be transmitted through the LBT subband #1.

According to the exemplary embodiments described above, the operation of changing the transmission bandwidth with respect to the same transmission direction (e.g., downlink) within the COT may be applied between a plurality of transmission bursts (e.g., a plurality of downlink transmission bursts). On the other hand, the transmission bandwidth may be changed even within one transmission burst (e.g., one downlink transmission burst). In this case, Method 200 and Method 210 may be applied within one transmission burst.

FIG. 14 is a conceptual diagram illustrating a fifth exemplary embodiment of a method of changing a downlink transmission bandwidth and a method of indicating a transmission bandwidth within a COT initiated by a base station.

Referring to FIG. 14, one bandwidth part may include three LBT subbands. The base station may succeed in an LBT operation in the LBT subbands #2 and #3 at a time point t1 or just before the time point t1. In this case, the base station may acquire a COT from t1 and transmit a downlink transmission burst within the COT. In addition, the base station may transmit information (e.g., DCI, a reference signal sequence, a downlink initial signal sequence, etc.) indicating that the base station occupies the COT in the LBT subbands #2 and #3 to the terminal at the time point t1. The terminal may receive the information indicating that the COT is occupied by the base station, detect a downlink transmission burst in the LBT subbands #2 and #3, and perform a PDCCH monitoring operation.

Here, a guard band may be inserted between the LBT subband #2 and the LBT subband #3. The guard band may be a frequency gap in which no signal is transmitted. The guard band may be maintained for a preconfigured time period. For example, the preconfigured time period may be $\Delta T$, which is a period from the starting time point t1 to a time point t2 of the COT. The guard band may be used for data transmission after the time point t2. $\Delta T$ (or t2) may be predefined in the technical specification. Alternatively, the base station may configure $\Delta T$ (or t2) to the terminal. $\Delta T$ (or t2) may vary depending on a success time point of the LBT operation performed by the base station (e.g., starting time point of the COT). For example, t2 may be defined (or configured) as the K-th slot boundary within the COT. K may be a natural number. $\Delta T$ for a case when the LBT operation succeeds in a front region of a slot may be different from ΔT for a case when the LBT operation succeeds in a rear region of the slot.

The terminal may not detect a downlink transmission burst in some LBT subband(s) constituting the COT at the time point when the base station initiates the COT or transmits information informing that the COT is initiated. In the exemplary embodiment shown in FIG. 14, the terminal may not detect a downlink transmission burst in the LBT subband #1 at the time point t1. This is because the terminal does not detect the information informing that the base station occupies the LBT subband #1, which is transmitted from the base station. Alternatively, even though the base station occupies the LBT subband #1, the base station may not intentionally transmit information informing that the base station occupies the LBT subband #1 to the terminal. In this case, the terminal may not detect the information informing that the base station occupies the LBT subband #1.

The base station may transmit information (e.g., DCI, reference signal, downlink initial signal, etc.) informing that the base station occupies the COT in the LBT subbands #1 to #3 at the time point t3. The terminal may confirm that the base station occupies the LBT subbands #1 to #3 by receiving the information informing that the base station occupies the COT. Accordingly, the terminal may expect to receive a downlink transmission burst in the LBT subband #1 as well as the LBT subbands #2 and #3 from the time point t3. In terms of the operation of the terminal, the transmission bandwidth may be changed within one transmission burst. On the other hand, in terms of the operation of the base station, it may be difficult to change the transmission bandwidth within one transmission burst due to the half-duplex constraint, the characteristics of the LBT operation, the frequency regulation condition, or the like. Accordingly, in order to transmit a downlink signal and/or a downlink channel through the LBT subband #1 from the time point t3, the base station may need to transmit the downlink signal and/or the channel through the LBT subband #1 in a period from t1 to t3.

In the exemplary embodiment shown in FIG. 14, the transmission bandwidth information may be transmitted in an arbitrary LBT subband and/or at an arbitrary time point. The base station may transmit the transmission bandwidth information to the terminal in the LBT subbands #2 and #3 at the time point t1. The transmission bandwidth information transmitted in each of the LBT subbands #2 and #3 may include information indicating whether the corresponding LBT subband is occupied. In this case, the terminal may need to receive the transmission bandwidth information in both the LBT subbands #2 and #3 to determine whether the LBT subbands #2 and #3 are occupied. Alternatively, the transmission bandwidth information transmitted in each LBT subband may include information indicating whether a plurality of LBT subbands are occupied. In this case, the same transmission bandwidth information may be transmitted through the plurality of LBT subbands. Accordingly, the terminal may receive the transmission bandwidth information in one LBT subband among the LBT subbands #2 and #3 to determine whether the LBT subbands #2 and #3 are occupied.

On the other hand, the transmission bandwidth information transmitted in the plurality of LBT subbands may be configured independently of each other. For example, the transmission bandwidth information transmitted in the plurality of LBT subbands may be the same. Alternatively, the transmission bandwidth information transmitted in the plurality of LBT subbands may be different from each other. In this case, the terminal may receive the transmission bandwidth information in both the LBT subbands #2 and #3 to determine whether the LBT subbands #2 and #3 are occupied, and may identify a set of the LBT subbands occupied by the base station by interpreting the plurality of transmission bandwidth information (e.g., the transmission bandwidth information received in the LBT subbands #2 and #3). That is, the terminal may perform a reception operation (e.g., monitoring operation) in all LBT subbands configured for the terminal to receive (e.g., monitor) the transmission bandwidth information.

For example, the transmission bandwidth information may be a bitmap, and each bit of the bitmap may correspond to each LBT subband. The length of the bitmap may be the number of LBT subbands. A bit set to '1' in the bitmap may indicate that the corresponding LBT subband is occupied, and a bit set to '0' in the bitmap may indicate that the corresponding LBT subband is not occupied. Alternatively, the bit set to '1' in the bitmap may indicate that the corresponding LBT subband is not occupied, and the bit set to '0' in the bitmap may indicate that the corresponding LBT subband is occupied. In this case, the bitmaps transmitted in the plurality of LBT subbands may have the same length and different bit strings.

In order to determine whether the LBT subband is occupied, the terminal may apply an operation (e.g., bit (or bitwise) operation) according to a predefined rule to bit(s) corresponding to the LBT subband(s) obtained from one or more bitmaps, and determine whether the LBT subband is occupied based on a result of the operation. For example, when the result of the operation is 1, the terminal may determine that the base station occupies the corresponding LBT subband. That is, the terminal may assume that the base station transmits a downlink transmission burst in the corresponding LBT subband.

The signal and/or the channel including the transmission bandwidth information may further include other information. For example, other information may include slot format information of slot(s) constituting the COT, configuration information of the COT, information indicating whether the COT is shared, information indicating whether to allow PUSCH transmission in a configured grant resource within the COT, and the like. The configuration information of the COT may include the starting time point, the ending time point, the length (or duration) of the COT, or the like.

When one bandwidth part includes a plurality of LBT subbands, the base station may obtain starting time point information, transmission bandwidth information, etc. of an uplink transmission burst from the terminal. The starting time point information and the transmission bandwidth information of the uplink transmission burst may be transmitted from the terminal to the base station through uplink control information (UCI). The UCI may be transmitted on a PUCCH. Alternatively, the UCI may be transmitted as piggybacked on a PUSCH. The UCI may be transmitted through a starting region of the uplink transmission burst. The starting region of the uplink transmission burst may be one or more symbols among symbol(s) from the first symbol to the Y-th symbol. Here, Y may be a natural number.

Alternatively, the starting time point information and the transmission bandwidth information of the uplink transmission burst may be implicitly transmitted through a physical layer signal and/or a physical layer channel. For example, a plurality of sequences (e.g., uplink DM-RS sequence, SRS sequence, etc.) may be defined, and the terminal may select one sequence among the plurality of sequences, and transmit the selected sequence to the base station. Here, the selected sequence may indicate the starting time point information and the transmission bandwidth information of the uplink transmission burst. In this case, the above-described methods (e.g., Method 200 and Method 210) may be equally or similarly applied to determine the LBT subband(s) in which the starting time point information and the transmission bandwidth information of the uplink transmission burst are transmitted.

Method 200 and method 210 may be applied simultaneously for one COT or one transmission burst. Two time periods may be defined (or configured) within one COT or one transmission burst, and Method 200 and Method 210 may be applied to the two time periods, respectively. For example, Method 210 may be used in a starting period of the COT or transmission burst, and Method 200 may be used in the remaining period. The starting period of the COT or transmission burst may be symbols (e.g., Y symbols) from the first symbol to the Y-th symbol. Alternatively, the starting period of the COT or transmission burst may be slots (e.g., Z slots) from the first slot to the Z-th slot. Z may be a natural number. The Z slot(s) may include a partial slot depending on the success time point of the LBT operation. The ending time point (e.g., Y or Z) of the starting period of the COT or transmission burst may be predefined in the technical specification. Alternatively, the base station may inform the terminal of ending time point information of the starting period of the COT or transmission burst.

For example, when a group common PDCCH (e.g., DCI format 2_0, or a new DCI format extended based on the DCI format 2_0) is used for transmission of a downlink transmission burst, the terminal may monitor a group common PDCCH in each LBT subband in the starting period of the COT or downlink transmission burst according to Method 210. In addition, the terminal may monitor a group common PDCCH in one or more LBT subbands in the remaining period according to Method 200. Information on a set of the LBT subband(s) in which the monitoring operation on the group common PDCCH is performed in the remaining period may be signaled from the base station to the terminal.

The information on the set of the LBT subband(s) in which the monitoring operation on a group common PDCCH is performed in the remaining period may be dynamically signaled through the group common PDCCH in the starting period of the COT or downlink transmission burst. Accordingly, the terminal may identify the set of the LBT subband(s) in which the monitoring operation on a group common PDCCH is performed in the remaining period by receiving the group common PDCCH in the starting period of the COT or downlink transmission burst. Alternatively, the information on the set of the LBT subband(s) in which the monitoring operation on a group common PDCCH is performed in the remaining period may be semi-statically configured by RRC signaling. The information of the set of the LBT subband(s) in which the monitoring operation on a group common PDCCH is performed in the remaining period may be configured by a combination of RRC signaling and DCI.

Meanwhile, the base station may transmit to the terminal information instructing to receive a signal and/or a channel in a frequency region (e.g., LBT subband) outside the transmission bandwidth of the downlink transmission burst. The terminal may receive a signal and/or a channel in the frequency region outside the transmission bandwidth of the downlink transmission burst based on the corresponding information. The signal and/or channel in the frequency region (e.g., LBT subband) outside the transmission bandwidth of the downlink transmission burst may be a PDSCH.

The information instructing to receive a signal and/or a channel in a frequency region outside the transmission bandwidth of the downlink transmission burst may be dynamic indication information by physical layer signaling (e.g., DCI indicating scheduling of a PDSCH). Alternatively, the information instructing to receive a signal and/or a channel in a frequency region outside the transmission bandwidth of the downlink transmission burst may include a dynamic indicator other than the scheduling indicator.

Figure 15:
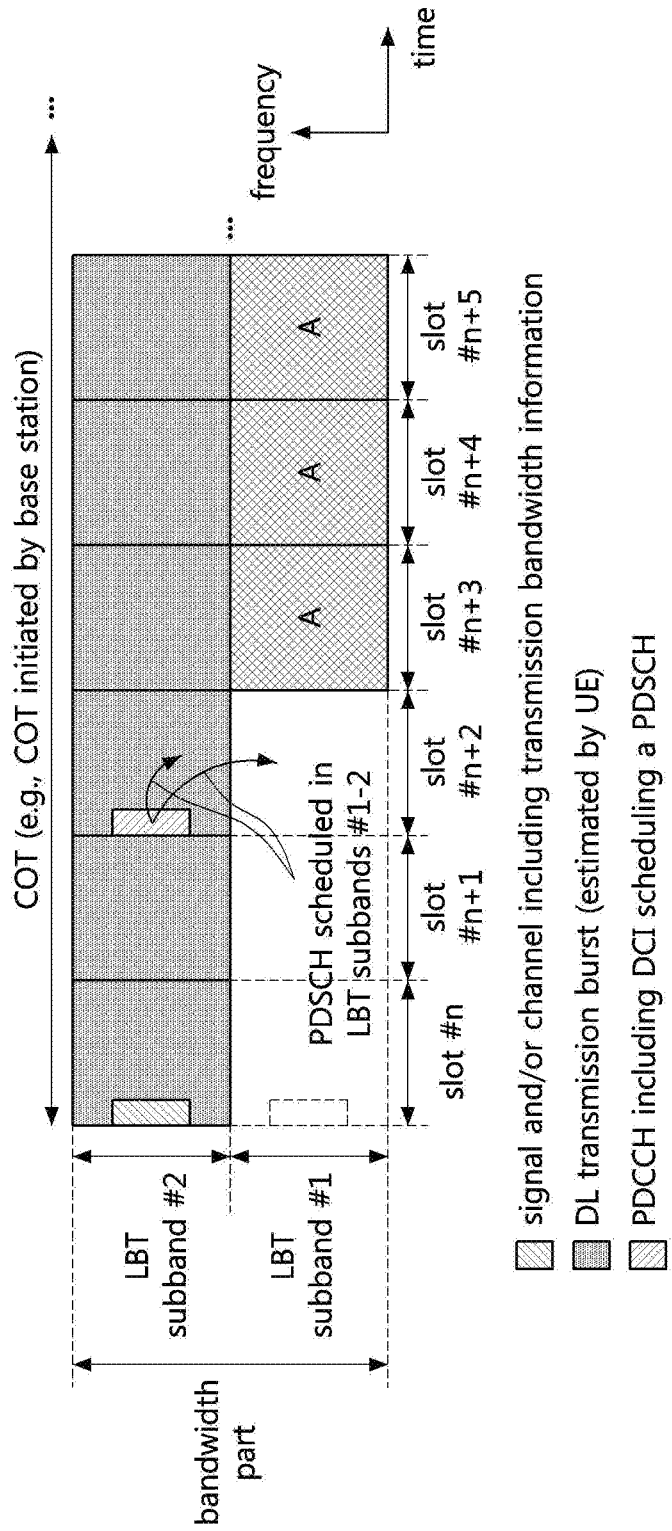
FIG. 15 is a conceptual diagram illustrating a first exemplary embodiment of a method of expanding a transmission bandwidth by PDSCH scheduling indication.

FIG. 15 is a conceptual diagram illustrating a first exemplary embodiment of a method of expanding a transmission bandwidth by PDSCH scheduling indication.

Referring to FIG. 15, one bandwidth part may include two LBT subbands. The terminal may detect (or receive) a downlink transmission burst in the LBT subband #2 of the slot #n and perform a PDCCH monitoring operation for the downlink transmission burst. In this case, the terminal may receive a PDCCH through the LBT subband #2 of the slot #n+2, and may obtain DCI scheduling a PDSCH from the PDCCH. The PDSCH may be allocated to the LBT subband #1 as well as the LBT subband #2.

In this case, even when the transmission bandwidth of the COT in which the terminal expects to receive at the corresponding time point (e.g., when scheduled by the DCI) does not include the LBT subband #1, the terminal may receive the PDSCH in the LBT subbands #1 and #2 according to the scheduling indication of the DCI. The terminal may assume that a downlink transmission burst transmitted from the base station through the LBT subband #1 at a time point before the slot #n+2 (e.g., the slot #n in which the terminal acquires the COT in the LBT subband #2) is not detected. That is, when the information instructing to receive a signal and/or a channel in a frequency region (e.g., LBT subband) outside the transmission bandwidth of the downlink transmission burst is received from the base station, the terminal may receive the signal and/or the channel according to the instruction of the base station. This operation may be referred to as 'Method 230'.

Alternatively, the terminal may receive a signal and/or a channel only within the transmission bandwidth in which reception of the downlink transmission burst is expected at the corresponding time point (e.g., when scheduled by the DCI), and may not receive a signal and/or a channel in a frequency region other than the transmission bandwidth in which reception of the downlink transmission burst is expected. Accordingly, the terminal may receive a PDSCH in the LBT subband #2 of the slot #n+2. Further, the terminal may determine that the PDSCH scheduling indication according to the DCI received in the slot #n+2 is wrong, and may not receive a PDSCH in the LBT subband #1 of the slot #n+2.

According to Method 230, the terminal may consider that the LBT subband #1 is occupied by the base station through a PDSCH scheduling indication from the base station. Accordingly, the terminal may expect to receive a downlink transmission burst through the LBT subband #1 in the slot #n+2 to which the PDSCH is allocated and slot(s) after the slot #n+2. In the exemplary embodiment shown in FIG. 15, the terminal may expect to receive the downlink transmission burst from the base station in resource regions indicated by 'A', and may perform a PDCCH monitoring operation for receiving the downlink transmission burst. At the same time or separately, the terminal may expect to receive the downlink transmissions burst through the LBT subband #1 in slot(s) (e.g., slot #n and slot #n+1) before the slot #n+2 to which the PDSCH is allocated. The terminal may assume that the time point at which the base station occupies the LBT subband #1 is the same as the time point at which the terminal acquires the COT in the LBT subband #2. Alternatively, the terminal may assume that the time point at which the base station occupies the LBT subband #1 is earlier than the time point at which the terminal acquires the COT in the LBT subband #2.

Based on the above assumption, the terminal may perform a PDCCH monitoring operation in the LBT subband #1, which corresponds to the PDCCH monitoring operation within the COT (e.g., LBT subband #2). For example, the terminal may perform a PDCCH monitoring operation of a third period to be described later in the LBT subband #2 of the slot #n+3. In this case, the terminal may assume the same period as the third period also in the LBT subband #1 of the slot #n+3, and may perform a PDCCH monitoring operation in the LBT subband #1 of the slot #n+3. The ending time of the LBT subband #1 may be the same as the ending time point of the LBT subband #2. The terminal may regard the ending time point of the COT of the LBT subband expanded by Method 230 as the same as the ending time point of the COT of other LBT subband(s) constituting the same downlink transmission burst. When there are two or more different LBT subbands constituting the same downlink transmission burst, the terminal may perform a PDCCH monitoring operation in the expanded LBT subband based on one among the two or more LBT subbands.

The terminal may assume the same PDCCH monitoring period as the LBT subband #2 in the slot #n+2 (e.g., slot #n+2 of the LBT subband #1) to which PDSCH is allocated, and may perform a PDCCH monitoring operation in the LBT subband #1. On the other hand, in another method, the terminal may perform a PDCCH monitoring operation (e.g., PDCCH monitoring operation of a first period to be described later) in the LBT subband #1 of the slot #n+2, which corresponds to the PDCCH monitoring operation performed outside the COT.

When a transmission bandwidth indicator (e.g., transmission bandwidth information) is received at the reception time point of the PDSCH resource allocation information or after the corresponding reception time point, the terminal may expect that the transmission bandwidth indicator includes information on the LBT subband expanded by dynamic resource allocation (e.g., information indicating the LBT subband #1 is occupied by the base station). Alternatively, when the LBT subband(s) expanded by the PDSCH resource allocation and the LBT subband(s) indicated by the transmission bandwidth indicator do not coincide, the terminal may regard one of the PDSCH resource allocation information and the transmission bandwidth indicator as wrong, and may determine whether to perform a reception operation in the LBT subband #1 based on one of the PDSCH resource allocation information and the transmission bandwidth indicator.

In the exemplary embodiment shown in FIG. 15, the indicator for scheduling the PDSCH in the LBT subband #1 of the slot #n+2 may be transmitted through the LBT subband #2 (e.g., an LBT subband belonging to the same bandwidth part as the LBT subband #1 or an LBT subband constituting the same downlink transmission burst as the LBT subband #1). Alternatively, the PDSCH scheduling indicator may be transmitted to the terminal in another LBT subband (e.g., LBT subband in another carrier or another bandwidth part).

The method of allocating a resource outside the transmission bandwidth and the method of expanding a transmission bandwidth according to Method 230 may be performed through a cross-carrier scheduling scheme, a cross-bandwidth part scheduling scheme, and the like. Method 230 may be used for a PUSCH transmission operation in an uplink transmission burst period. For example, the terminal may receive information instructing to transmit an uplink signal and/or an uplink channel (e.g., PUSCH) in a frequency region (e.g., LBT subband) outside of the transmission bandwidth of uplink transmission burst assumed by the terminal. In this case, the terminal may transmit an uplink signal and/or an uplink channel in a frequency region according to the indication of the corresponding information. In addition, the terminal may expand the transmission bandwidth of uplink transmission burst on the basis of the reception time point of the information or a time point indicated by the information, and may transmit an uplink signal and/or an uplink channel by using the expanded transmission bandwidth within the COT.

[PDCCH Monitoring Operation]

A downlink initial signal may be used by the terminal for a detection operation of a downlink transmission burst. The downlink initial signal may be allocated in a starting period of the downlink transmission burst. The terminal may monitor the downlink initial signal to detect the downlink transmission burst, and may skip other monitoring operations (e.g., PDCCH monitoring operations). The terminal may successfully detect the downlink transmission burst through reception of the downlink initial signal. The terminal may perform a PDCCH monitoring operation for a preconfigured time (e.g., COT or MCOT) from the time point of detecting the downlink transmission burst. PDCCH monitoring configuration (or PDCCH monitoring operation) of the terminal may be dynamically changed based on the detection time point of the downlink transmission burst. Therefore, power required for the PDCCH monitoring operation of the terminal can be reduced.

Various downlink signals and channels may be used as the downlink initial signal. For example, a PDCCH DM-RS may be used as the downlink initial signal. Alternatively, a wideband DM-RS of CORESET may be used as the downlink initial signal. In this case, the wideband DM-RS may not be used for demodulation of a PDCCH. Alternatively, a DM-RS of a group common PDCCH may be used as the downlink initial signal. Alternatively, a DM-RS of a group common PDCCH and control information included in the group common PDCCH may be used as the downlink initial signal. Alternatively, a wideband DM-RS of a group common PDCCH and control information included in the group common PDCCH may be used as the downlink initial signal. In this case, when group common DCI is successfully received (e.g., when a cyclic redundancy check (CRC) thereof succeeds), the terminal may detect a downlink transmission burst. Alternatively, a CSI-RS may be used as the downlink initial signal.

In unlicensed band communication, a PDCCH monitoring operation of the terminal may be dynamically changed according to a time period. The PDCCH monitoring operation may be dynamically changed based on the detection time point of the downlink transmission burst at the terminal. The terminal may perform a monitoring operation for the downlink initial signal in a period (hereinafter, referred to as 'first period') other than a COT started (e.g., initiated) by the base station. When the downlink initial signal includes a PDCCH (e.g., control information included in the PDCCH), the terminal may perform a PDCCH monitoring operation for receiving the PDCCH in the first period. On the other hand, when the downlink initial signal does not include a PDCCH, the terminal may not perform a PDCCH monitoring operation in the first period. For example, when the downlink initial signal includes a PDCCH DM-RS, the terminal may perform a blind detection operation for a PDCCH DM-RS in the first period.

When a downlink transmission burst is detected, the terminal may perform a PDCCH monitoring operation different from the PDCCH monitoring operation performed in the first period from a starting period of the downlink transmission burst or a COT started by the downlink transmission burst (e.g., a preconfigured time period starting in the first symbol of the COT). A second period may be the starting period of the downlink transmission burst or the COT corresponding to the downlink transmission bust. The starting period of the COT may be the first slot of the COT. The first slot of the COT may be a partial slot. The base station may inform the terminal of ending time point information of the second period through signaling. In this case, the ending time point of the second period may be expressed as a relative distance from the starting time point of the COT or the downlink transmission burst. The ending time point of the second period may be configured to the terminal in a granularity of a unit of a symbol or a slot.

The remaining period excluding the second period in the downlink transmission burst or the COT started by the downlink transmission burst may be defined as a third period. The third period may be a period from the ending time point of the second period to the ending time point of the downlink transmission burst or the COT started by the downlink transmission burst. The terminal may not know the ending time point of the downlink transmission burst or the COT. In this case, the terminal may determine the ending time point of the third period using the initial detection time point of the COT or the (first) downlink transmission burst within the COT, and the MCOT. For example, the terminal may regard a time point after the MCOT from the initial detection time point of the COT as the ending time point of the third period. The method described above may be referred to as 'Method 300'.

The PDCCH monitoring operation within the COT (e.g., the second and third periods) initiated by the base station may be different from the PDCCH monitoring operation in the first period. The terminal may monitor a PDCCH constituting the downlink initial signal in the second and third periods, and may also monitor other PDCCHs. This operation may be performed based on a CORESET and search space set configured by the base station. In addition, the PDCCH monitoring operation in the second period may be different from the PDCCH monitoring operation in the third period. For example, the interval or period of the PDCCH monitoring operation in the second period may be shorter than the interval or period of the PDCCH monitoring operation in the third period. The interval or period of the PDCCH monitoring operation in the second period may be configured in unit of a symbol, and the interval or period of the PDCCH monitoring operation in the third period may be configured in unit of a slot.

The base station may independently configure the PDCCH monitoring operation to the terminal in each of the second and third periods. Search space set configuration(s) for the second period may be different from search space set configuration(s) for the third period. In this case, the search space set configuration(s) for the second and third periods may correspond to the same CORESET. The base station may inform the terminal of information of the search space set configuration(s) for the first period through signaling. The search space set configuration(s) for the first period may be independent of the search space set configuration(s) for the second and third periods. In addition, the search space set configuration(s) for the first period and the search space set configuration(s) for the second period and/or the third period may belong to the same CORESET.

The change of the PDCCH monitoring operation between the second period and the third period may be applied in a USS set. In case of a CSS set, the terminal may perform the PDCCH monitoring operation according to the same configuration in the second and third periods. Alternatively, the change of the PDCCH monitoring operation between the second period and the third period may be applied in both a USS set and a CSS set. One or more search space sets may be configured for each of the second and third periods, and the one or more search space sets may include a USS set and/or a CSS set. Alternatively, the search space set for each of the second and third periods may include a specific type of CSS set (e.g., type 3 CSS set).

Figure 16A:
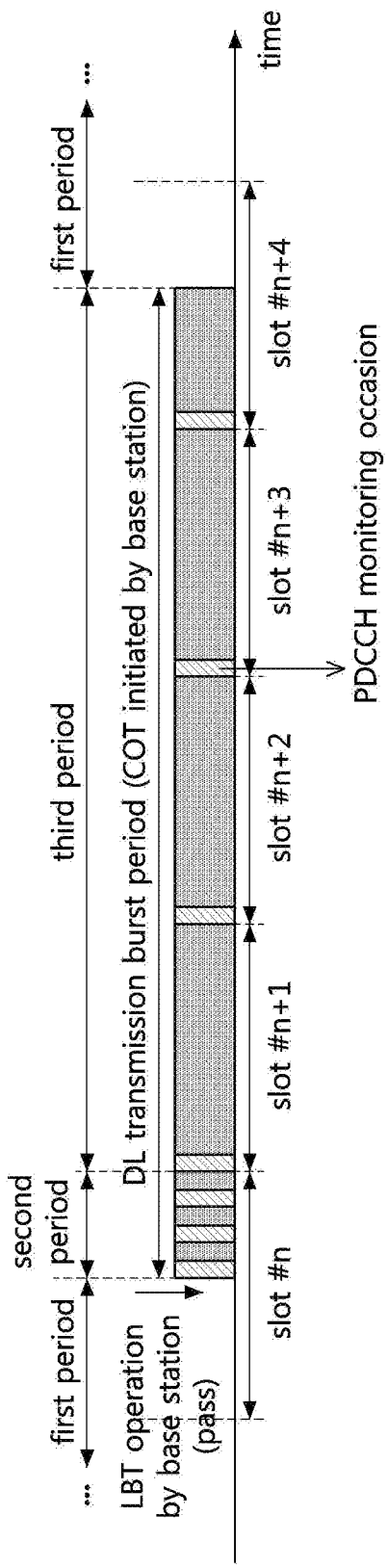
FIG. 16A is a conceptual diagram illustrating a first exemplary embodiment of a dynamic change method of a PDCCH monitoring operation.
Figure 16B:
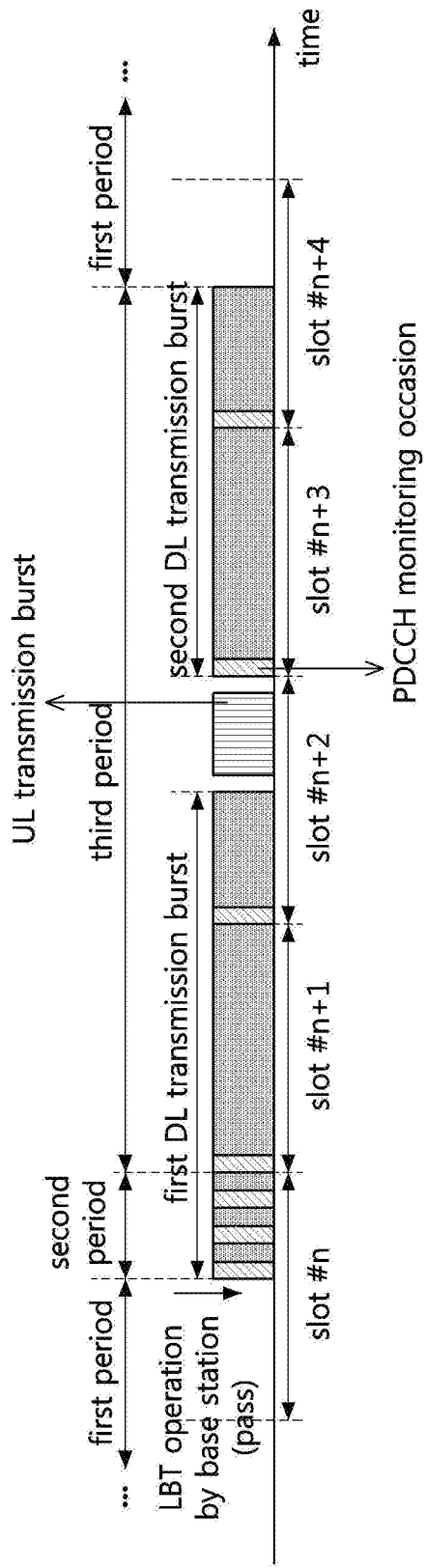
FIG. 16B is a conceptual diagram illustrating a second exemplary embodiment of a dynamic change method of a PDCCH monitoring operation.

FIG. 16A is a conceptual diagram illustrating a first exemplary embodiment of a dynamic change method of a PDCCH monitoring operation, and FIG. 16B is a conceptual diagram illustrating a second exemplary embodiment of a dynamic change method of a PDCCH monitoring operation.

Referring to FIG. 16A, PDCCH monitoring operations may be performed in three periods (e.g., first, second, and third periods). The definition of the first period, the second period, and the third period may be the same as the above definitions, and the PDCCH monitoring operations in the first period, the second period, and the third period may be the same as the above-described operations.

Referring to FIG. 16B, a plurality of downlink transmission bursts (e.g., first and second downlink transmission bursts) may be transmitted within one COT initiated by the base station. An uplink transmission burst may be transmitted between the first downlink transmission burst and the second downlink transmission burst. In this case, the PDCCH monitoring operations of the terminal may be performed in three periods (e.g., first, second, and third periods). The definition of the first period, the second period, and the third period may be the same as the above definitions, and the PDCCH monitoring operations in the first period, the second period, and the third period may be the same as the above-described operations.

For example, the terminal having knowledge of the ending time point of the COT may determine that the third period is a period from the second slot of the COT to the ending time point of the COT. The first period, the second period, and the third period according to Method 300 may be defined based on the COT instead of the downlink transmission burst. In this case, a period occupied by the downlink transmission burst may be included in the third period, and the uplink transmission burst and/or the gap period (e.g., a part of the slot #n+2) are excluded from the third period. Alternatively, the third period may include the downlink transmission burst, the uplink transmission burst, and/or the gap period.

When the above-described method is applied, the starting time point of the remaining downlink transmission burst(s) except the first downlink transmission burst within one COT may be limited. In addition, the ending time point of the uplink transmission burst(s) within the same COT may be limited. For example, the remaining downlink transmission burst(s) may begin at a slot boundary (e.g., the first symbol of the slot).

For another example, the remaining downlink transmission burst(s) may start at the first symbol of a specific PDCCH monitoring occasion within the third period. Alternatively, in order to satisfy the above-described condition, the ending time point of the uplink transmission burst(s) (or paused duration(s)) may be limited to a specific symbol (e.g., the last symbol) of the slot or a symbol before the first symbol of the specific PDCCH monitoring occasion within the third period. Alternatively, in order to acquire a time required for the LBT operation of the base station, the ending time point of the uplink transmission burst(s) (or paused duration(s)) may be limited to a preconfigured gap before the above-described time point. In the exemplary embodiment shown in FIG. 16, the second downlink transmission burst may satisfy both of the above conditions.

Meanwhile, the uplink transmission burst within the COT initiated by the base station may be allocated in an arbitrary period. In this case, the downlink transmission burst(s) after the uplink transmission burst may start at an arbitrary time point. This operation will be described in the exemplary embodiment below.

FIG. 17A is a conceptual diagram illustrating a third exemplary embodiment of a dynamic change method of a PDCCH monitoring operation, and FIG. 17B is a conceptual diagram illustrating a fourth exemplary embodiment of a dynamic change method of a PDCCH monitoring operation.

Referring to FIGS. 17A and 17B, the first and second downlink transmission bursts may be transmitted within the COT initiated by the base station, and the uplink transmission burst may be transmitted between the first downlink transmission burst and the second downlink transmission burst. In this case, the second downlink transmission burst may start from the middle of the slot #n+2. Based on the above-described method, when the period in which the second downlink transmission burst is transmitted in the slot #n+2 is regarded as the third period, the terminal may not perform the PDCCH monitoring operation in the starting period of the second downlink transmission burst. Accordingly, the terminal may not receive a PDCCH and/or a PDSCH according to a PDCCH in the starting period of the second downlink transmission burst.

In order to solve the above-described problem, the terminal may perform a PDCCH monitoring operation different from the PDCCH monitoring operation of the third period in a starting period of the remaining downlink transmission burst(s). The starting period of the downlink transmission burst may be the first slot of the downlink transmission burst. The first slot may be a partial slot. For example, in the exemplary embodiment shown in FIG. 17A, the starting period of the second downlink transmission burst may be regarded as the second period, and the terminal may perform a PDCCH monitoring operation defined for the second period in the starting period of the second downlink transmission burst. Method 300 may be applied to each downlink transmission burst, and the second period and the third period may be defined for each downlink transmission burst. In this case, one of the second period and the third period may exist according to the starting time point and the length of the downlink transmission burst. The starting period of the downlink transmission burst may be a part of the slot #n+2. For example, the starting time period of the downlink transmission burst may be a period from an ending time point of the uplink transmission burst or a gap period after the uplink transmission burst to the last symbol of the slot #n+2.

For another example, in the exemplary embodiment shown in FIG. 17B, the PDCCH monitoring operation in the starting period of the second downlink transmission burst may be separately defined. The starting period of the second downlink transmission burst may be defined as a fourth period. The base station may configure search space set(s) for the PDCCH monitoring operation of the fourth period to the terminal. Alternatively, one or more PDCCH monitoring occasions in the fourth period may be determined by an implicit method. For example, the terminal may perform the PDCCH monitoring operation on symbols (e.g., X symbol (s)) from the first symbol to the X-th symbol of the fourth period. The terminal may assume that the PDCCH monitoring occasion is configured in the X symbol(s) within the fourth period. X may mean the number of symbols of a CORESET corresponding to the PDCCH monitoring occasion or the search space set. X may be a natural number. For example, X may be 1. PDCCH configuration for the PDCCH monitoring operation of the fourth period may share CORESET configuration associated with PDCCH configuration of the above-described other period. In addition, the PDCCH configuration (e.g., part of the search space set configuration (e.g., CCE aggregation level, number of PDCCH candidates, etc.) of the fourth period may be the same as the PDCCH configuration (e.g., search space set configuration) of other period(s).

The terminal may determine the starting time point of the remaining downlink transmission burst(s) based on the ending time point of the uplink transmission burst(s) transmitted by the terminal. A specific terminal may not receive from the base station information instructing to transmit the uplink transmission burst within the COT. In this case, the terminal may not know the presence or starting time point of the downlink transmission burst(s) after the uplink transmission burst. Accordingly, the terminal may assume one second period within the COT as in the exemplary embodiment shown in FIG. 16A, and may perform a PDCCH monitoring operation in the second period. Alternatively, the terminal may assume one fourth period within the COT as in the exemplary embodiment shown in FIG. 16B, and may perform a PDCCH monitoring operation in the fourth period. The above-described method may be applied differently for each terminal in one serving cell or base station.

In the above-described exemplary embodiments, a period between the first downlink transmission burst and the second downlink transmission burst may be used as a paused duration instead of an uplink duration. In general, a period between adjacent downlink transmission bursts within one COT may be used as an uplink duration and/or a paused duration. In addition, the period between the downlink transmission bursts may further include a gap for the LBT operation. The methods described above may be applied in any case.

The terminal operating in an RRC connected state may perform the above-described method. In addition, the terminal performing unicast transmission based on a physical layer ID (e.g., C-RNTI, MCS-C-RNTI, CS-RNTI) assigned by the base station may perform the above-described method. The terminal operating in an RRC idle state may perform a PDCCH monitoring operation in the CSS set(s) and may not perform a PDCCH monitoring operation in the USS set. The CSS set(s) may include type 0, 0A, 1, and 2 CSS sets, and the like. The CSS set(s) may be configured to the terminal through PBCH, MIB, SIB1, or the like. A PDCCH monitoring cycle in the CSS set may be longer than a PDCCH monitoring cycle in the USS set. Accordingly, the terminal operating in an RRC idle state or an RRC inactive state may not perform a detection operation of a COT or a downlink transmission burst, and receive a PDCCH or a PDSCH by performing a PDCCH monitoring operation in a time period in which a CSS set(s) are configured.

Meanwhile, due to uncertainty of the LBT operation, a time required for a random access procedure in an unlicensed band may be longer than a time required for a random access in a licensed band. Therefore, in an unlicensed band, a long time delay may occur for transition from the RRC idle state to the RRC connected state. In addition, the terminal without transmission traffic may camp on a serving cell as in the RRC idle state. Accordingly, the terminal operating in the RRC idle state may perform a detection operation of a downlink transmission burst in order to reduce power consumption.

The terminal operating in the RRC idle state may perform a monitoring operation on a downlink initial signal in the first period. To this end, the base station may transmit information related to transmission or monitoring of a downlink initial signal to the terminal in a broadcast manner. The information related to transmission or monitoring of a downlink initial signal may be transmitted to the terminal by cell-specific signaling. For example, the configuration information of the CORESET and/or search space set included in SIB1 or cell-specific RRC parameter(s) may be used as the downlink initial signal. The base station may signal the SIB1 or cell-specific RRC parameter(s) to the terminal. The configuration information of the CORESET and/or search space set may be included in the RRC parameters 'PDCCH-ConfigSIB1' and/or 'PDCCH-ConfigCommon'. For example, the DCI format 2_0 or a PDCCH DM-RS for demodulation of the DCI format 2_0 may be used as the downlink initial signal. In this case, the configuration information of the CORESET and/or search space set may include configuration information of an additional CORESET for a type 3 PDCCH CSS set and a type 3 PDCCH CSS set. The type 3 PDCCH CSS set configuration for the terminal operating in the RRC idle state may be limited to be mutually associated with CORESET #0.

After detecting a downlink transmission burst, the terminal operating in the RRC idle state may perform a PDCCH monitoring operation in the CSS set(s) within the corresponding COT according to configuration of the base station without discrimination between the second period and the third period. The terminal may switch from a current time point to the first period after the MCOT from the acquisition time point of the COT, and perform the PDCCH monitoring operation in the first period. Alternatively, the terminal may perform a PDCCH monitoring operation according to configuration of the base station within the MCOT, and may switch from the current period to the first period after the PDCCH monitoring operation is completed. The terminal may switch in advance from the current period to the first period before the MCOT from the acquisition time point of the COT.

In the above-described exemplary embodiments, the first period may not be distinguished from the second period. The terminal may perform the same PDCCH monitoring operation in the first period and the second period. The base station may signal configuration information of a common CORESET and/or search space set to the terminal for the PDCCH monitoring operation of the first period and the second period. In this case, the 'first period' described in the above exemplary embodiments may be interpreted as 'second period'. The terminal may perform the PDCCH monitoring operation in the second period and the third period without the first period. In addition, the second period and the third period may not belong to the COT or transmission burst. The second period and the third period may include a period other than the COT or transmission burst.

The base station may configure one or more search space sets to the terminal for each of the second period and the third period. The search space set for the second period may be referred to as 'second PDCCH group', and the search space set for the third period may be referred to as a 'third PDCCH group'. The terminal may perform a PDCCH monitoring operation on the second PDCCH group in the second period and may perform a PDCCH monitoring operation on the third PDCCH group in the third period. In addition, the terminal may perform a PDCCH monitoring operation on a search space set not belonging to the second PDCCH group in the second period, and perform a PDCCH monitoring operation on a search space set not belonging to the third PDCCH group in the third period.

Switching of the PDCCH monitoring operation between the second PDCCH group and the third PDCCH group may be indicated by an implicit method. For example, the terminal that successfully receives DCI (or PDCCH) may perform a PDCCH monitoring operation on the third PDCCH group from the next slot of the slot in which the corresponding DCI is received. Alternatively, the terminal that successfully receives DCI (or PDCCH) may perform a PDCCH monitoring operation on the third PDCCH group from the first slot (e.g., a full slot rather than a partial slot) appearing after L symbol(s) from the symbol in which the corresponding DCI is received (e.g., the last symbol or the first symbol in which the DCI is received). L may be a natural number. L may be predefined between the base station and the terminal. Alternatively, the base station may inform L to the terminal.

The DCI (or PDCCH) may be all DCIs (or PDCCHs) that the terminal expects to receive. Alternatively, the DCI may mean group common DCI (e.g., DCI format 2_0), scheduling DCI (e.g., downlink scheduling DCI, scheduling uplink DCI), or the like. The downlink scheduling DCI may be DCI including scheduling information of a PDSCH. In the NR communication system, the downlink scheduling DCI may include DCI formats 1_0, 1_1, 1_2, and the like. The uplink scheduling DCI may be DCI including scheduling information of a PUSCH. In the NR communication system, the uplink scheduling DCI may include DCI formats 0_0, 0_1, 0_2, and the like. At the same time or separately, the DCI indicating switching to the third PDCCH group may be DCI received through the second PDCCH group (or PDCCH candidate(s) excluding the third PDCCH group). In addition, the DCI indicating switching to the second PDCCH group may be DCI received through the third PDCCH group (or PDCCH candidate(s) excluding the second PDCCH group). The method described above may be referred to as 'Method 310'.

Alternatively, the switching procedure of the PDCCH monitoring operation between the second PDCCH group and the third PDCCH group may be performed according to explicit signaling from the base station. For example, the base station may transmit a group common PDCCH (e.g., DCI format 2_0) including information indicating switching of the PDCCH monitoring operation to the terminal. The terminal may receive the information indicating switching of the PDCCH monitoring operation from the base station. A search space set or PDCCH candidate(s) for monitoring of the group common PDCCH (e.g., DCI format 2_0, or DCI format 2_0 including the information indicating switching of the PDCCH monitoring operation) may be configured in any symbol(s) in the slot. Alternatively, the search space set or PDCCH candidate(s) for monitoring of the group common PDCCH (e.g., DCI format 2_0, or DCI format 2_0 including the information indicating switching of the PDCCH monitoring operation) may be configured in symbol(s) excluding the last S symbol(s) among symbols constituting the slot. For example, S may be L. Alternatively, S may be M1 or M2. M1 and M2 will be described later.

A specific field of the group common PDCCH (e.g., DCI format 2_0) may include the information indicating switching of the PDCCH monitoring operation. For example, when the specific field of the group common PDCCH (e.g., DCI format 2_0) is set to '1', the terminal may perform the PDCCH monitoring operation on the third PDCCH group from the first slot (e.g., a full slot rather than a partial slot) appearing after M1 symbol(s) from the symbol in which the group common PDCCH is received (e.g., the last symbol or the first symbol in which the group common PDCCH is received) or the next slot of the slot in which the group common PDCCH is received. When the specific field of the group common PDCCH is set to '0', the terminal may perform the PDCCH monitoring operation on the second PDCCH group from the first slot (e.g., a full slot rather than a partial slot) appearing after M2 symbol(s) from the symbol in which the group common PDCCH is received (e.g., the last symbol or the first symbol in which the group common PDCCH is received) or the next slot of the slot in which the group common PDCCH is received. M1 and M2 may be natural numbers. In some exemplary embodiments, M2 and M1 may have the same value. M1 and/or M2 may be predefined between the base station and the terminal. Alternatively, the base station may inform the terminal of M1 and/or M2. In some exemplary embodiments, M1 and/or M2 may have the same value as L. The method described above may be referred to as 'Method 311'.

According to the above-described method, the PDCCH group may be switched based on a slot boundary. According to Method 311, when a plurality of DCIs are received, the terminal may obtain a plurality of switching indication information for a specific switching time point (e.g., a specific slot boundary). For example, when M1=4 or M2=4, the switching indication information received in symbols excluding the last 4 symbols in the slot #n and/or the last 4 symbols in the slot #n−1 may be applied to slot(s) from the slot #n+1. The terminal may receive a plurality of DCIs in the above-described symbols, and may obtain a plurality of switching indication information for the slot #n+1 and slot(s) after the slot #n+1. In this case, the terminal may expect that the plurality of switching indication information for the specific switching time point are all the same. For example, the plurality of switching indication information may correspond to the specific field (e.g., the specific field of the group common PDCCH) set to '1'. Alternatively, the plurality of switching indication information may correspond to the specific field (e.g., the specific field of the group common PDCCH) set to '0'.

Alternatively, the plurality of switching indication information corresponding to the specific switching time point may be configured independently of each other. For example, the plurality of switching indication information corresponding to the specific switching time point may be the same. Alternatively, the plurality of switching indication information corresponding to the specific switching time point may be different from each other. In this case, the terminal may determine a corresponding switching time point and a PDCCH monitoring operation after the corresponding switching time point according to specific switching indication information among the plurality of switching indication information. For example, the terminal may determine whether to switch the PDCCH monitoring operation according to switching indication information included in the last received DCI. Alternatively, when a priority is defined for a CORESET, search space set, RNTI, DCI format, etc. through which DCI is transmitted, the terminal may determine whether to switch the PDCCH monitoring operation according to switching indication information included in DCI having a high priority.

For example, when switching indication information obtained through a group common PDCCH (e.g., DCI format 2_0) is different from switching indication information obtained through scheduling DCI (e.g., downlink scheduling DCI), the terminal may perform a PDCCH monitoring operation according to one switching indication information included in DCI having a high priority among the switching indication information of the two DCIs. For example, the terminal may consider that the priority of the scheduling DCI is higher than that of the group common PDCCH. For another example, the terminal may consider that a priority of DCI having a CRC scrambled by a first RNTI (e.g., RNTI for URLLC transmission) is higher than a priority of DCI having a CRC scrambled by a second RNTI (e.g., RNTI for eMBB transmission), and may preferentially apply switching indication information included in the DCI having the CRC scrambled by the first RNTI.

The base station may transmit information indicating whether to apply Method 310 and/or Method 311 to the terminal. For example, the information indicating whether to apply Method 310 and/or Method 311 may be transmitted through RRC signaling. Method 310 and Method 311 may be configured to be applied simultaneously. In this case, the terminal may receive a plurality of switching indication information indicating a specific switching point. One or more among the plurality of switching indication information may be information obtained by Method 310, and the remaining switching indication information may be information obtained by Method 311. When the switching indication information obtained by Method 310 is different from the switching indication information obtained by Method 311, the terminal may determine whether to switch the PDCCH monitoring operation based on one of the plurality of switching indication information. A priority of explicitly-indicated switching indication information may be regarded as higher than a priority of implicitly-indicated switching indication information. In this case, the terminal may preferentially apply the switching indication information obtained by Method 311.

Until the information instructing to switch the PDCCH monitoring operation is received again from the base station or until the switching of the PDCCH monitoring operation is performed again under the specific condition, the terminal may continuously perform the PDCCH monitoring operation determined through the above-described method (e.g., PDCCH monitoring operation in the second or third period). The PDCCH monitoring operation may be performed in consecutive slots. For example, the terminal may perform the switching operation from the third PDCCH group to the second PDCCH group based on the ending time point of the COT (e.g., the first slot boundary appearing after the ending time point of the COT, or the first slot boundary appearing after L (or, M1 or M2) symbols from the last symbol of the COT). The ending time point of the COT may be dynamically indicated from the base station to the terminal. The ending time point of the COT may be indicated through a DCI format 2_0.

Alternatively, the ending time point of the COT may be determined as a time point after the MCOT from the time point when the terminal acquires the COT. For another example, the terminal may perform the switching operation from the third PDCCH group to the second PDCCH group based on a time point at which a timer expires (e.g., a boundary between a slot in which the timer expires and the next slot of the slot, a boundary between a slot to which a symbol in which the timer expires belongs and the next slot of the slot, or the first slot boundary appearing after L (or M1 or M2) symbols from a slot in which the timer expires). The timer may indicate a preconfigured time (e.g., M slots, N symbols). M and N may be natural numbers. The terminal may obtain information on the timer (e.g., initial timer value) from the base station through a signaling procedure (e.g., DCI signaling or RRC signaling). Alternatively, the timer (e.g., initial timer value) may be predefined, and may be shared between the base station and the terminal.

When it is instructed to switch the PDCCH monitoring operation, the terminal may start the timer. For example, the terminal may set the timer to the predefined value or the preconfigured value in a slot in which the information instructing to switch the PDCCH monitoring operation is received, and may operate the timer in unit of a slot. Here, the predefined value or the preconfigured value may be M slots. At the ending time point of each slot, a value of the timer may decrease by one. When the value of the timer becomes 0, the timer may expire. In addition, when the information instructing to switch the PDCCH monitoring operation is received during the operation of the timer, the terminal may restart the timer.

When Method 311 is used, the terminal may start or restart the timer when receiving a group common PDCCH (e.g., DCI format 2_0) including the information instructing to switch the PDCCH monitoring operation. In this case, the expiration time point of the timer may be appropriately controlled by the base station, and the same timer operation may be applied to a plurality of terminals. On the other hand, when Method 310 is used, the terminal may start or restart the timer when DCI (or PDCCH) is successfully received. The DCI (or PDCCH) may be an arbitrary DCI (or PDCCH) that the terminal expects to receive. In this case, the timer may be restarted whenever the terminal receives a PDCCH. Therefore, the expiration time point of the timer may be difficult to predict. In addition, the operation period of the timer may be different in each terminal.

As a method for solving the above problem, the timer may not be restarted for a certain period of time (hereinafter, referred to as 'timer restart prohibition period') after being started or restarted once. Even when the information instructing to switch the PDCCH monitoring operation is received within the timer restart prohibition period, the terminal may not restart the timer. That is, the terminal may maintain the operation of the timer within the timer restart prohibition period. The timer restart prohibition period may be configured in unit of slot(s) (e.g., Mp slots) or in unit of symbol(s) (e.g., Np symbols). Mp may not be greater than M, and Np may not be greater than N. The base station may transmit information on the timer restart prohibition period to the terminal through a signaling procedure (e.g., DCI signaling or RRC signaling), and the terminal may receive the information on the timer restart prohibition period from the base station.

In a PDCCH monitoring period (e.g., the second or third period) of the terminal, a specific slot may include an uplink period and/or a flexible period. In the PDCCH monitoring period, the PDCCH monitoring operation may be performed identically in the downlink period included in the specific slot. In the specific slot, the terminal may skip a blind decoding operation for a PDCCH monitoring occasion belonging to the uplink period and/or the flexible period (e.g., flexible symbol(s) indicated by SFI), and may perform a blinding decoding operation for a PDCCH monitoring occasion belonging to a downlink period and/or the flexible period (e.g., flexible symbol(s) configured semi-statically).

The switching operation of the PDCCH monitoring may be performed within a COT or a transmission burst. Alternatively, the switching operation of PDCCH monitoring may be performed in a period other than a COT or a transmission burst. Meanwhile, in the above-described exemplary embodiments, a plurality of downlink transmission bursts may be transmitted within one COT (e.g., COT initiated by the base station). An uplink transmission burst may be transmitted between the plurality of downlink transmission bursts. Alternatively, a paused duration may be inserted between the plurality of downlink transmission bursts. Without loss of generality, two downlink transmission bursts (e.g., first and second downlink transmission bursts) transmitted within one COT may be considered. The first downlink transmission burst may be assumed to be transmitted before the second downlink transmission burst.

In this case, a starting part of the second downlink transmission burst may belong to a specific PDCCH monitoring period. For example, in the exemplary embodiment shown in FIG. 16B, the first slot of the second downlink transmission burst may belong to the third period. For another example, in the exemplary embodiments illustrated in FIGS. 17A and 17B, the first slot of the second downlink transmission burst may belong to the second period or the fourth period. In the following exemplary embodiments, a method for determining a PDCCH monitoring operation of the starting period of the second downlink transmission burst will be described. The second downlink transmission burst may be generalized to a 'downlink transmission burst occurring after the current downlink transmission burst within the same COT'.

In a first method, the above-described method may be equally applied without considering the plurality of downlink transmission bursts. The PDCCH monitoring period or PDCCH set (e.g., PDCCH group) of the starting slot(s) of the second downlink transmission burst may be determined according to switching indication information (e.g., trigger information) of a PDCCH occurring before the second downlink transmission burst. For example, when the PDCCH switching operation is not triggered between the first downlink transmission burst and the second downlink transmission burst, the period or PDCCH set applied to the last slot of the first downlink transmission burst may be applied equally to the starting slot(s) of the second downlink transmission burst. For another example, when the PDCCH switching operation is triggered once between the first downlink transmission burst and the second downlink transmission burst (e.g., the switching operation from the third PDCCH group to the second PDCCH group is triggered by the timer), the period or PDCCH set applied to the starting slot(s) of the second downlink transmission burst may follow the triggered PDCCH switching operation.

In a second method, the PDCCH monitoring period or PDCCH set of the starting slot(s) of the second downlink transmission burst may always be the same as the PDCCH monitoring period or PDCCH set of the last slot of the first downlink transmission burst. The above-described timer may be paused in a period between the first downlink transmission burst and the second downlink transmission burst (or a period other than the downlink transmission burst), and the paused timer may be resumed in the second downlink transmission burst period (or, a downlink transmission burst period).

In a third method, information on the PDCCH monitoring period or PDCCH set of the starting slot(s) of the second downlink transmission burst may be explicitly signaled from the base station to the terminal. For example, the switching indication information may be included in uplink scheduling DCI. When the uplink scheduling DCI including the switching indication information is received, the terminal may determine the switching time point of the PDCCH monitoring operation based on a reception time point of the uplink scheduling DCI (e.g., a specific symbol of PDCCH duration) or a transmission time point of a PUSCH corresponding to the reception time point of the uplink scheduling DCI (e.g., a specific symbol of PUSCH duration). Meanwhile, the above-described methods may be applied equally or similarly when a cross-carrier scheduling scheme is used in a plurality of carriers configured or activated in the terminal.

The above-described switching operation of the PDCCH monitoring may be applied commonly to all LBT subband(s) within one carrier or one bandwidth part. That is, in all the LBT subband(s) constituting one carrier or one bandwidth part, the terminal may commonly perform one of the monitoring operation for the second PDCCH group and the monitoring operation for the third PDCCH group at a certain time point (e.g., a certain slot). For example, in all the LBT subband(s) constituting one carrier or one bandwidth part, the terminal may be assumed to commonly perform one of the monitoring operation for the second PDCCH group and the monitoring operation for the third PDCCH group at a certain time point (e.g., a certain slot). The indication of the monitoring operation may be performed by the above-described method. The terminal may skip the PDCCH monitoring operation in LBT subband(s) assumed as not occupied by the terminal or LBT subband(s) assumed as not occupied by the base station, among the above-described LBT subband(s).

In addition, the above-described switching operation of the PDCCH monitoring may be commonly applied to a plurality of carriers (or a plurality of bandwidth parts). That is, in one or more LBT subbands constituting the plurality of carriers, the terminal may commonly perform one of the monitoring operation for the second PDCCH group and the monitoring operation for the third PDCCH group at a certain time point (e.g., a certain slot). For example, in the one or more LBT subbands constituting the plurality of carriers, the terminal may be assumed to commonly perform one of the monitoring operation for the second PDCCH group and the monitoring operation for the third PDCCH group at a certain time point (e.g., a certain slot).

The indication of the monitoring operation may be performed by the above-described method. The base station may configure a set of carrier(s) (or bandwidth part(s)) and/or LBT subband(s) to which the indication of the monitoring operation is applied, and may transmit configuration information of the set of carrier(s) (or bandwidth part(s)) and/or LBT subband(s) to the terminal. The terminal may identify the set of carrier(s) (or bandwidth part (s)) and/or LBT subband(s) to which the indication of the monitoring operation is applied based on the configuration information received from the base station. For example, the above-described configuration information may be transmitted to the terminal together with the configuration information of the CORESET and/or search space set for the second PDCCH group and the configuration information of the CORESET and/or search space set for the third PDCCH group. For example, the above-described configuration information may include a set of unique index(es) (e.g., carrier indicator field (CIF), physical layer cell ID, etc.) that can distinguish the plurality of carriers.

[PDCCH Transmission Method in the Frequency Domain]

For transmission of downlink control information (e.g., DCI), PDCCH candidate(s) may be mapped to consistent time and frequency resource regions (repeated periodically), and a PDCCH may be transmitted through at least one PDCCH candidate(s) among the mapped PDCCH candidate(s). The time and frequency resource regions to which the PDCCH candidate(s) are mapped may be referred to as a CORESET, a search space set, a PDCCH monitoring occasion, or the like (hereinafter, referred to mainly as 'CORESET'). Further, a set of the PDCCH candidate(s) mapped to the time and frequency resource regions may also be referred to as a CORESET, a search space set, and a PDCCH monitoring occasion, or the like (hereinafter, referred to mainly as 'CORESET').

The CORESET may include one or more PRBs constituting a downlink bandwidth part. For example, the minimum allocation unit (e.g., basic allocation unit) of frequency resources in the CORESET may be 6 consecutive PRBs. In unlicensed band communication, when one downlink bandwidth part includes a plurality of LBT subbands (e.g., a plurality of RB sets), an LBT operation may succeed in some LBT subband(s). When a part of a PDCCH candidate or an entire PDCCH candidate belongs to an LBT subband in which the LBT operation fails, the corresponding PDCCH candidate cannot be used for PDCCH transmission. Therefore, it may be advantageous for each PDCCH candidate to be mapped within one LBT subband.

In order to ensure the above-described operation, a frequency region of each CORESET may be confined within one LBT subband. The CORESET may include one or more PRBs constituting one LBT subband. For example, one downlink bandwidth part may include two LBT subbands (e.g., LBT subbands #1 and #2), and the base station may configure a CORESET #1 (e.g., search space set #1, PDCCH candidate #1, PDCCH monitoring occasion #1) with the LBT subband #1, and may configure a CORESET #2 (e.g., search space set #2, PDCCH candidate #2, PDCCH monitoring occasion #2). Here, the LBT subband may mean an RB set. The base station may inform the terminal of configuration information of the CORESET (e.g., search space set, PDCCH candidate, and PDCCH monitoring occasion) configured in each of the LBT subbands. The terminal may receive the configuration information of the CORESET (e.g., search space set, PDCCH candidate, and PDCCH monitoring occasion) from the base station, and may identify the CORESET (e.g., search space set, PDCCH candidate, and PDCCH monitoring occasion) configured in each of the LBT subbands.

When a guard band exists between the LBT subbands or when the LBT subband includes a guard band, the CORESET may be allocated to a frequency region excluding the guard band. When an LBT operation is successful in the LBT subband #1, the terminal may monitor PDCCH candidates (e.g., PDCCH monitoring occasions) of the CORESET #1 or the search space set(s) corresponding to the CORESET #1. When an LBT operation is successful in the LBT subband #2, the terminal may monitor PDCCH candidates (e.g., PDCCH monitoring occasions) of the CORESET #2 or the search space set(s) corresponding to the CORESET #2. Alternatively, regardless of the LBT operation, the terminal may monitor PDCCH candidates (e.g., PDCCH monitoring occasions) of the CORESET within the LBT subband (e.g., RB set) or the search space set(s) corresponding to the CORESET.

The configuration information (e.g., information of qjPRB(s) constituting the CORESET) of frequency resources of the CORESET (or, search space set, PDCCH monitoring occasion) may be represented by a bitmap, and the base station may signal the bitmap indicating the frequency resources of the CORESET to the terminal. The bitmap may correspond to one or more PRBs constituting the bandwidth part. For example, each bit of the bitmap may sequentially correspond to six consecutive PRBs. When the maximum number of PRBs included in one carrier is 275, the bitmap may include 46 bits. The number of bits constituting the bitmap may be determined according to 'ceil(275/6)'. Here, 'ceil' may be a ceiling function. For example, when the bandwidth part is composed of 5 LBT subbands (e.g., 5 RB sets), in order to configure one CORESET (e.g., frequency resources of CORESET, search space set, or PDCCH monitoring occasion) in each LBT subband, 230 bits (e.g., 5×46=230 bits) may be required.

When the above-described method is used, the bitmap may correspond to one or more PRBs constituting each LBT subband. The frequency resources of the CORESET (or, search space set, PDCCH monitoring occasion) may be allocated based on local PRB indexes within the LBT subband. For example, the first bit of the bitmap may correspond to the first to sixth PRBs in the LBT subband, and the second bit of the bitmap may correspond to the seventh to twelfth PRBs in the LBT subband. The remaining bits of the bitmap may correspond to the PRB(s) in the LBT subband according to the method described above.

When a guard band exists between the LBT subbands or when a guard band exists within the LBT subband, the PRB(s) constituting the guard band may not be configured as the frequency resources of the CORESET (or, search space set, PDCCH monitoring occasion). For example, when the first to second PRBs of the LBT subband are configured as the guard band, the first bit of the bitmap may correspond to the third to eighth PRBs of the LBT subband, and the second bit of the bitmap may correspond to the ninth to fourteenth PRBs of the LBT subband. The remaining bits of the bitmap may correspond to the PRB(s) in the LBT subband according to the method described above.

The CORESET (or search space set, PDCCH monitoring occasion) of terminals within one serving cell may be arranged in unit of six consecutive RBs, so that they can be aligned in the frequency domain. For example, the LBT subband #i of the bandwidth part may consist subband(i) of $N_{RB}^{subband(i)}$ consecutive PRBs in the frequency domain, and the first PRB of the LBT subband #i (e.g., the PRB having the lowest index) may correspond to a common RB index (e.g., $N_{subband(i)}^{start}$). Here, i=1, 2, ..., $N_{subband}$, and $N_{subband}$ may denote the number of LBT subbands constituting the carrier or bandwidth part.

In this case, among the six consecutive PRBs corresponding to the first bit of the bitmap, the first PRB may correspond to a common RB index '6×ceil($N_{subband(i)}^{start}$/6)'. The PRBs (e.g., the PRBs indicated by the bitmap) may include the PRB(s) constituting the guard band. When the LBT subband includes the guard band (e.g., the PRB(s) constituting the guard band), the first of the PRB (e.g., the PRB having the lowest index) excluding the guard PRB(s) among the PRB(s) constituting the LBT subband may correspond to the above-described common index $N_{subband(i)}^{start}$. The guard PRB(s) may mean the PRB(s) constituting the guard band.

When the above method is used, in order to indicate the LBT subband to which the CORESET (or, search space set, PDCCH monitoring occasion) belongs, the base station may signal the index (or number) of the LBT subband to the terminal. The index (or number) of the LBT subband may be included in configuration information (e.g., frequency domain resource allocation information) of the CORESET. The size of the LBT subband (e.g., the number of PRBs constituting the LBT subband) may be different for each LBT subband. On the other hand, the length of the bitmap for configuring the frequency domain resources of the CORESET (or, search space set, PDCCH monitoring occasion) may be fixed. In this case, the length of the bitmap may be defined based on the maximum size of the LBT subband (e.g., the maximum number of PRBs included in the LBT subband). In the frequency domain, a configuration unit of the CORESET (or, search space set, PDCCH monitoring occasion) may be X consecutive RBs. X may be an integer equal to or greater than 1.

According to the above-described signaling method using a bitmap for each LBT subband, signaling overhead can be reduced. For example, when the bandwidth part is composed of 5 LBT subbands, and each LBT subband is composed of 55 PRBs, the length of the bitmap for allocating one CORESET may be 10 bits (e.g., ceil (55/6)=10). Therefore, 50 bits (e.g., 5×5=50) may be required to configure one CORESET per LBT subband. In this case, the signaling overhead may be reduced by 4 times or more compared to the signaling method using a bitmap for each bandwidth part.

In the above-described method, configuration parameters required for operations in the CORESET (or, search space set, PDCCH monitoring occasion) may be independently configure for each CORESET (or, search space set, PDCCH monitoring occasion). In this case, the terminal may need to have a high level of reception capability to monitor a large number of CORESETs. However, considering the implementation complexity and cost of a modem of the terminal, it may be preferable to design such that there is no great burden on the PDCCH reception capability of the terminal.

In order to achieve the above-described object, a plurality of CORESETs (or, search space sets, PDCCH monitoring occasions) may share the same configuration parameter(s). For example, a specific configuration parameter may be configured as the same value (e.g., numerical value or non-numerical value) or the same level for the plurality of CORESETs (or, search space sets, PDCCH monitoring occasions). The plurality of CORESETs may be CORESETs configured in one downlink bandwidth part. The plurality of CORESETs may be CORESETs belonging to different LBT subbands.

For example, configuration parameter(s) for the CORESET #1 (e.g., search space set #1, PDCCH candidate #1, PDCCH monitoring occasion #1) may be configured identically to configuration parameter(s) for the CORESET #2 (e.g., search space set #2, PDCCH candidate #2, PDCCH monitoring occasion #2). The base station may transmit the configuration parameter(s) for the CORESET #1 and/or the CORESET #2 to the terminal. The configuration parameter(s) may include at least one of the duration of the CORESET (e.g., the number of symbols constituting the CORESET), CCE-REG mapping type, information indicating whether interleaving is applied in a CCE-REG mapping operation, the size of REG bundle, information related to an interleaving rule, a shift index, precoder granularity information, a transmission configuration information (TCI) state for a PDCCH, information indicating whether a DCI field for indicating a TCI state is present or not, and a PDCCH DM-RS scrambling ID. For example, when the same TCI state parameter is shared between the CORESET #1 and the CORESET #2, the terminal may assume that a quasi-co-location (QCL) relationship is established between a PDCCH DM-RS of the CORESET #1 and a PDCCH DM-RS of the CORESET #2. Accordingly, the terminal may perform a channel estimation operation or a reception beam configuration operation for PDCCH reception based on the QCL relationship.

In order to effectively signal the above-mentioned configuration parameter(s), a CORESET group may be defined. CORESETs sharing the same configuration parameter(s) may belong to the same CORESET group. Here, the CORESETs belonging to the same CORESET group may mean search spaces or PDCCH monitoring occasions. The base station may signal one or more among the configuration information for the CORESET operations to the terminal on a CORESET group basis. Even when a plurality of CORESETs belong to the same CORESET group, frequency resources of the plurality of CORESETs (e.g., the plurality of search spaces or the plurality of PDCCH monitoring occasions) may be independently configured. The plurality of CORESETs (e.g., the plurality of CORESETs belonging to the same CORESET group) may share the same search space set(s). The search space set (e.g., search space set ID) shared by the plurality of CORESETs may be logically associated with IDs of the plurality of CORESETs or an ID of the CORESET group to which the plurality of CORESETs belong. Accordingly, the terminal may perform a PDCCH monitoring operation for the search space set in each of the plurality of CORESETs (e.g., a plurality of subbands). That is, the terminal may monitor PDCCH candidates configured for the search space set in each CORESET (e.g., each subband).

The CORESET #2 may be referenced for configuration of the CORESET #1, and specific configuration parameter(s) of the CORESET #2 may be used equally for the configuration of the CORESET #1. In the method of referring to another CORESET (e.g., CORESET #2) for configuring a specific CORESET (e.g., CORESET #1), the referenced CORESET configuration parameter(s) may include the ID of the CORESET. For example, the referenced CORESET configuration parameter(s) may be parameter(s) excluding parameter(s) for frequency domain resource configuration. According to this scheme, a plurality of CORESETs (e.g., CORESETs #1 and #2) may be grouped, and the grouped CORESETs may share configuration parameter(s). This scheme may correspond to a signaling method for implementing the method of configuring CORESETs on a CORESET group basis. An RRC signaling procedure may be used for configuring CORESETs on a CORESET group basis.

Meanwhile, when a search space set is associated with one or more CORESETs, a PDCCH candidate and a CCE mapping rule may be defined in consideration of the association relationship between the search space set and the CORESET(s).

Considering the PDCCH reception complexity of the terminal, the number of PDCCH candidates that the terminal monitors in one slot within one serving cell may be limited. When the subcarrier spacing is $\mu$ in the NR communication system, the maximum number of PDCCH candidates monitored in each serving cell and/or each slot may be defined as $M^{max,slot,\mu}$. In this case, $M^{max,slot,\mu}$ may be defined as shown in Table 2 below.

TABLE 2

| $\mu$ | $M^{max, slot, \mu}$ | $C^{max, slot, \mu}$ |
|---|---|---|
| 0 | 44 | 56 |
| 1 | 36 | 56 |
| 2 | 22 | 48 |
| 3 | 20 | 32 |

$\mu$ may be an integer. When $\mu$ is 0, the subcarrier spacing may be 15 kHz. When $\mu$ is 1, the subcarrier spacing may be 30 kHz. When $\mu$ is 2, the subcarrier spacing may be 60 kHz. When $\mu$ is 3, the subcarrier spacing may be 120 kHz. For example, when the subcarrier spacing is 30 kHz, the maximum number of PDCCH candidates monitored by the terminal in one slot may be 36. In addition, the number of CCEs that the terminal receives for PDCCH monitoring in one slot within one serving cell may be limited. When the subcarrier spacing is $\mu$ in the NR communication system, the maximum number of CCEs received in each serving cell and/or each slot may be defined as $C^{max,slot,\mu}$. In this case, $C^{max,slot,\mu}$ may be defined as shown in Table 2. The number of CCEs may be the number of CCEs that are targets of the PDCCH blind decoding operation or the number of CCEs that are targets of the channel estimation operation for the PDCCH blind decoding.

In this case, overlapping PDCCH candidates may not be included in the number of PDCCH candidates according to Table 2, and overlapping CCEs may not be included in the number of CCEs according to Table 2. The PDCCH candidates #1 and #2 belonging to different search space sets may be composed of at least the same CCEs, the same scrambling operation may be applied to DCI formats transmitted through the PDCCH candidates #1 and #2, and the sizes of the payloads of the corresponding DCI formats may be the same. The terminal may perform the blind decoding operation for the PDCCH candidates #1 and #2 only once. In this case, the terminal may consider the PDCCH candidates #1 and #2 as the PDCCH candidates overlapping each other. In addition, a condition of being configured with the same QCL as well as the overlapping condition for the PDCCH candidates may be considered. The QCL may be limited to the above-described spatial QCL (e.g., QCL-TypeD), and the configuration parameter for the QCL may include other QCL parameter(s).

When CCEs #1 and #2 are configured with the same time and frequency resources (e.g., the same REGs), the terminal may perform a processing operation or a channel estimation operation of received signals for the CCEs #1 and #2 only once. In this case, the terminal may regard the CCEs #1 and #2 as CCEs overlapping each other. When the CCEs #1 and #2 are configured with the same resources, the starting symbols to which the PDCCH candidates corresponding to different CORESETs are mapped may be different. In this case, the terminal may consider that the CCE #1 does not overlap with the CCE #2. The PDCCH candidates associated with the overlapping CCEs may have the same QCL configuration, the same DMRS configuration (e.g., DMRS pattern, port number, number of ports, etc.), and the like.

The base station may configure PDCCH candidates exceeding $M^{max,slot,\mu}$ in a specific time period (e.g., one slot) of a specific serving cell, and may transmit configuration information of the PDCCH candidates to the terminal. The terminal may receive the configuration information of the PDCCH candidates from the base station. Alternatively, the base station may configure CCEs exceeding $C^{max,slot,\mu}$ in a specific time period (e.g., one slot) of a specific serving cell, and transmit configuration information of the CCEs to the terminal. The terminal may receive the configuration information of the CCEs from the base station.

Such the overbooking of the PDCCH candidates may not be allowed in a CSS set, and may be allowed in a USS set. In addition, when the carrier aggregation scheme is used, it may not be allowed to configure the PDCCH candidates in excess in a secondary cell of the terminal. In this case, the secondary cell may be limited to a secondary cell to which a self-scheduling scheme is applied. Depending on the blind decoding capability of the terminal and the number of downlink carriers configured by the base station, each of the maximum number of PDCCH candidates and the maximum number of CCEs in a specific cell (e.g., secondary cell) may be less than $M^{max,slot,\mu}$ and $C^{max,slot,\mu}$, respectively.

When the number of PDCCH candidates configured in a specific slot within a specific serving cell exceeds $M^{max,slot,\mu}$, the terminal may not perform a monitoring operation for some PDCCH candidates. That is, some PDCCH candidates may be dropped. The specific serving cell may be a primary cell. The operation of dropping the PDCCH candidate may be performed on a search space set basis. Within a range in which the number of PDCCH candidates monitored by the terminal in the slot does not exceed the maximum number (e.g., $M^{max,slot,\mu}$), each of the search space sets may be sequentially mapped.

In this case, the terminal may monitor all PDCCH candidates of the mapped search space set, and may not monitor any PDCCH candidates of the unmapped search space set. In addition, when it is allowed only in a USS set to configure the PDCCH candidates in excess, the terminal may basically monitor all PDCCH candidates of a CSS set in every slot, and may monitor some PDCCH candidate(s) having high priorities among the PDCCH candidates of the USS set. In this case, a mapping order (e.g., priority) of the USS set may be determined based on a search space set ID. For example, the terminal may map the USS sets in the ascending order of the corresponding search space IDs.

For example, a downlink bandwidth part activated in the primary cell of the terminal may include a CSS set having ID=0 (e.g., type 0 PDCCH CSS set), a USS set having ID=1, and a USS set having ID=2. Each of the search space sets may have PDCCH candidates that do not overlap each other in a specific slot. For example, the CSS set having ID=0 may have 7 PDCCH candidates, the USS set having ID=1 may have 30 PDCCH candidates, and the USS set having ID=2 may have 50 PDCCH candidates. When the subcarrier spacing in the activated downlink bandwidth part is 15 kHz, $M^{max,slot,\mu}$ may be 44 according to the above-described rule. Accordingly, the terminal may first map 7 PDCCH candidates belonging to the CSS set having ID=0 in the corresponding slot, and then map 30 PDCCH candidates belonging to the USS set having ID=1. When the USS set having ID=2 is additionally mapped, the number of mapped PDCCH candidates may exceed $M^{max,slot,\mu}$ (i.e., 44). Therefore, the terminal may not map the USS set having ID=2, and may not monitor the PDCCH candidates belonging to the USS set having ID=2.

For another example, the CSS set having ID=0 may include 7 PDCCH candidates in a specific slot, the USS set having ID=1 may have 50 PDCCH candidates, and the USS set having ID=2 may have 30 PDCCH candidates. Here, each of the search space sets may have PDCCH candidates that do not overlap with each other in a specific slot. According to the above-described rule, the terminal may first map the 7 PDCCH candidates belonging to the CSS set having ID=0 in the corresponding slot. When the USS set having ID=1 is additionally mapped, the number of mapped PDCCH candidates may exceed $M^{max,slot,\mu}$ (i.e., 44). Therefore, the terminal may not map the USS set having ID=1, and may not monitor the PDCCH candidates belonging to the USS set having ID=1. Also, the terminal may not map the USS set having ID=2, and may not monitor the PDCCH candidates belonging to the USS set having ID=2.

In the sequential mapping procedure of the search space sets and the PDCCH candidates, the number of CCEs may be limited. The terminal may sequentially map the search space sets and the PDCCH candidates for the search space sets in a specific slot so as to satisfy the following conditions.

The number of PDCCH candidates monitored by the terminal≤$M^{max,slot,\mu}$

The number of CCEs (e.g., CCEs associated with the mapped PDCCH candidates)≤$C^{max,slot,\mu}$ Meanwhile, a specific USS set may be associated with a plurality of CORESETs. A plurality of CORESETs associated with a specific USS set may be configured in different LBT subbands within the same bandwidth part. For example, a downlink bandwidth part activated in a serving cell may include four LBT subbands (e.g., LBT subbands #1 to #4), and may include a CSS set having ID=0 and a USS set having ID=1. The CSS set having ID=0 may include 7 PDCCH candidates in a specific slot, and the USS set having ID=1 may include 10 PDCCH candidates in the specific slot. The search space sets may have PDCCH candidates that do not overlap with each other.

In this case, the CSS set having ID=0 may associated with a CORESET configured in the LBT subband #1, and the USS set having ID=1 may be associated with 4 CORESETs (e.g., CORESETs #1 to #4) respectively configured in the LBT subbands #1 to #4. In this case, the USS set having ID=1 may have 10 PDCCH candidates in each CORESET (e.g., each LBT subband). Therefore, the total number of PDCCH candidates configured to the terminal in the specific slot may be 47 (e.g., 7+4×10=47). Since the 47 PDCCH candidates exceed the terminal's capability, the terminal may drop all PDCCH candidates belonging to the USS set having ID=1 in the corresponding slot, and may not monitor the PDCCH candidates belonging to the USS set having ID=1 in the bandwidth part.

Therefore, the PDCCH transmission capacity in the corresponding slot may be reduced. The base station may reduce the number of PDCCH candidates belonging to the USS set to prevent the USS set from being dropped. In this case, although transmission may be performed only in some LBT subbands of the bandwidth part according to the result of the LBT operation, the PDCCH transmission capacity per LBT subband may be unnecessarily limited.

In order to solve the above-described problem, each of the PDCCH candidates and CCEs may be mapped in a smaller unit than that of the search space set. For example, when one search space set is associated with one or more CORESETs or LBT subbands, the PDCCH candidates and CCEs may be sequentially mapped from a search space set having a low ID. In this case, when a specific search space set is associated with one or more CORESETs or LBT subbands, the mapping operation may be sequentially performed in the specific search space set on a CORESET or LBT subband basis. That is, the PDCCH candidates and CCEs may be sequentially mapped in unit of a combination of the search space set (e.g., USS set) and the CORESET (or, LBT subband) associated with the search space set.

The USS set having ID=1 may include 10 PDCCH candidates for each of 4 CORESETs in the specific slot.

When a proposed method is applied, 7 PDCCH candidates belonging to the CSS set having ID=0 and CCEs corresponding to the 7 PDCCH candidates may be first mapped in the specific slot. Then, 10 PDCCH candidates for the CORESET #1 (or LBT subband #1) belonging to the USS set having ID=1 and CCEs corresponding to the 10 PDCCH candidates may be mapped. Then, 10 PDCCH candidates for the CORESET #2 (or LBT subband #2) belonging to the USS set having ID=1 and CCEs corresponding to the 10 PDCCH candidates may be mapped. Then, 10 PDCCH candidates for the CORESET #3 (or LBT subband #3) belonging to the USS set having ID=1 and CCEs corresponding to the 10 PDCCH candidates may be mapped.

Since the total number of mapped PDCCH candidates exceeds $M^{max,slot,\mu}$ if 10 PDCCH candidates for the CORESET #4 (or LBT subband #4) belonging to the USS set having ID=1 are additionally mapped, the corresponding 10 PDCCH candidates may not be mapped. That is, the terminal may perform the monitoring operation of PDCCHs belonging to the USS set having ID=1 in the LBT subbands #1 to #3, and may not perform the monitoring operation of PDCCHs belonging to the USS set having ID=1 in the LBT subband #4.

In the above-described exemplary embodiments, it is assumed that the PDCCH candidates are sequentially mapped from the CORESET #1 to the CORESET #4 in the USS set. The mapping order of the CORESETs or LBT subbands in the search space set may be determined by other schemes. For example, the PDCCH candidates may be mapped within the search space set in the ascending order of IDs from the CORESET or LBT subband having a low ID. Alternatively, the PDCCH candidates may be mapped within the search space set in the descending order of IDs from the CORESET or LBT subband having a high ID. In the above-described exemplary embodiment, the LBT subband may be an LBT subband occupied according to the LBT operation performed by the base station, and the CORESET may be a CORESET corresponding to the LBT subband occupied by the base station.

On the other hand, for wideband operations in an unlicensed band, it may be allowed for the base station to configure PDCCH candidates and CCEs that constitute a CSS set to exceed $M^{max,slot,\mu}$ and $C^{max,slot,\mu}$. In this case, the above-described mapping method of the PDCCH candidates may be equally applied to the CSS set. In addition, the above-described mapping method of the PDCCH candidates may be applied also to a secondary cell. $M^{max,slot,\mu}$ and $C^{max,slot,\mu}$ may be configured as different values from those defined in Table 2. For example, considering wideband operations in an unlicensed band, $M^{max,slot,\mu}$ and $C^{max,slot,\mu}$ may increase. Alternatively, a reference time period to which $M^{max,slot,\mu}$ and $C^{max,slot,\mu}$ are applied may be changed. For example, the reference time period may be defined (or configured) as a period (e.g., Y symbols) shorter than one slot. Y may be a natural number equal to or less than 10.

The method described above may be applied to some CORESET(s) and/or some search space set(s). For example, the above-described method may be applied to the remaining CORESETs except the CORESET #0 (e.g., CORESET having ID=0). The above-described CORESET configuration method may be performed by an RRC signaling procedure. The RRC signaling may include both cell-specific RRC signaling (e.g., SIB1, SIB, or other system information (OSI)) and terminal-specific RRC signaling. The above-described CORESET configuration method may be applied to the CORESET (e.g., CORESET #0) configured by a PBCH and/or an MIB. For another example, the above-described method may be applied to all other search space sets (e.g., type 0, 0A, 1, and 2 PDCCH CSS sets, and USS set) except the type 3 PDCCH CSS set.

In the exemplary embodiments below, methods for ensuring that each PDCCH candidate is mapped within one LBT subband will be described.

Figure 18A:
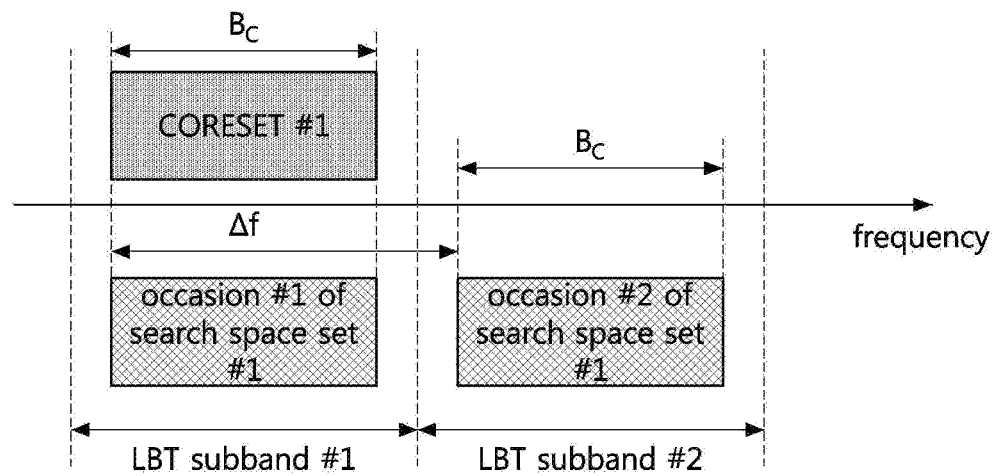
FIG. 18A is a conceptual diagram illustrating a first exemplary embodiment of a method for configuring frequency domain resources of a CORESET and a search space set.
Figure 18B:
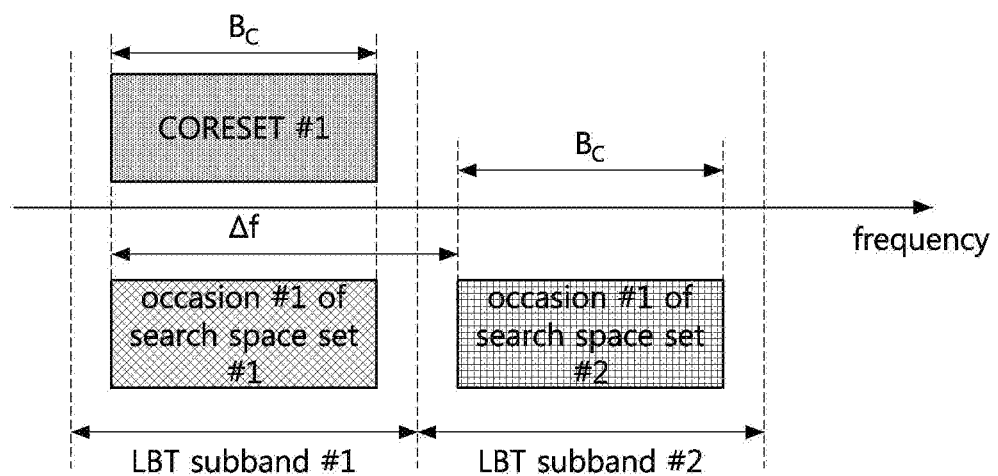
FIG. 18B is a conceptual diagram illustrating a second exemplary embodiment of a method for configuring frequency domain resources of a CORESET and a search space set.

FIG. 18A is a conceptual diagram illustrating a first exemplary embodiment of a method for configuring frequency domain resources of a CORESET and a search space set, and FIG. 18B is a conceptual diagram illustrating a second exemplary embodiment of a method for configuring frequency domain resources of a CORESET and a search space set.

Referring to FIG. 18A, a search space set #1 may be associated with a CORESET #1. Configuration information of the search space set #1 may include an ID of the CORESET #1, and a PDCCH may be transmitted in the search space set #1 according to the configuration of the CORESET #1. For example, frequency domain resources of the search space set #1 may be determined by frequency domain resources of the CORESET #1.

Referring to FIG. 18B, search space sets #1 and #2 may be associated with a CORESET #1. In this case, the search space set may include one or more frequency domain occasions. Here, the frequency domain occasion may mean a PDCCH monitoring occasion, a CORESET, a search space set, and PDCCH candidate(s), which are distinguished in the frequency domain. A frequency region of each frequency domain occasion may be the same as or different from the CORESET associated with the search space set. For example, the frequency region of each frequency domain occasion may be the same as the frequency region of the CORESET. Alternatively, the frequency region of each frequency domain occasion may be a frequency region shifted from the frequency region of the CORESET by a preconfigured frequency offset.

In the exemplary embodiment shown in FIG. 18A, the CORESET #1 may be arranged within the LBT subband #1. In addition, the search space set #1 may include two frequency domain occasions (e.g., frequency domain occasions #1 and #2). In this case, the frequency region of the frequency domain occasion #1 may be the same as the frequency region of the CORESET #1. On the other hand, the frequency region of the frequency domain occasion #2 may be different from that of the CORESET #1. For example, the frequency domain occasion #2 may be arranged in a frequency region shifted from the frequency region of the CORESET #1 by a preconfigured value Δf. Through the shift of the frequency region, the frequency domain occasion #2 may be arranged in an LBT subband (e.g., LBT subband #2) different from that of the CORESET #1. The terminal may apply the CORESET and search space set configuration identically in each frequency domain occasion, and may perform a PDCCH monitoring operation in each frequency domain occasion. One CORESET and one search space set may be arranged in a plurality of LBT subbands, and PDCCH candidates constituting the search space set may be arranged within one LBT subband.

In the exemplary embodiment shown in FIG. 18B, the CORESET #1 may be arranged within the LBT subband #1. In addition, the search space sets #1 and #2 may include one frequency domain occasion (e.g., frequency domain occasion #1). A frequency region of the search space set #1 or the frequency domain occasion #1 of the search space set #1 may be the same as the frequency region of the CORESET #1. The search space set #2 or the frequency domain occasion #1 of the search space set #2 may be arranged in a frequency region shifted from the frequency region of the CORESET #1 by a preconfigured value Δf.

According to this operation, each of the search space sets #1 and #2 may be arranged in a different LBT subband. This operation may be implemented through one CORESET. For example, one CORESET may be associated with the search space sets (e.g., PDCCH monitoring occasions) located in different LBT subbands (e.g., RB sets). In the above-described exemplary embodiments, the CORESET and the PDCCH monitoring occasion may be allocated on an LBT subband basis for wideband communication in an unlicensed band. The above-described method may be applied to a bandwidth part in which an LBT subband is not configured. For example, each of the LBT subbands #1 and #2 may be generalized to frequency regions #1 and #2 (e.g., PRB sets #1 and #2) in the bandwidth part.

Figure 19A:
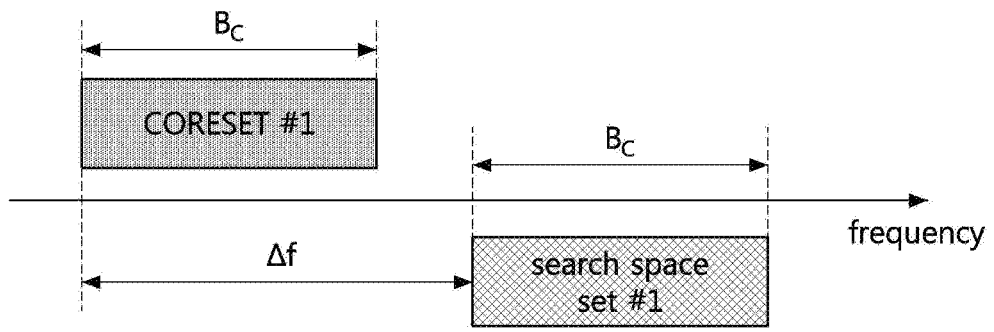
FIG. 19A is a conceptual diagram illustrating a third exemplary embodiment of a method of configuring frequency domain resources of a CORESET and a search space set.
Figure 19B:
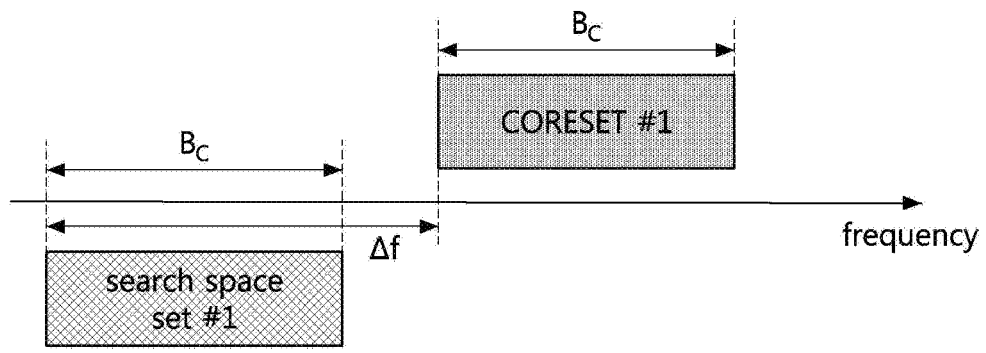
FIG. 19B is a conceptual diagram illustrating a fourth exemplary embodiment of a method of configuring frequency domain resources of a CORESET and a search space set.
Figure 19C:
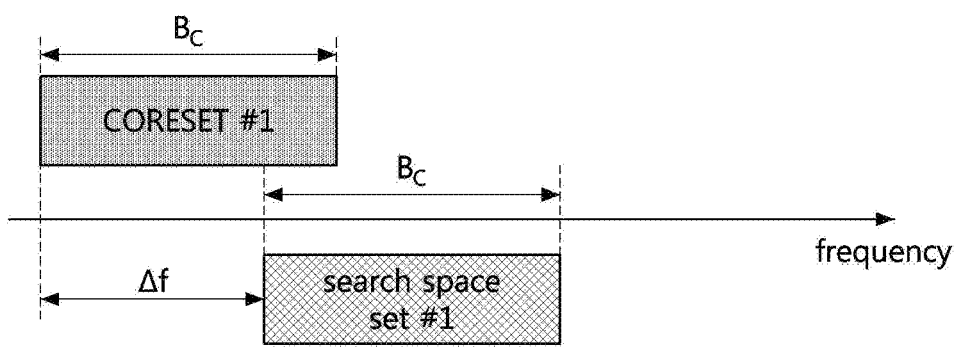
FIG. 19C is a conceptual diagram illustrating a fifth exemplary embodiment of a method of configuring frequency domain resources of a CORESET and a search space set.
Figure 19D:
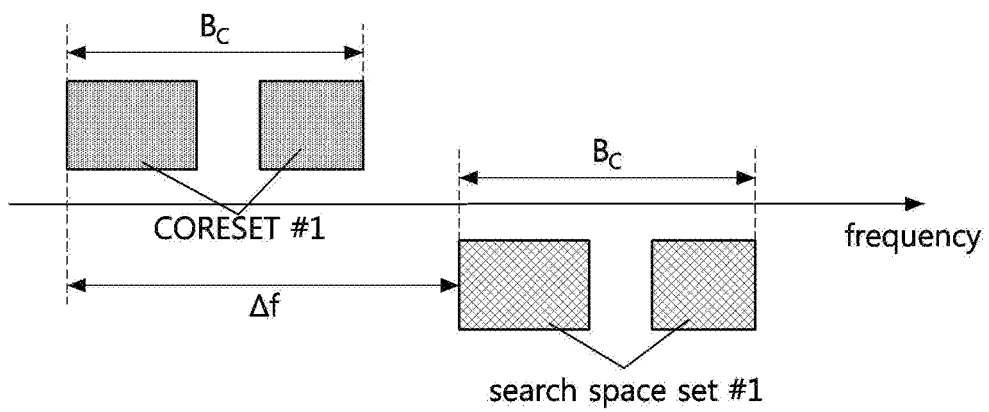
FIG. 19D is a conceptual diagram illustrating a sixth exemplary embodiment of a method of configuring frequency domain resources of a CORESET and a search space set.

FIG. 19A is a conceptual diagram illustrating a third exemplary embodiment of a method of configuring frequency domain resources of a CORESET and a search space set, FIG. 19B is a conceptual diagram illustrating a fourth exemplary embodiment of a method of configuring frequency domain resources of a CORESET and a search space set, FIG. 19C is a conceptual diagram illustrating a fifth exemplary embodiment of a method of configuring frequency domain resources of a CORESET and a search space set, and FIG. 19D is a conceptual diagram illustrating a sixth exemplary embodiment of a method of configuring frequency domain resources of a CORESET and a search space set.

Referring to FIGS. 19A to 19D, the search space set #1 may be associated with the CORESET #1. The search space set #1 may include one frequency domain occasion. A frequency region in which the frequency domain occasion is arranged may be the same as the frequency region of the CORESET #1. Alternatively, the frequency region in which the frequency domain occasion is arranged may be a frequency region shifted from the frequency region of the CORESET #1 by a preconfigured value Δf. In the exemplary embodiment shown in FIG. 19A, candidate value(s) of Δf may include positive numbers. Δf or the absolute value of Δf may be greater than or equal to the bandwidth occupied by the CORESET #1 (or a difference between the highest and lowest frequencies of the frequency region occupied by the CORESET #1).

The frequency region of the search space set #1 may not partially overlap with the frequency region of the CORESET #1. That is, a partial overlap between the frequency region of the search space set or each frequency domain occasion of the corresponding search space set and the frequency region of the CORESET may not be allowed. A case that the frequency region of the search space set or each frequency domain occasion of the corresponding search space set completely overlaps the frequency region of the CORESET, or a case that the frequency region of the search space set or each frequency domain occasion of the corresponding search space set does not overlap the frequency region of the CORESET may be allowed. This operation may be referred to as 'Method 400'.

In the exemplary embodiments shown in FIGS. 18A and 18B, the candidate value(s) of Δf may include 0. In the exemplary embodiment shown in FIG. 19B, the candidate value(s) of Δf may include a negative number. To avoid a partial overlap between the search space set #1 and the CORESET #1, the absolute value of Δf may be equal to or greater than the bandwidth occupied by the CORESET #1.

In the exemplary embodiment shown in FIG. 18A, a plurality of frequency domain occasions constituting the same search space set may be arranged in separate frequency regions without being overlapped. A difference between offset values for the plurality of frequency domain occasions may be equal to or greater than the bandwidth of the CORESET. Alternatively, the plurality of frequency domain occasions constituting the same search space set may completely overlap in the frequency domain. That is, different frequency domain occasions in the same search space set may have the same frequency offset from the frequency region of the CORESET. In this case, specific frequency domain occasion(s) may partially overlap with the CORESET in the frequency domain. This operation may be referred to as 'Method 401'. Method 401 may be implemented together with Method 400. Alternatively, Method 401 may be implemented independently of Method 400. For example, when Method 401 is used, some frequency domain occasions may partially overlap with the CORESET in the frequency domain.

In the exemplary embodiment shown in FIG. 19C, Δf or the absolute value of Δf may be less than the frequency bandwidth occupied by the CORESET #1. In this case, the frequency region of the search space set #1 may partially overlap with the frequency region of the CORESET #1. Different frequency domain occasions in the same search space set may partially overlap in the frequency domain. The terminal may perform a blind decoding operation on PDCCH candidate(s) in each frequency domain occasion regardless of whether or not the frequency domain occasions overlap.

In the exemplary embodiment shown in FIG. 19D, the CORESET #1 may be composed of a plurality of frequency clusters. In this case, the frequency region(s) of the frequency domain occasion(s) may be configured identically in the search space set(s) associated with the CORESET #1 and the frequency domain occasion(s) in the corresponding search space set(s). In this case, the above-described resource arrangement method of search space sets and frequency domain occasions may be applied in the same or similar manner. When the CORESET is composed of a plurality of frequency clusters and the plurality of frequency clusters are discontinuous in the frequency domain, the bandwidth of the CORESET may mean a difference between the highest frequency and the lowest frequency of the frequency region of the CORESET. The bandwidth of the CORESET may be distinguished from the frequency region of the CORESET.

The frequency position of each frequency domain occasion of the search space set may be expressed as an offset from the frequency region of the CORESET. For example, an offset between the first PRB constituting the CORESET (e.g., PRB having the lowest frequency) and the first PRB constituting the frequency domain occasion may be configured to the terminal. The configuration unit of the frequency offset (e.g., offset between the PRBs) may be one PRB or consecutive K PRBs. Here, K may be an integer equal to or greater than 2. K may be predefined in the technical specification. Alternatively, the base station may inform K to the terminal.

For example, the frequency offset may be defined as a difference between the index of the first PRB constituting the CORESET and the index of the first PRB of the frequency domain occasion. K may be configured by RRC signaling, and may be included in the configuration information of the bandwidth part. In the unlicensed band communication, K may be defined as the bandwidth occupied by one LBT subband or a value (e.g., 20 MHz or the number of PRBs corresponding to 20 MHz) corresponding to the bandwidth.

For another example, K may be 6 or a multiple of 6. According to this method, a plurality of CORESETs of the terminal(s) may be arranged in the frequency domain in unit of 6 RBs. The candidate value of the frequency offset may be an integer greater than or equal to zero. Alternatively, the candidate value of the frequency offset may include all of zero, positive, and negative numbers.

Alternatively, the frequency position (e.g., the position of the first PRB) of each frequency domain occasion of the search space set may be represented by a CRB index or a CRB group index. The CRB index or the CRB group index may be configured based on the 'point A'. Alternatively, the frequency position of each frequency domain occasion of the search space set may be represented by a PRB index or PRB group index within the bandwidth part. Meanwhile, when an LBT subband is configured in the carrier or bandwidth part, each frequency domain occasion may belong to one LBT subband. In this case, the frequency position of each frequency domain occasion may be represented based on a local PRB index or PRB group index within the corresponding LBT subband. For example, one CRB group or one PRB group may consist of consecutive L RBs. Here, L may be a natural number. For example, L may be 6 or a multiple of 6. Each CRB group may be defined in ascending order based on the point A. For example, when L=6, the first CRB group may be composed of CRBs #0 to #5, and the second CRB group may be composed of CRBs #6 to #11. This operation may be repeated.

Alternatively, the frequency position (e.g., the position of the first PRB) of each frequency domain occasion of the search space set may be represented by a specific PRB of the LBT subband to which the frequency domain occasion belongs. For example, the specific PRB may be the first PRB (e.g., PRB having the lowest index) of the LBT subband or the first PRB excluding guard PRB(s) in the LBT subband. In this case, the frequency position of each frequency domain occasion of the search space set may be determined by the index of the LBT subband, and the index of the LBT subband may be signaled to the terminal.

Alternatively, each frequency domain occasion may be indicated by a PRB shifted by a preconfigured PRB offset from the specific PRB of the LBT subband. One or more PRB offsets may be defined. The PRB offset may be signaled from the base station to the terminal. Alternatively, the PRB offset may be the same as the PRB offset applied to the CORESET. For example, the starting PRB of the CORESET may be shifted by L PRBs from the specific PRB (e.g., the first PRB) of the LBT subband to which the corresponding CORESET belongs. Here, L may be a natural number. In this case, the starting PRB of the frequency domain occasion of the search space set associated with the CORESET may be shifted by L PRBs from the specific PRB (e.g., the first PRB) of the LBT subband to which the frequency domain occasion belongs. According to the above-described method, the PRB offset may not be signaled to the terminal.

Candidate frequency positions of the frequency domain occasion may be defined, and a bitmap may indicate one or more (or zero or more) of the candidate frequency positions. The base station may transmit the bitmap to the terminal. Each of the candidate frequency positions may be located in a different LBT subband (e.g., RB set). Each bit of the bitmap may indicate whether a PDCCH monitoring occasion is mapped to each candidate frequency position. In addition, one or more candidate frequency positions may be preconfigured, and the bitmap may indicate whether PDCCH monitoring occasions are mapped to the configured candidate frequency position(s). Information (e.g., bitmap) of the frequency position(s) of the frequency domain occasion(s) may be included in the configuration information of the search space set.

In the exemplary embodiment shown in FIG. 19C, when a plurality of frequency domain occasions (e.g., frequency domain occasions #1 and #2) of the same search space set partially or completely overlap in the frequency domain, a plurality of CCE(s) or PDCCH candidate(s) satisfying a specific condition among CCEs or PDCCH candidates constituting the plurality of frequency domain occasions may be excluded from the CCEs and PDCCH candidates counted by the base station and/or the terminal. For example, the first CCE(s) belonging to the frequency domain occasion #1 and the second CCE(s) belonging to the frequency domain occasions #2 overlap, and the channel estimation operations for the first CCE(s) and the second CCE(s) are the same or overlapped, the base station and/or the terminal may count the number of the first CCE(s) or the second CCE(s) in the corresponding slot, and the channel estimation operation may be performed once.

For another example, when the PDCCH candidate #1 of the frequency domain occasion #1 and the PDCCH candidate #2 of the frequency domain occasion #2 satisfy a specific condition, the terminal may count the PDCCH candidate #1 or the PDCCH candidate #2 in the corresponding slot. The specific condition may include a condition that the decoding operation for the PDCCH candidate #1 and the decoding operation for the PDCCH candidate #2 are the same. In this case, the terminal may perform the blind decoding operations for the PDCCH candidates #1 and #2 simultaneously by performing the PDCCH decoding operation once. Conditions for excluding a specific PDCCH candidate from the PDCCH candidates counted by the base station and/or the terminal may be as follows.

The first condition may be that the PDCCH candidates #1 and #2 occupy the same time and frequency resources (e.g., set of CCE(s)). The second condition may be that the size of the DCI payload of the PDCCH candidate #1 is the same as the size of the DCI payload of the PDCCH candidate #2. The third condition may be that the same scrambling operation is applied to the PDCCH candidates #1 and #2. The fourth condition may be that CRCs of DCIs transmitted through the PDCCH candidates #1 and #2 are scrambled by the same RNTI. The RNTI may be a C-RNTI, an MCS-C-RNTI, a CS-RNTI, or the like. The fifth condition may be that the DCI format of the PDCCH candidate #1 is the same as that of the PDCCH candidate #2. The sixth condition may be that DCI formats of the PDCCH candidates #1 and #2 are composed of the same fields. The size of each field included in the DCI format of the PDCCH candidate #1 may be the same or different from the size of each field included in the DCI format of the PDCCH candidate #2.

When one or more among the above-described conditions are satisfied, the terminal may count the PDCCH candidate #1 or the PDCCH candidate #2, and perform a monitoring operation on one or more PDCCH candidates among all PDCCH candidates that can be blind-decoded in each slot. For example, among the above-described conditions, the first, second, third, and fourth conditions may be used.

Alternatively, when a plurality frequency domain occasions (e.g., frequency domain occasions #1 and #2) of the same search space set partially or completely overlap in the frequency domain, the terminal may count the PDCCH candidate(s) regardless of whether or not the CCEs or PDCCH candidates constituting the frequency domain occasions overlap, and perform a monitoring operation on the corresponding PDCCH candidate(s). For example, when the PDCCH candidate #1 of the frequency domain occasion #1 and the PDCCH candidate #2 of the frequency domain occasion #2 satisfy the above-described conditions, and the decoding operations for the PDCCH candidates #1 and #2 are the same, the PDCCH candidates #1 and #2 may be counted as different PDCCH candidates.

The PDCCH and the PDCCH DM-RS may be transmitted in the CORESET or the search space set (e.g., PDCCH monitoring occasion) associated with the CORESET. In this case, when the CORESET associated with the search space set is the CORESET #0, the PDCCH DM-RS transmitted in the search space set (e.g., PDCCH monitoring occasion) may be mapped based on the first subcarrier of the first PRB constituting the CORESET. This operation may mean that symbols constituting the PDCCH DM-RS sequence are sequentially mapped to subcarriers, to which the PDCCH DM-RS is mapped, from the reference subcarrier. The terminal performing an initial access procedure may not know the frequency position of the point A. Accordingly, the terminal may assume the above-described DM-RS mapping to receive a PDCCH in the CORESET #0 and the search space set(s) of the CORESET #0.

When it is allowed to configure the frequency region of the search space set differently from the frequency region of the CORESET #0, the mapping operation of the PDCCH DM-RS in each frequency domain occasion of the search space set may be performed as follows. Method 410 may be a method of mapping DM-RS based on a specific subcarrier within the CORESET. For example, the specific subcarrier may be the first subcarrier of the first PRB of the CORESET. Method 411 may be a method of mapping DM-RS based on a specific subcarrier of each frequency domain occasion. For example, the specific subcarrier may be the first subcarrier of the first PRB of each frequency domain occasion. Method 412 may be a method of mapping DM-RS based on a specific subcarrier of one frequency domain occasion (e.g., frequency domain occasion located in the lowest frequency region) among frequency domain occasions(s) associated with the CORESET. For example, the specific subcarrier may be the first subcarrier of the first PRB of the one frequency domain occasion. When the CORESET is composed of a plurality of symbols, the DM-RS mapping method may be applied to each symbol. This operation will be described in the exemplary embodiments below.

Figure 20A:
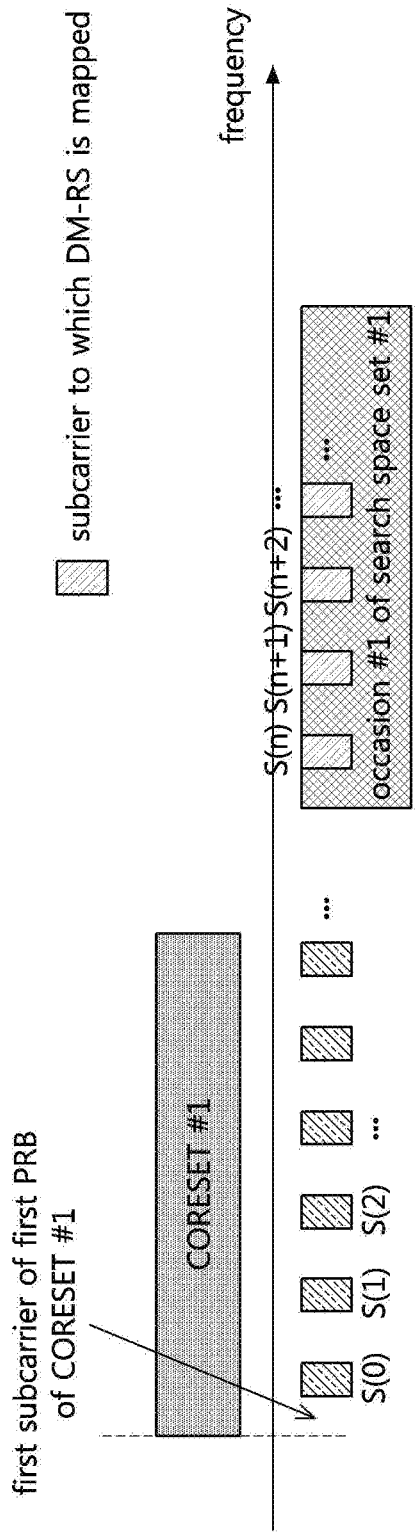
FIG. 20A is a conceptual diagram illustrating a first exemplary embodiment of a PDCCH DM-RS mapping method in a search space set.
Figure 20B:
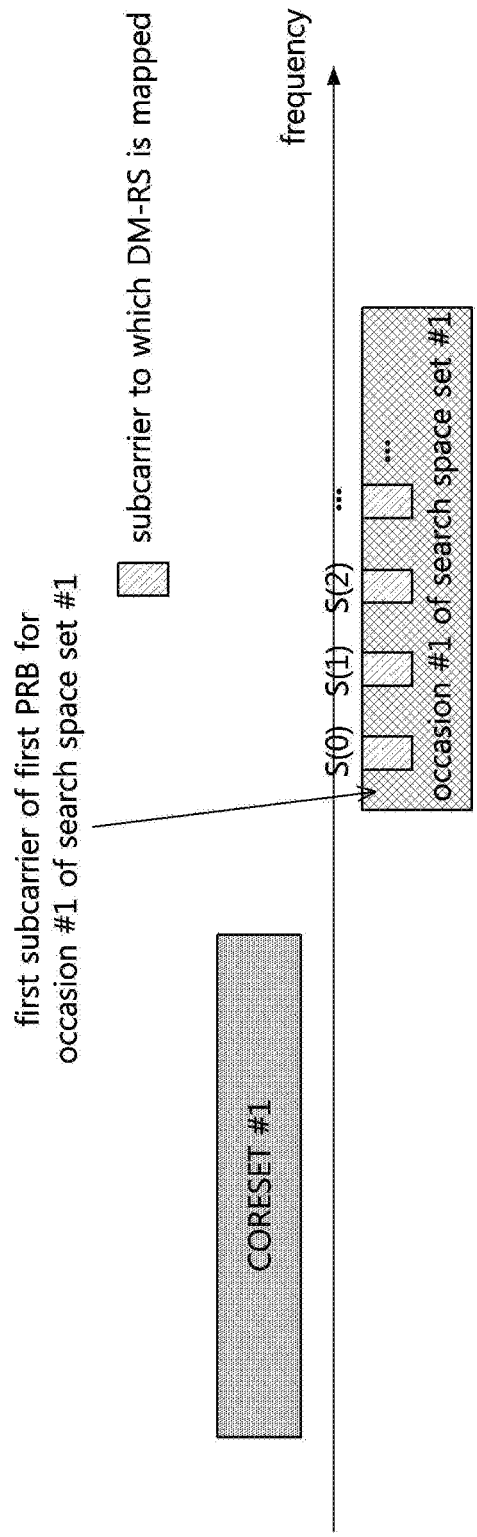
FIG. 20B is a conceptual diagram illustrating a second exemplary embodiment of a PDCCH DM-RS mapping method in a search space set.
Figure 20C:
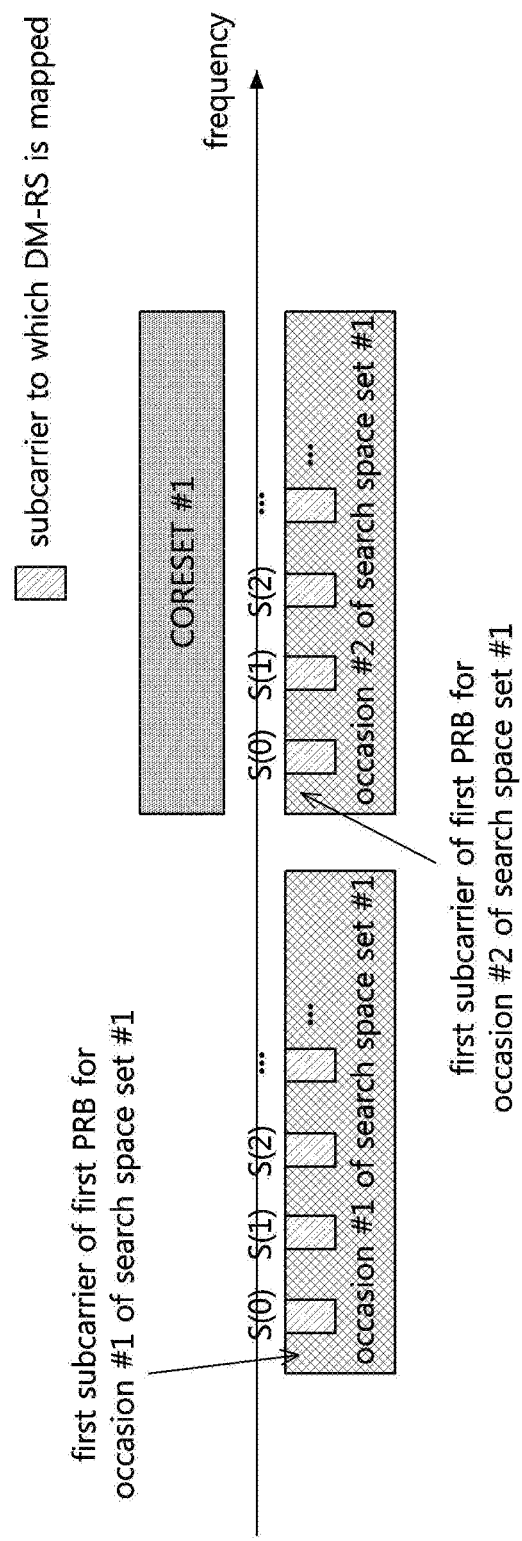
FIG. 20C is a conceptual diagram illustrating a third exemplary embodiment of a PDCCH DM-RS mapping method in a search space set.

FIG. 20A is a conceptual diagram illustrating a first exemplary embodiment of a PDCCH DM-RS mapping method in a search space set, FIG. 20B is a conceptual diagram illustrating a second exemplary embodiment of a PDCCH DM-RS mapping method in a search space set, and FIG. 20C is a conceptual diagram illustrating a third exemplary embodiment of a PDCCH DM-RS mapping method in a search space set.

Referring to FIGS. 20A and 20B, the search space set #1 may be associated with the CORESET #1, and may include the frequency domain occasion #1. The frequency region in which the frequency domain occasion #1 is arranged may be different from the frequency region of the CORESET #1. In this case, the exemplary embodiment shown in FIG. 20A may be performed by Method 410. The mapping position of the PDCCH DM-RS for the frequency domain occasion #1 may be determined based on the first subcarrier of the first PRB of the CORESET #1. When a sequence of the PDCCH DM-RS is $S(0)$, $S(1)$, $S(2)$, . . . , $S(n)$, $S(n+1)$, $S(n+2)$, . . . , and the like, the subcarrier to which $S(0)$ is mapped may be the first subcarrier of the first PRB of the CORESET #1 among the subcarriers to which the PDCCH DM-RS is mapped (hereinafter referred to as 'effective subcarriers') or a subcarrier thereafter. The frequency of the subcarrier to which $S(0)$ is mapped may not be lower than that of the first subcarrier of the first PRB of the CORESET #1. The remaining sequence of the PDCCH DM-RS except $S(0)$ may be sequentially mapped to the effective subcarriers after the subcarrier to which $S(0)$ is mapped. Therefore, the first symbol (e.g., symbol mapped to the lowest frequency resource) of the PDCCH DM-RS actually transmitted in the frequency domain occasion #1 may be a symbol other than $S(0)$ (e.g., $S(n)$).

The exemplary embodiment shown in FIG. 20B may be performed by Method 411. The mapping position of the PDCCH DM-RS for the frequency domain occasion #1 may be determined based on the first subcarrier of the first PRB of the frequency domain occasion (e.g., frequency domain occasion #1) to which the PDCCH DM-RS belongs. For example, the subcarrier to which $S(0)$ is mapped may be the first subcarrier of the first PRB of the frequency domain occasion #1 among the effective subcarriers or a subcarrier thereafter. The frequency of the subcarrier to which $S(0)$ is mapped may not be lower than the frequency of the first subcarrier of the first PRB of the frequency domain occasion #1. The remaining sequence of the PDCCH DM-RS except $S(0)$ may be sequentially mapped to the effective subcarriers after the subcarrier to which $S(0)$ is mapped. Therefore, the first symbol (e.g., symbol mapped to the lowest frequency resource) of the DM-RS actually transmitted in the frequency domain occasion #1 may be $S(0)$.

In the exemplary embodiment shown in FIG. 20C, the search space set #1 may be associated with the CORESET #1, and may include the frequency domain occasions #1 and #2. The frequency domain occasion #1 may be arranged in a frequency region shifted from the frequency region of the CORESET #1, and the frequency domain occasion #2 may be arranged in the frequency region of the CORESET #1. The frequency domain occasion #1 may not overlap with the frequency domain occasion #2. In this case, the PDCCH DM-RS mapping operation in each frequency domain occasion may be performed based on Method 411. The mapping position of the PDCCH DM-RS for each frequency domain occasion may be determined based on the first subcarrier of the first PRB of each frequency domain occasion to which the PDCCH DM-RS belongs.

For example, the subcarrier to which the first symbol (e.g., $S(0)$) of the PDCCH DM-RS is mapped in each frequency domain occasion may be the first subcarrier of the first PRB of each frequency domain occasion among the effective subcarriers, or a subcarrier thereafter. The frequency of the subcarrier to which the first symbol (e.g., $S(0)$) of the PDCCH DM-RS is mapped may not be lower than the frequency of the first subcarrier of the first PRB. The remaining symbols of the PDCCH DM-RS in each frequency domain occasion may be sequentially mapped to the effective subcarriers after the subcarrier to which the first symbol is mapped. The PDCCH DM-RS sequence (e.g., PDCCH DM-RS symbols) may be generated for each frequency domain occasion, and may be mapped to each frequency domain occasion. The same PDCCH DM-RS sequence may be mapped to each frequency domain occasion. That is, the same PDCCH DM-RS sequence may be transmitted in each frequency domain occasion. The expression that the PDCCH DM-RS sequences are the same may mean that the lengths of the PDCCH DM-RS sequences and/or the symbol sequences (or symbol set) constituting the DM-RS sequences are the same.

According to Method 411, the same PDCCH DM-RS mapping rule may be applied within the frequency domain occasion regardless of the frequency position of the frequency domain occasion. Also, the same PDCCH DM-RS mapping rule may be applied even when the frequency domain occasion is located in a frequency region lower than the frequency region of the CORESET. On the other hand, when Method 410 is used, if the frequency domain occasion is arranged in a frequency region lower than the frequency region of the CORESET, it may be impossible to map the PDCCH DM-RS sequence in the ascending order from a reference frequency (e.g., frequency to which S(0) is mapped) for the PDCCH DM-RS mapping. To solve this problem, the frequency offset between the frequency domain occasion and the CORESET may be limited to zero or a positive number.

A DM-RS used for demodulation of a data channel (e.g., PDSCH, PUSCH, PSSCH) may be mapped within a resource region of the data channel. The DM-RS may be transmitted together with the data channel. In this case, mapping of the DM-RS for the data channel may be determined based on a search space set in which DCI scheduling the data channel is transmitted, a DCI format, and/or an RNTI applied to the DCI (e.g., RNTI scrambling a CRC of the DCI). For example, when DCI scheduling a PDSCH is transmitted through a type 0 PDCCH CSS set of the CORESET #0, and a CRC of the corresponding DCI is scrambled by the SI-RNTI, a PDSCH DM-RS may be mapped based on the first PRB (e.g., PRB having the lowest index) or the first subcarrier of the first PRB among PRBs constituting the CORESET #0. The PDSCH DM-RS may be a DM-RS used for demodulation of the PDSCH. When the DCI scheduling the PDSCH is transmitted through a search space set other than the type 0 PDCCH CSS set of the CORESET #0 or when the CRC of the DCI scheduling the PDSCH is scrambled by an RNTI other than the SI-RNTI, the PDSCH DM-RS may be mapped based on the CRB #0 (e.g., the first CRB) or the first subcarrier of the CRB #0.

When it is allowed to configure the frequency region of the search space set differently from the frequency region of the CORESET #0, a method of mapping the DM-RS of the data channel (e.g., PDSCH, PUSCH, PSSCH) scheduled through the CORESET #0 may be performed as follows. Method 420 may be a method of mapping the DM-RS of the data channel based on a specific frequency position (e.g., the first PRB or the first subcarrier of the first PRB) of the CORESET #0. Method 420 may be applied when the offset between the frequency region of the search space set in which the DCI is transmitted and the frequency region of the CORESET #0 is equal to or greater than 0 (i.e., when the starting PRB of the search space set is greater than or equal to the starting PRB of the CORESET #0).

Method 421 may be a method of mapping the DM-RS for the data channel based on a specific frequency position (e.g., the first PRB or the first subcarrier of the first PRB) of the frequency domain occasion of the search space set in which the scheduling DCI is transmitted. Method 422 may be a method of mapping the DM-RS for the data channel based on a specific frequency position (e.g., the first PRB or the first subcarrier of the first PRB) of the lowest frequency domain occasion among frequency domain occasion(s) associated with the CORESET #0. The above-described methods may be used when the scheduling DCI satisfies a specific condition. The specific condition may include one or more among a condition that the scheduling DCI is transmitted through a specific search space set, a condition that a specific DCI format is used, and a condition that the CRC of the DCI is scrambled by a specific RNTI. Further, the specific condition may further include a condition that the scheduling DCI is transmitted through the type 0 PDCCH CSS set and a condition that the CRC of the scheduling DCI is scrambled by the SI-RNTI.

In the above-described exemplary embodiments, one or more PDCCH monitoring occasions arranged in the frequency domain may share the same time resource (e.g., the same symbol or the same set of symbols). Within one period of the search space set, one or more PDCCH monitoring occasions may be allocated in the time domain. Information on the allocation in the time domain may include the number and position of slots in which the PDCCH monitoring occasion is allocated, the starting symbol position of the PDCCH monitoring occasion within the slot, and the like.

The PDCCH monitoring occasions may be arranged in two-dimensional resources in the time domain and frequency domain. As a first allocation method of the PDCCH monitoring occasions, N PDCCH monitoring occasions may be configured in the time domain and M PDCCH monitoring occasions may be configured in the frequency domain. That is, a method in which NxM PDCCH monitoring occasions are allocated may be considered. Each of N and M may be a natural number. The base station may transmit to the terminal configuration information of the PDCCH monitoring occasions configured in the time domain and configuration information of the PDCCH monitoring occasions configured in the frequency domain. The configuration information of the PDCCH monitoring occasions may include one or more among the number of PDCCH monitoring occasions, the positions of PDCCH monitoring occasions, and a set of the positions.

The positions of the N PDCCH monitoring occasions in the time domain may be defined as $T_0, T_1, \ldots,$ and $T_{N-1}$, and the positions of the M PDCCH monitoring occasions in the frequency domain may be defined as $F_0, F_1, \ldots,$ and $F_{M-1}$. In this case, the set of the positions of the PDCCH monitoring occasions in the time domain may be represented as $\{T_0, T_1, \ldots,$ and $T_{N-1}\}$, and the set of the positions of the PDCCH monitoring occasions in the frequency domain may be represented as $\{F_0, F_1, \ldots,$ and $F_{M-1}\}$. The position of each PDCCH monitoring occasion may correspond to $(T_0, F_0), (T_0, F_1), \ldots, (T_0, F_{M-1}), (T_1, F_0), (T_1, F_1), \ldots, (T_1, F_{M-1}), \ldots, (T_{N-1}, F_0), (T_{N-1}, F_1), \ldots,$ or $(T_{N-1}, F_{M-1})$.

As a second allocation method of the PDCCH monitoring occasions, L PDCCH monitoring occasions may be configured, and a combination between the time domain position and the frequency domain position of each of the L PDCCH monitoring occasions may be configured independently. L may be a natural number. For example, the position of each PDCCH monitoring occasion may correspond to $(T_0, F_0), (T_1, F_1), \ldots (T_{L-1}, F_{L-1})$. The flexibility of resource allocation according to the second allocation method may be higher than the flexibility of resource allocation according to the first allocation method. The signaling overhead according to the second allocation method may be greater than the signaling overhead according to the first allocation method.

When a plurality of PDCCH monitoring occasions are configured in the frequency domain, a changed PDCCH and CCE mapping rule may be used. PDCCH candidates and CCEs may be mapped in a smaller unit than that of the search space set. For example, when one search space set includes one or more PDCCH monitoring occasions in the frequency domain, the PDCCH candidates and CCEs may be sequentially mapped from a search space set having a low ID, and the PDCCH candidates and CCEs may be sequentially mapped on a PDCCH monitoring occasion basis in the frequency domain within the corresponding search space set. For example, the PDCCH monitoring occasions may be mapped in ascending or descending order of IDs (e.g., indexes) in the frequency domain within the search space set. A cumulative value of the number of PDCCH candidates and CCEs may be compared with an upper limit value in each mapping step. The mapping operation of the PDCCH candidates and the CCEs on a PDCCH monitoring occasion basis may be performed in two-dimensional resources in the frequency domain and time domain.

The above-described method may be applied to an arbitrary CORESET. Alternatively, the above-described method may not be applied to a specific CORESET. For example, the above-described method may be applied to CORESETs excluding the CORESET (e.g., CORESET #0) configured through a PBCH or an RRC parameter 'ControlResourceSetZero'. The search space set associated with the CORESET #0 may include one frequency domain occasion, and the one frequency domain occasion may be arranged in the frequency region of the CORESET #0. In addition, the above-described method may be applied to an arbitrary search space set (e.g., CSS set, USS set, etc.). Alternatively, the above-described method may not be applied to a specific search space set. For example, the above-described method may be applied to search space sets excluding the type 0 PDCCH CSS set.

Alternatively, the above-described method may not be applied to when scheduling DCI according to a specific DCI format is used or when a CRC of DCI is scrambled by a specific RNTI. For example, the above-described method may be applied when the CRC of the scheduling DCI is scrambled by an RNTI other than the SI-RNTI. For another example, the above-described method may be applied to when scheduling DCI is transmitted in a search space set other than the type 0 PDCCH CSS set or when a CRC of the scheduling DCI is scrambled by an RNTI other than the SI-RNTI. Alternatively, the above-described method may be applied to search space sets other than the search space set #0 (e.g., search space set having ID=0). Alternatively, the above-described method may be applied to a USS set.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, first configuration information of a control resource set (CORESET);
   receiving, from the base station, second configuration information of a search space set including a first frequency domain occasion and a second frequency domain occasion;
   identifying a first resource corresponding to the first frequency domain occasion and a second resource corresponding to the second frequency domain occasion in a frequency region of the CORESET; and
   performing a physical downlink control channel (PDCCH) monitoring operation on a first PDCCH candidate in the first and second resources,
   wherein the first resource is different from the second resource in a frequency domain, and the first PDCCH candidate is mapped to a same one or more control channel elements (CCEs) in the first and second resources.

2. The operation method of claim 1, wherein the CORESET has a CORESET ID other than zero.

3. The operation method of claim 1, wherein the first configuration information includes further transmission configuration information (TCI) state information, and that a demodulation-reference signal (DM-RS) in the first resource and a DM-RS in the second resource are quasi-co-located to each other is assumed based on the TCI state information.

4. The operation method of claim 1,
   wherein the first resource is mapped to a first subband configured in a bandwidth part, the second resource is mapped to a second subband configured in the bandwidth part the first subband is a first resource block (RB) set, and the second subband is a second RB set which is not overlapped with the first RB set.

5. The operation method of claim 4, wherein the first resource is mapped to a first frequency resource which is shifted by an offset from a starting RB of the first subband.

6. The operation method of claim 4, wherein the second configuration information further includes a bitmap, the PDCCH monitoring operation on the first PDCCH candidate in the first resource is indicated by a first bit of the bitmap, and the PDCCH monitoring operation on the first PDCCH candidate in the second resource is indicated by a second bit of the bitmap.

7. The operation method of claim 4, wherein the PDCCH monitoring operation is performed in the first resource when the first subband is determined to be an available subband based on a downlink control information (DCI) format received from the base station.

8. An operation method of a base station in a communication system, the operation method comprising:
   transmitting first configuration information of a control resource set (CORESET);
   transmitting second configuration information of a search space set including a first frequency domain occasion and a second frequency domain occasion;
   identifying a first resource corresponding to the first frequency domain occasion and a second resource corresponding to the second frequency domain occasion in a frequency region of the CORESET; and
   transmitting a physical downlink control channel (PDCCH) on the first PDCCH candidate configured in at least one of the first and second resources,
   wherein the first resource is different from the second resource in a frequency domain, and the first PDCCH candidate is mapped to a same one or more control channel elements (CCEs) in the first and second resources.

9. The operation method of claim 8, wherein the CORESET has a CORESET ID other than zero.

10. The operation method of claim 8, wherein the first configuration information includes further transmission configuration information (TCI) state information, and that a demodulation-reference signal (DM RS) in the first resource and a DM RS in the second resource are quasi-co-located to each other is assumed based on the TCI state information.

11. The operation method of claim 8,
wherein the first resource is mapped to a first subband configured in a bandwidth part, the second resource is mapped to a second subband configured in the bandwidth part the first subband is a first resource block (RB) set, and the second subband is a second RB set which is not overlapped with the first RB set.

12. The operation method of claim 11, wherein the first resource is mapped to a first frequency resource which is shifted by an offset from a starting RB of the first subband.

13. The operation method of claim 11, wherein the second configuration information further includes a bitmap, PDCCH transmission on the first PDCCH candidate in the first resource is indicated by a first bit of the bitmap, and the PDCCH transmission on the first PDCCH candidate in the second resource is indicated by a second bit of the bitmap.

14. The operation method of claim 1, wherein the second configuration information includes further information of n PDCCH monitoring occasions in a time domain, the PDCCH monitoring operation on the first PDCCH candidate is performed in each of the n PDCCH monitoring occasions in the time domain, and n is a natural number.

15. The operation method of claim 8, wherein the second configuration information includes further information of n PDCCH monitoring occasions in a time domain, the PDCCH is transmitted in each of the n PDCCH monitoring occasions in the time domain, and n is a natural number.

* * * * *